(12) United States Patent
Choi et al.

(10) Patent No.: US 12,452,868 B2
(45) Date of Patent: Oct. 21, 2025

(54) METHOD AND APPARATUS FOR RECEIVING PHYSICAL DOWNLINK CONTROL CHANNEL AND TRANSMITTING UPLINK CONTROL CHANNEL IN WIRELESS COMMUNICATION SYSTEMS

(71) Applicant: Samsung Electronics Co., Ltd., Gyeonggi-do (KR)

(72) Inventors: Kyungjun Choi, Gyeonggi-do (KR); Youngrok Jang, Gyeonggi-do (KR); Hyoungju Ji, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 378 days.

(21) Appl. No.: 17/952,837

(22) Filed: Sep. 26, 2022

(65) Prior Publication Data

US 2023/0262705 A1   Aug. 17, 2023

(30) Foreign Application Priority Data

Sep. 24, 2021   (KR) .................... 10-2021-0126720

(51) Int. Cl.
*H04W 72/04* (2023.01)
*H04L 5/00* (2006.01)
(Continued)

(52) U.S. Cl.
CPC ........... *H04W 72/21* (2023.01); *H04L 5/0053* (2013.01); *H04W 72/23* (2023.01)

(58) Field of Classification Search
CPC . H04L 27/2602; H04L 5/0023; H04L 5/0035; H04L 5/0053; H04L 5/0087;
(Continued)

(56) References Cited

U.S. PATENT DOCUMENTS

2019/0166589 A1   5/2019   Yang et al.
2021/0195601 A1   6/2021   Khoshnevisan et al.
(Continued)

FOREIGN PATENT DOCUMENTS

WO   WO 2021/022736   2/2021

OTHER PUBLICATIONS

CATT, "Enhancements on Multi-TRP/Panel Transmission for PDCCH, PUCCH and PUSCH", R1-2106936, 3GPP TSG RAN WG1 #106-e, Aug. 16-27, 2021, 21 pages.
(Continued)

*Primary Examiner* — Awet Haile
(74) *Attorney, Agent, or Firm* — The Farrell Law Firm, P.C.

(57) ABSTRACT

An apparatus and method are provided for receiving and transmitting signals/channels in a wireless communication system. A method performed by a terminal includes receiving configuration information on a first SS set and a second SS set, wherein the first SS set with a first index includes a first PDCCH candidate having a CCE AL 8 and a third PDCCH candidate having a CCE AL 16, and the second SS set with a second index includes a second PDCCH candidate having the CCE AL 8 and a fourth PDCCH candidate having the CCE AL 16; receiving a PDCCH based on the configuration information; determining a PUCCH resource based on an index of a first CCE for the PDCCH, wherein the index of the first CCE is determined based on a CCE AL of a PDCCH candidate associated with the second SS set with the second index which is smaller than the first index; and transmitting a PUCCH based on the PUCCH resource.

15 Claims, 36 Drawing Sheets

(51) Int. Cl.
*H04W 72/12* (2023.01)
*H04W 72/21* (2023.01)
*H04W 72/23* (2023.01)

(58) Field of Classification Search
CPC .... H04L 5/0094; H04L 5/1469; H04W 72/21; H04W 72/23; H04W 72/232; Y02D 30/70
See application file for complete search history.

(56) References Cited

U.S. PATENT DOCUMENTS

| | | | | |
|---|---|---|---|---|
| 2021/0345341 A1* | 11/2021 | Zewail | .................. | H04L 1/1614 |
| 2022/0321285 A1* | 10/2022 | Khoshnevisan | ...... | H04L 5/0003 |
| 2023/0180199 A1* | 6/2023 | Jung | ..................... | H04L 1/0038 370/329 |
| 2023/0269750 A1* | 8/2023 | Zhang | .................... | H04L 5/001 370/277 |
| 2024/0023101 A1* | 1/2024 | Gao | ..................... | H04L 5/0023 |

OTHER PUBLICATIONS

OPPO, "Enhancements on Multi-TRP for PDCCH, PUCCH and PUSCH", R1-2107204, 3GPP TSG RAN WG1 #106-e, Aug. 16-27, 2021, 17 pages.

Qualcomm Incorporated, "Enhancements on Multi-TRP for PDCCH, PUCCH and PUSCH", R1-2107324, 3GPP TSG-RAN WG1 Meeting #106-e, Aug. 16-27, 2021, 36 pages.

International Search Report dated Dec. 22, 2022 issued in counterpart application No. PCT/KR2022/014350, 6 pages.

Intel Corporation, "Multi-TRP Enhancements for PDCCH, PUCCH and PUSCH", R1-2100637, 3GPP TSG RAN WG1 #104-e, Jan. 25-Feb. 5, 2021, 17 pages.

NTT Docomo, Inc. (Rapporteur), "RAN WG's Progress on NR WI in the February Meeting 2018", R2-1804394, 3GPP TSG-RAN WG2 #101bis, Apr. 16-20, 2018, 25 pages.

European Search Report dated Nov. 23, 2023 issued in counterpart application No. 22797619.8-1213, 10 pages.

* cited by examiner

PDCCH of AL8 is detected

PDCCH of AL16 is detected

METHOD AND APPARATUS FOR RECEIVING PHYSICAL DOWNLINK CONTROL CHANNEL AND TRANSMITTING UPLINK CONTROL CHANNEL IN WIRELESS COMMUNICATION SYSTEMS

CROSS-REFERENCE TO RELATED APPLICATION(S)

This application is based on and claims priority under 35 U.S.C. § 119 to Korean Patent Application No. 10-2021-0126720, filed on Sep. 24, 2021, in the Korean Intellectual Property Office, the entire disclosure of which is incorporated herein by reference.

BACKGROUND

1. Field

The disclosure relates generally to operations of a user equipment (UE) and a base station (BS) in a wireless communication system, and more particularly, to a method for receiving a downlink (DL) control channel by a UE and receiving a DL shared channel based on the reception, and a device capable of performing the method. In addition, the disclosure relates to a method for receiving a DL control channel by a UE and transmitting an uplink (UL) control channel based on the reception, and a device capable of performing the method.

2. Description of Related Art

5th generation (5G) mobile communication technologies define broad frequency bands such that high transmission rates and new services are possible, and can be implemented in "sub 6 GHz" bands such as 3.5 GHz, and also in "above 6 GHz" bands such as mmWave including 28 GHz and 39 GHz. In addition, implementation of 6th generation (6G) mobile communication technologies (referred to as "beyond 5G systems") in terahertz bands (e.g., 95 GHz to 3 THz bands) has been considered for providing transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN), which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access (RA) for simplifying RA procedures (e.g., 2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be implemented. To this end, new research is scheduled in connection with extended reality (XR) for efficiently supporting augmented reality (AR), virtual reality (VR), mixed reality (MR) etc., 5G performance improvement and complexity reduction by utilizing artificial Intelligence (AI) and machine learning (ML), AI service support, metaverse service support, and drone communication.

Further, such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The present disclosure has been made to address the above-mentioned problems and disadvantages, and to provide at least the advantages described below.

According to an aspect of the present disclosure, a method performed by a terminal in a wireless communication system includes receiving configuration information on a first search space (SS) set and a second SS set, wherein the first SS set with a first index includes a first physical DL control channel (PDCCH) candidate having a control channel element (CCE) aggregation level (AL) 8 and a third PDCCH candidate having a CCE AL 16, and wherein the second SS set with a second index includes a second PDCCH candidate having the CCE AL 8 and a fourth PDCCH candidate having the CCE AL 16; receiving a PDCCH based on the configuration information; determining a physical UL control channel (PUCCH) resource based on an index of a first CCE for the PDCCH, wherein the index of the first CCE is determined based on a CCE AL of a PDCCH candidate associated with the second SS set with the second index, in case that the first index of the first SS set is larger than the second index of the second SS set; and transmitting a PUCCH based on the determined PUCCH resource.

According to another aspect of the disclosure, a method performed by a BS in a wireless communication system includes transmitting, to a terminal, configuration information on a first SS set and a second SS set, wherein the first SS set with a first index includes a first PDCCH candidate having a CCE AL 8 and a third PDCCH candidate having a CCE AL 16, and wherein the second SS set with a second index includes a second PDCCH candidate having the CCE AL 8 and a fourth PDCCH candidate having the CCE AL 16; transmitting, to the terminal, a PDCCH based on the configuration information; and receiving, from the terminal, a PUCCH based on a PUCCH resource, wherein the PUCCH resource is identified based on an index of a first CCE for the PDCCH, and wherein the index of the first CCE is associated with a CCE AL of a PDCCH candidate associated with the second SS set with the second index, in case that the first index of the first SS set is larger than the second index of the second SS set.

According to another aspect of the disclosure, a terminal in a wireless communication system includes a transceiver to receive and transmit signals; and a processor coupled with the transceiver. And, the processor is configured to: receive configuration information on a first SS set and a second SS set, wherein the first SS set with a first index includes a first PDCCH candidate having a CCE AL 8 and a third PDCCH candidate having a CCE AL 16, and wherein the second SS set with a second index includes a second PDCCH candidate having the CCE AL 8 and a fourth PDCCH candidate having the CCE AL 16, receive, via the transceiver, a PDCCH based on the configuration information, determine a PUCCH resource based on an index of a first CCE for the PDCCH, wherein the index of the first CCE is determined based on a CCE AL of a PDCCH candidate associated with the second SS set with the second index, in case that the first index of the first SS set is larger than the second index of the second SS set, and transmit, via the transceiver, a PUCCH based on the determined PUCCH resource.

According to another aspect of the disclosure, a BS in a wireless communication system includes a transceiver to receive and transmit signals; and a processor coupled with the transceiver. And, the processor is configured to: transmit to a terminal, configuration information on a first SS set and a second SS set, wherein the first SS set with a first index includes a first PDCCH candidate having a CCE AL 8 and a third PDCCH candidate having a CCE AL 16, and wherein the second SS set with a second index includes a second PDCCH candidate having the CCE AL 8 and a fourth PDCCH candidate having the CCE AL 16, transmit, to the terminal, a PDCCH based on the configuration information, and receive, from the terminal, a PUCCH based on a PUCCH resource, wherein the PUCCH resource is identified based on an index of a first CCE for the PDCCH, and wherein the index of the first CCE is associated with a CCE AL of a PDCCH candidate associated with the second SS set with the second index, in case that the first index of the first SS set is larger than the second index of the second SS set.

According to another aspect of the disclosure, a method performed by a terminal includes receiving, from a BS, a configuration of a plurality of search spaces; receiving, from the BS, a configuration of linked search spaces on which same downlink control information (DCI) is transmitted repeatedly, among the plurality of search spaces; receiving, from the BS, DCI scheduling a physical DL shared channel (PDSCH) in the linked search spaces; determining an aggregation level (AL) of PDCCH on which the received DCI is transmitted based on configuration information on respective search space of the linked search spaces; and performing rate matching and receiving a PDSCH based on the determined AL of respective search space.

According to another aspect of the disclosure, a method performed by a terminal includes receiving, from a BS, a configuration of a plurality of search spaces; receiving, from the BS, a configuration of linked search spaces on which same DCI is transmitted repeatedly, among the plurality of search spaces; receiving, from the BS, DCI scheduling a PDSCH in the linked search spaces; determining a search space satisfying a specific condition, based on configuration information of the linked search spaces; determining an AL in the search space satisfying the specific condition; determining an AL in a search space not satisfying the specific condition, based on the determined AL; and performing rate-matching and receiving a PDSCH, based on the determined AL in the search space satisfying the specific condition and the determined AL in the search space not satisfying the specific condition.

According to another aspect of the disclosure, a method performed by a terminal includes receiving, from a BS, a configuration of a plurality of search spaces; receiving, from the BS, a configuration of linked search spaces on which same DCI is transmitted repeatedly, among the plurality of search spaces; receiving, from the BS, DCI scheduling a PDSCH in the linked search spaces; determining a search space not satisfying a specific condition, based on configuration information of the linked search spaces; determining an AL in the search space not satisfying the specific condition; determining an AL in a search space satisfying the specific condition, based on the determined AL; and performing rate-matching and receiving a PDSCH, based on the determined AL in the search space satisfying the specific condition and the determined AL in the search space not satisfying the specific condition.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
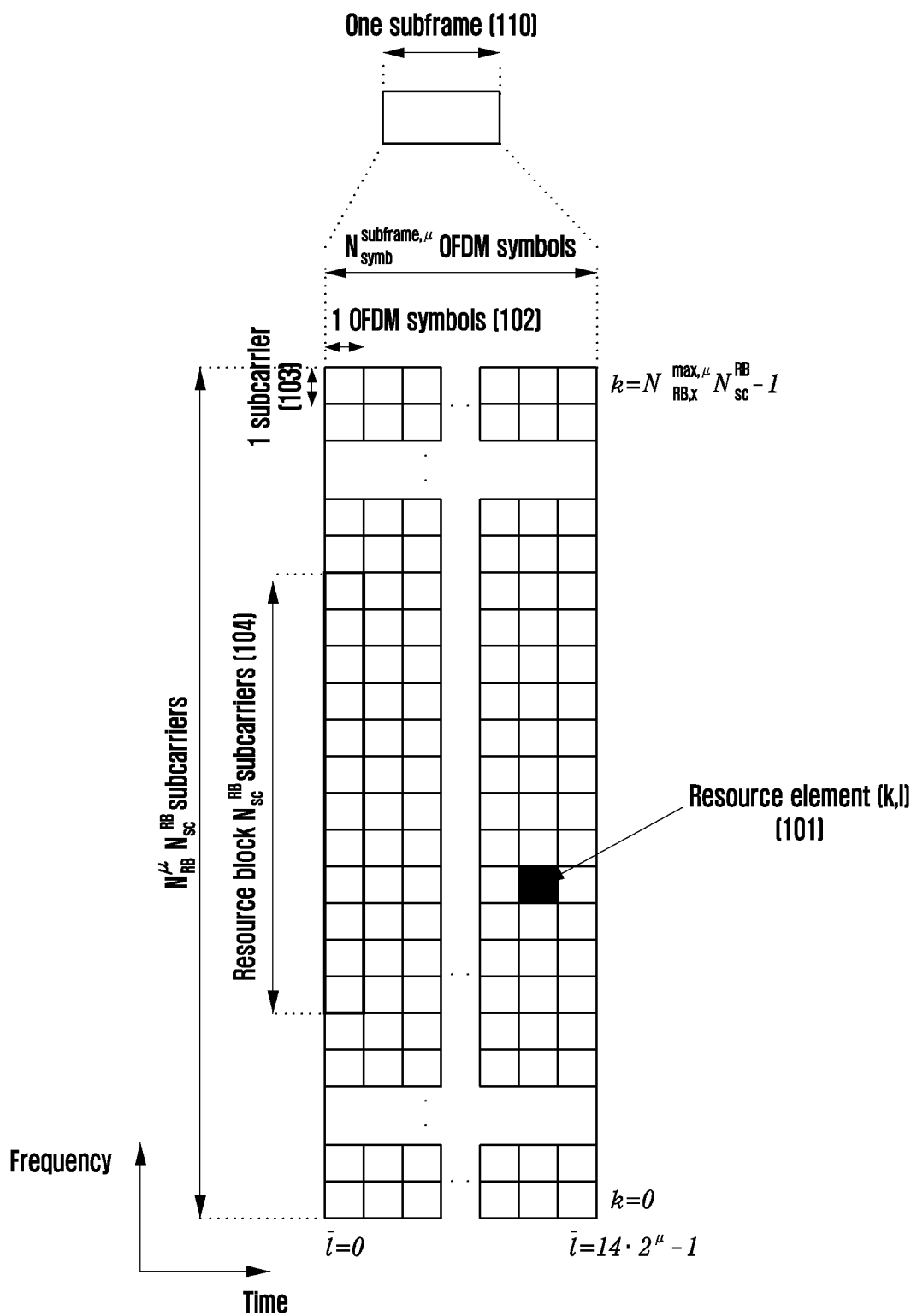
FIG. 1 illustrates a basic structure of a time-frequency domain in a wireless communication system, according to an embodiment of the disclosure.

The technical problems to be achieved in the embodiment of the disclosure are not limited to the technical problems mentioned above, and other technical problems not mentioned herein will be clearly understood from the following description by those skilled in the art to which the disclosure belongs.

In accordance with an embodiment, an apparatus and a method are provided that are capable of effectively providing a service in a mobile communication system.

More specifically, a method and an apparatus are provided for receiving a downlink (DL) control channel and receiving a DL shared channel based on the DL control channel.

Further, a method and an apparatus are provided for receiving a DL control channel and transmitting a uplink (UL) control channel based on the DL control channel.

According to an embodiment of the disclosure, resources for PDCCH monitoring in linked multiple search spaces can be determined and PDSCH may be rate-matched based on the resources for PDCCH monitoring.

Further, according to an embodiment of the disclosure, a PUCCH resource can be determined based on a PDCCH received on linked multiple search spaces and a PUCCH including hybrid automatic repeat request (HARQ)-acknowledgement (ACK) information can be transmitted based on the PUCCH resource.

The effects obtainable in the disclosure are not limited to the above-mentioned effects, and other effects not mentioned herein will be clearly understood from the following description by those skilled in the art to which the disclosure belongs.

Various embodiments of the present disclosure are described with reference to the accompanying drawings.

Further, detailed descriptions of known functions or configurations incorporated herein will be omitted when it is determined that the descriptions may obscure the subject matter of the disclosure.

In the drawings, some elements may be exaggerated, omitted, or schematically illustrated. Further, the size of each element does not completely reflect the actual size. In the drawings, identical or corresponding elements are provided with identical reference numerals.

Various advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims.

Throughout the specification, the same or like reference numerals designate the same or like elements.

The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a wireless access unit, a BS controller, and a node on a network. A terminal may include a UE, a mobile station (MS), a cellular phone, a smartphone, a computer, or a multimedia system capable of performing communication functions.

In the disclosure, a "downlink (DL)" refers to a radio link via which a BS transmits a signal to a terminal, and an "uplink (UL)" refers to a radio link via which a terminal transmits a signal to a BS. Further, although the following description may be directed to a long term evolution (LTE) or LTE-advanced (LTE-A) system by way of example, embodiments of the disclosure may also be applied to other communication systems having similar technical backgrounds or channel types to the embodiments of the disclosure. Examples of other communication systems may include 5G new radio (NR) developed beyond LTE-A, and in the following description, "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, the term "unit" includes, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit", or divided into a larger number of elements, or a "unit". Moreover, the elements and "units" may be implemented to reproduce one or more central processing units (CPUs) within a device or a security multimedia card. Further, the term "unit" in the embodiments may include one or more processors.

A wireless communication system has developed into a broadband wireless communication system that provides a high-speed and high-quality packet data service according to communication standards such as high-speed packet access (HSPA) of third generation partnership project (3GPP), LTE or evolved universal terrestrial radio access (E-UTRA), LTE-A, LTE-Pro, high rate packet data (HRPD) of 3GPP2, ultra mobile broadband (UMB), and 802.16e of the Institute of Electrical and Electronics Engineers (IEEE) beyond the initially provided voice-based service.

An LTE system, which is a representative example of the broadband wireless communication system, employs an orthogonal frequency division multiplexing (OFDM) scheme for a DL, and employs a single carrier frequency division multiple access (SC-FDMA) scheme for a UL. The UL is a radio link through which a UE (or an MS) transmits data or a control signal to a BS (or an eNode B), and the DL is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, i.e., a 5G communication system, should be able to freely reflect various requirements of a user and a service provider, and thus, should support a service which satisfies the various requirements. Services that are considered for the 5G communication system include eMBB, mMTC, and URLLC.

The eMBB aims to provide an improved data transmission rate, which surpasses the data transmission speed supported by conventional LTE, LTE-A, or LTE-Pro. For example, in the 5G communication system, the eMBB should provide a peak DL data rate of 20 gigabits per second (Gbps) and a peak UL data rate of 10 Gbps from the viewpoint of one BS. Further, the 5G communication system should provide not only the peak data rate but also an increased user-perceived data rate. In order to satisfy such requirements, improvement of various transmission/reception technologies, including a further improved MIMO transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or greater than or equal to 6 GHz, whereby the data transmission rate required by the 5G communication system can be satisfied.

In order to support an application service such as IoT, mMTC is considered in the 5G communication system. The mMTC should support access of a multitude of UEs within a cell, improve coverage of the UEs, increase a battery lifetime, and reduce the costs of the UEs in order to efficiently provide IoT technology. IoT technology may be used in conjunction with various sensors and devices to provide communication, and thus should support a large number of UEs (e.g., 1,000,000 UEs/kilometer2 (km2)) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC should be produced at low cost and it is often difficult to change a battery thereof. Thus, a long battery lifetime, e.g., 10 to 15 years, may be required.

The URLLC is a cellular-based wireless communication service used for a particular (mission-critical) purpose. For example, services used for remote control of robots or machinery, industrial automation, unmanned aerial vehicles, remote health care, and emergency alerts may be considered. Communication provided by the URLLC should provide very low latency and very high reliability. For example, services supporting the URLLC should satisfy a radio access delay time (air interface latency) shorter than 0.5 milliseconds and also have a requirement of a packet error rate less than or equal to 10-5. Accordingly, for services supporting the URLLC, the 5G system should provide a transmit time interval (TTI) smaller than that of other systems and also have a design requirement of allocating a wide array of resources in a frequency band in order to guarantee reliability of a communication link.

Three services of 5G, namely eMBB, URLLC, and mMTC, may be multiplexed and transmitted in one system.

In order to meet the different requirements of the respective services, different transmission/reception schemes and transmission/reception parameters may be used for the services. Of course, 5G is not limited to the above-described three services.

NR Time-Frequency Resources

FIG. 1 illustrates a basic structure of a time-frequency domain in a wireless communication system, according to an embodiment of the disclosure.

Referring to FIG. 1, a horizontal axis indicates a time domain and a vertical axis indicates a frequency domain. The basic unit of resources in the time and frequency domain is a resource element (RE) 101 and may be defined as 1 OFDM symbol 102 in the time axis and 1 subcarrier 103 in the frequency axis. In the frequency domain, $N_{SC}^{RB}$ (e.g., 12) successive REs may correspond to one resource block (RB) 104.

Figure 2:
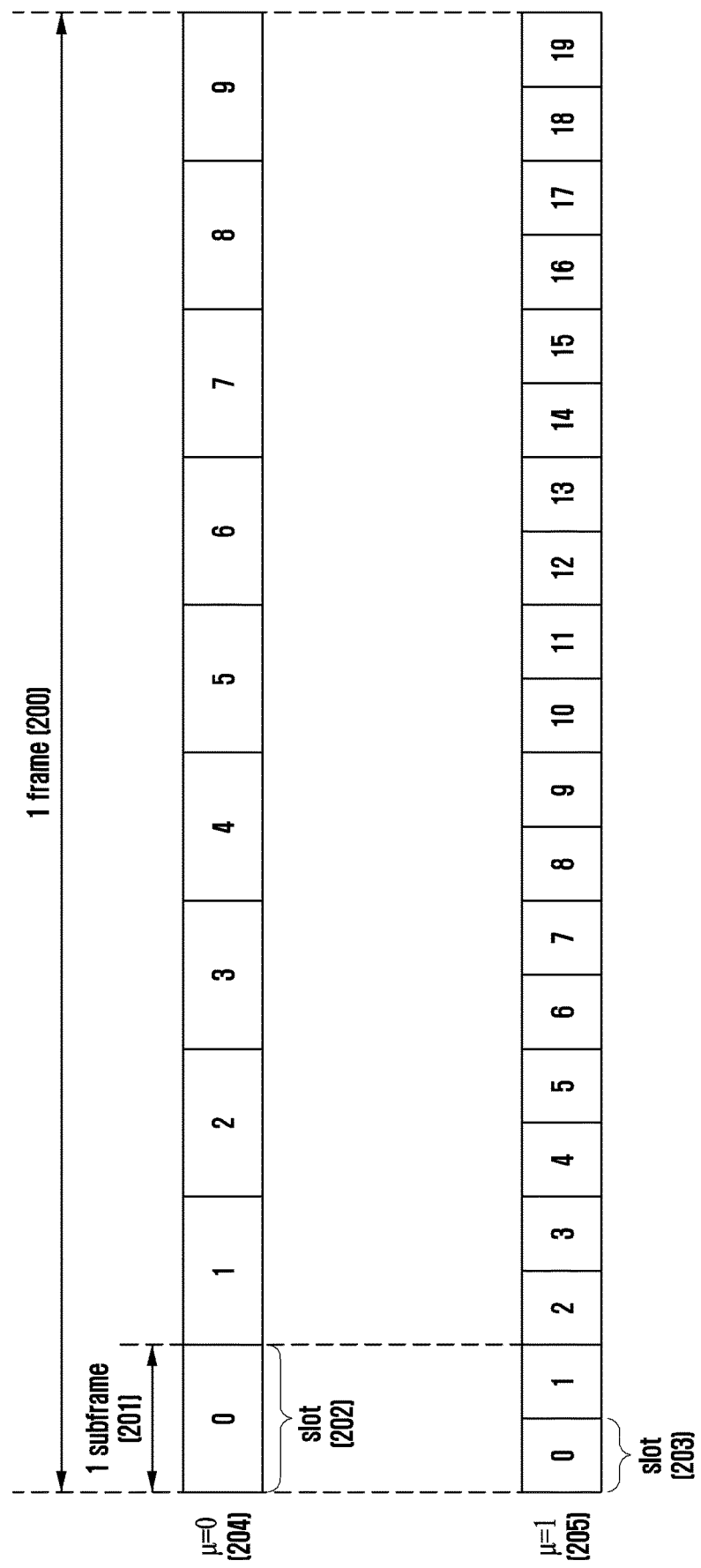
FIG. 2 illustrates frame, subframe, and slot structures in a wireless communication system, according to an embodiment of the disclosure.

FIG. 2 illustrates frame, subframe, and slot structures in a wireless communication system, according to an embodiment of the disclosure.

Referring to FIG. 2, a frame 200, a subframe 201, and a slot 202 are illustrated. 1 frame 200 may be defined as 10 milliseconds (ms). 1 subframe 201 may be defined as 1 ms, and one frame 200 may include a total of 10 subframes 201. 1 slot 202 or 203 may be defined as 14 OFDM symbols (i.e., the number symbols $N_{symb}^{slot}$ per slot=14). 1 subframe 201 may include one or a plurality of slots 202 and 203, and the number of slots 202 or 203 per subframe 201 may vary depending on a configuration value p 204 or 205 for subcarrier spacing (SCS).

FIG. 2 illustrates a case in which the SCS configuration value 204 is p=0 and a case in which the SCS configuration value 205 is p=1. 1 subframe 201 may include one slot 202 in the case of p=0 204, and 1 subframe 201 may include 2 slots 203 in the case of p=1 205. That is, the number ($N_{slot}^{subframe,\mu}$) of slots per subframe may vary depending on the configuration value (μ) for SCS, and accordingly the number ($N_{slot}^{frame,\mu}$) of slots per frame may vary. The number ($N_{slot}^{subframe,\mu}$) and the number ($N_{slot}^{frame,\mu}$) according to the SCS configuration value μ may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part (BWP)

Figure 3:
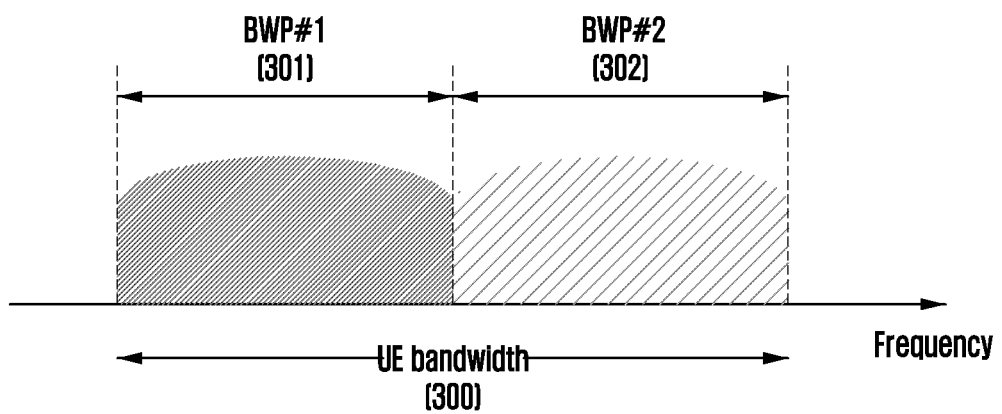
FIG. 3 illustrates a configuration of a BWP in a wireless communication system, according to an embodiment of the disclosure.

FIG. 3 illustrates a configuration of a BWP in a wireless communication system, according to an embodiment of the disclosure.

Referring to FIG. 3, a UE bandwidth 300 is configured as two BWPs, i.e., BWP #1 301 and BWP #2 302. The BS may configure one or a plurality of BWPs in the UE, and the following information provided below in Table 2 may be configured to each BWP.

TABLE 2

BWP ::=   SEQUENCE {
  bwp-Id   BWP-Id,
  (bandwidth part identifier)

TABLE 2-continued

| | locationAndBandwidth (bandwidth part location) | INTEGER (1..65536), |
|---|---|---|
| n3, n4, n5}, | subcarrierSpacing | ENUMERATED {n0, n1, n2, |
| | (subcarrier spacing) cyclicPrefix (cyclic prefix) | ENUMERATED { extended } |
| } | | |

Of course, the disclosure is not limited to the aforementioned example, and various parameters related to a BWP as well as the configuration information may be configured in the UE. The information may be transmitted to the UE from the BS through higher layer signaling, e.g., radio resource control (RRC) signaling. Among one or a plurality of configured BWPs, at least one BWP may be activated. Information indicating whether to activate the configured BWPs may be semi-statically transferred from the BS to the UE through RRC signaling or may be dynamically transferred through DCI.

The UE may receive a configuration of an initial BWP for initial access from the BS through a master information block (MIB) before the RRC connection. More specifically, the UE may receive configuration information for a CORESET and a search space in which a PDCCH for receiving system information (SI) (e.g., remaining SI (RMSI) or system information block 1 (SIB 1)) for initial access through the MIB can be transmitted in an initial access step. The CORESET and the search space configured as the MIB may be considered as an identity (ID) 0. The BS may inform the UE of configuration information such as frequency allocation information for CORESET #0, time allocation information, and numerology, through the MIB. Further, the BS may inform the UE of configuration information for a monitoring period and an occasion of CORESET #0, that is, configuration information for search space #0 through the MIB. The UE may consider a frequency region configured as CORESET #0 acquired from the MIB as an initial BWP for initial access. At this time, the ID of the initial BWP may be considered as 0.

The configuration for the BWP supported by the 5G system may be used for various purposes.

When a bandwidth supported by the UE is narrower than a system bandwidth, it may be supported through the BWP configuration. For example, the BS may configure a frequency location (e.g., configuration information 2) of the BWP in the UE, and thus the UE may transmit and receive data at a specific frequency location within the system bandwidth.

In order to support different numerologies, the BS may configure a plurality of BWPs in the UE. For example, in order to support the UE to perform data transmission and reception using both SCS of 15 kilohertz (kHz) and SCS of 30 kHz, two BWPs may be configured as SCSs of 15 kHz and 30 kHz, respectively. Different BWPs may be frequency division-multiplexed, and when data is to be transmitted and received at specific SCS, BWPs configured at the corresponding SCS may be activated.

In order to reduce power consumption of the UE, the BS may configure BWPs having different sizes of bandwidths in the UE. When the UE supports a very large bandwidth, e.g., 100 MHz, but always transmits and receives data through the bandwidth, a very high power consumption may be generated. Particularly, monitoring an unnecessary DL control channel through a large bandwidth of 100 MHz in a state in which there is no traffic is very inefficient from the aspect of power consumption. In order to reduce power consumption of the UE, the BS may configure a BWP having a relatively narrow bandwidth, e.g., 200 MHz. The UE may perform a monitoring operation in the BWP of 200 MHz in the state in which there is no traffic, and if data is generated, may transmit and receive data through the BWP of 100 MHz according to an instruction from the BS.

In a method of configuring the BWP, UEs before the RRC connection may receive configuration information for an initial BWP through an MIB in an initial access step. More specifically, the UE may receive a configuration of a CORESET for a DL control channel in which DCI for scheduling an SIB can be transmitted from an MIB of a physical broadcast channel (PBCH). A bandwidth of the CORESET configured as the MIB may be considered as an initial BWP, and the UE may receive a PDSCH, in which the SIB is transmitted, through the configured initial BWP. The initial BWP may be used not only for reception of the SIB but also other SI (OSI), paging, or RA.

BWP Change

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within DCI and the UE may make a BWP change to BWP #2 302 indicated by the received BWP indicator within DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard has defined requirements for a delay time ($T_{BWP}$) required for the BWP change, as shown below in Table 3.

TABLE 3

| | NR Slot | BWP switch delay TBWP (slots) | |
|---|---|---|---|
| μ | length (ms) | Type 1Note 1 | Type 2Note 1 |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time may support type 1 or type 2 according to a UE capability. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot $n+T_{BWP}$ and transmit and receive a data channel scheduled by the corresponding DCI in the changed new BWP. When the BS desires to schedule a data channel in the new BWP, the BS may determine time domain resource allocation for the data cannel in consideration of the BWP change delay time ($T_{BWP}$) of the UE. That is, when scheduling the data channel in the new BWP, the BS may schedule the corresponding data channel after the BWP change delay time using a method of determining the time domain resource allocation for the data channel. Accordingly, the UE may not expect that the DCI indicating the BWP change indicates a slot offset ($K_0$ or $K_2$) smaller than the BWP change delay time ($T_{BWP}$).

If the UE receives DCI indicating the BWP change (e.g., DCI format 1_1 or 0_1), the UE may perform no transmission or reception during a time interval from a third symbol of a slot for receiving the PDCCH including the corresponding DCI to a start point of the slot indicated by the slot offset (K0 or K2) indicated through a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (i.e., the last symbol of slot n+K−1).

Synchronization Signal/PBCH Block

A synchronization signal/PBCH block may be a physical layer channel block including a primary synchronization signal (PSS), a secondary synchronization signal (SSS), and a PBCH.

A PSS is a signal which is a reference of DL time/frequency synchronization and provides some pieces of information of a cell ID.

An SSS is a reference of DL time/frequency synchronization and provides the remaining cell ID information which the PSS does not provide. In addition, the SSS serves as a reference signal (RS) for demodulation of a PBCH.

A PBCH provides SI required for transmitting and receiving a data channel and a control channel by the UE. The SI may include search space-related control information indicating radio resource mapping information of the control channel and scheduling control information for a separate data channel for transmitting SI.

A synchronization signal/PBCH block includes a combination of a PSS, an SSS, and a PBCH. One or more synchronization signal/PBCH blocks may be transmitted within a time of 5 ms, and each of the transmitted synchronization signal/PBCH blocks may be separated by an index.

The UE may detect the PSS and the SSS in an initial access stage and decode the PBCH. The UE may acquire an MIB from the PBCH and receive a configuration of CORESET #0 (corresponding to a CORESET having CORESET index 0) therefrom. The UE may monitor CORESET #0 based on an assumption that the selected synchronization signal/PBCH block and a demodulation RS (DMRS) transmitted in CORESET #0 are quasi co-located (QCLed). The UE may receive SI through DCI transmitted in CORESET #0. The UE may acquire configuration information related to an RA channel (RACH) required for initial access from the received SI. The UE may transmit a physical RACH (PRACH) to the BS in consideration of the selected synchronization signal/PBCH block index, and the BS receiving the PRACH may acquire the synchronization signal/PBCH block index selected by the UE. The BS may know which block is selected by the UE from among the synchronization signal/PBCH blocks and that CORESET #0 related thereto is monitored.

PDCCH: Related to DCI

In a 5G system, scheduling information for UL data (or a physical UL data channel (e.g., a PUSCH)) or DL data (or a physical DL data channel (e.g., a PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by a radio network temporary identifier (RNTI) corresponding to the ID of the UE. Depending on the purpose of the DCI message, e.g., a UE-specific data transmission, a power control command, or an RA response (RAR), different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct based on the CRC identification result.

For example, DCI for scheduling a PDSCH for SI may be scrambled by an SI-RNTI. DCI for scheduling a PDSCH for an RAR message may be scrambled by an RA-RNTI. DCI for scheduling a PDSCH for a paging message may be scrambled by a paging (P)-RNTI. DCI for notifying of a slot format indicator (SFI) may be scrambled by an SF-RNTI. DCI for notifying of transmit power control (TPC) maybe scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH, in which case the CRC may be scrambled by a C-RNTI. DCI format 0_0 in which the CRC is scrambled by the C-RNTI may include, e.g., the information shown below in Table 4.

TABLE 4

Identifier for DCI formats—[1] bit
Frequency domain resource assignment—
[[$\log_2(N_{RB}^{UL, BWP}(N_{RB}^{UL, BWP} + 1)/2)$]] bits
Time domain resource assignment—X bits
Frequency hopping flag—1 bit.
Modulation and coding scheme—5 bits
New data indicator—1 bit
Redundancy version—2 bits
HARQ process number—4 bits
TPC command for scheduled PUSCH—[2] bits
UL/SUL indicator—0 or 1 bit DCI format 0_1 may be used for non-fallback DCI for scheduling a PUSCH, in which case the CRC may be scrambled by a C-RNTI. DCI format 0_1 in which the CRC is scrambled by the C-RNTI may include, e.g., the information shown below in Table 5.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, [$N_{RB}^{UL,BWP}/P$] bits
For resource allocation type 1, [$\log_2(N_{RB}^{UL,BWP}(N_{RB}^{UL,BWP} + 1)/2)$] bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;

TABLE 5-continued 1 bit otherwise.
    Modulation and coding scheme - 5 bits
    New data indicator - 1 bit
    Redundancy version - 2 bits
    HARQ process number - 4 bits
    1st downlink assignment index - 1 or 2 bits
1 bit for semi-static HARQ-ACK codebook;
2 bits for dynamic HARQ-ACK codebook with single HARQ-ACK codebook.
    2nd downlink assignment index - 0 or 2 bits
2 bits for dynamic HARQ-ACK codebook with two HARQ-ACK sub-codebooks;
0 bit otherwise.
    TPC command for scheduled PUSCH - 2 bits SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
    Precoding information and number of layers - up to 6 bits
    Antenna ports - up to 5 bits
    SRS request - 2 bits
    CSI request - 0, 1, 2, 3, 4, 5, or 6 bits
    CBG transmission information - 0, 2, 4, 6, or 8 bits
    PTRS-DMRS association - 0 or 2 bits.
    beta_offset indicator - 0 or 2 bits
    DMRS sequence initialization - 0 or 1 bit DCI format 1_0 may be used for fallback DCI for scheduling a PDSCH, in which case the CRC may be scrambled by a C-RNTI. DCI format 1_0 in which the CRC is scrambled by the C-RNTI may include, e.g., the information shown below in Table 6.

TABLE 6

Identifier for DCI formats—[1] bit
Frequency domain resource assignment - $\lceil \log_2(N_{RB}^{DL,\,BWP}(N_{RB}^{DL,\,BWP}+1)/2) \rceil$ bits
Time domain resource assignment—X bits
VRB-to-PRB mapping—1 bit.
Modulation and coding scheme—5 bits
New data indicator—1 bit
Redundancy version—2 bits
HARQ process number—4 bits
Downlink assignment index—2 bits
TPC command for scheduled PUCCH—[2] bits
PUCCH resource indicator—3 bits
PDSCH-to-HARQ feedback timing indicator—[3] bits DCI format 1_1 may be used for non-fallback DCI for scheduling a PDSCH, in which case the CRC may be scrambled by a C-RNTI. DCI format 1_1 in which the CRC is scrambled by the C-RNTI may include, e.g., the information shown below in Table 7.

TABLE 7

Carrier indicator—0 or 3 bits
Identifier for DCI formats—[1] bits
Bandwidth part indicator—0, 1 or 2 bits
Frequency domain resource assignment
For resource allocation type 0, $\lceil N_{RB}^{DL,\,BWP}/P \rceil$ bits
For resource allocation type 1. $\lceil \log_2(N_{RB}^{DL,\,BWP}(N_{RB}^{DL,\,BWP}+1)/2) \rceil$ bits
Time domain resource assignment—1, 2, 3, or 4 bits
VRB-to-PRB mapping—0 or 1 bit, only for resource allocation type 1.

Figure 4:
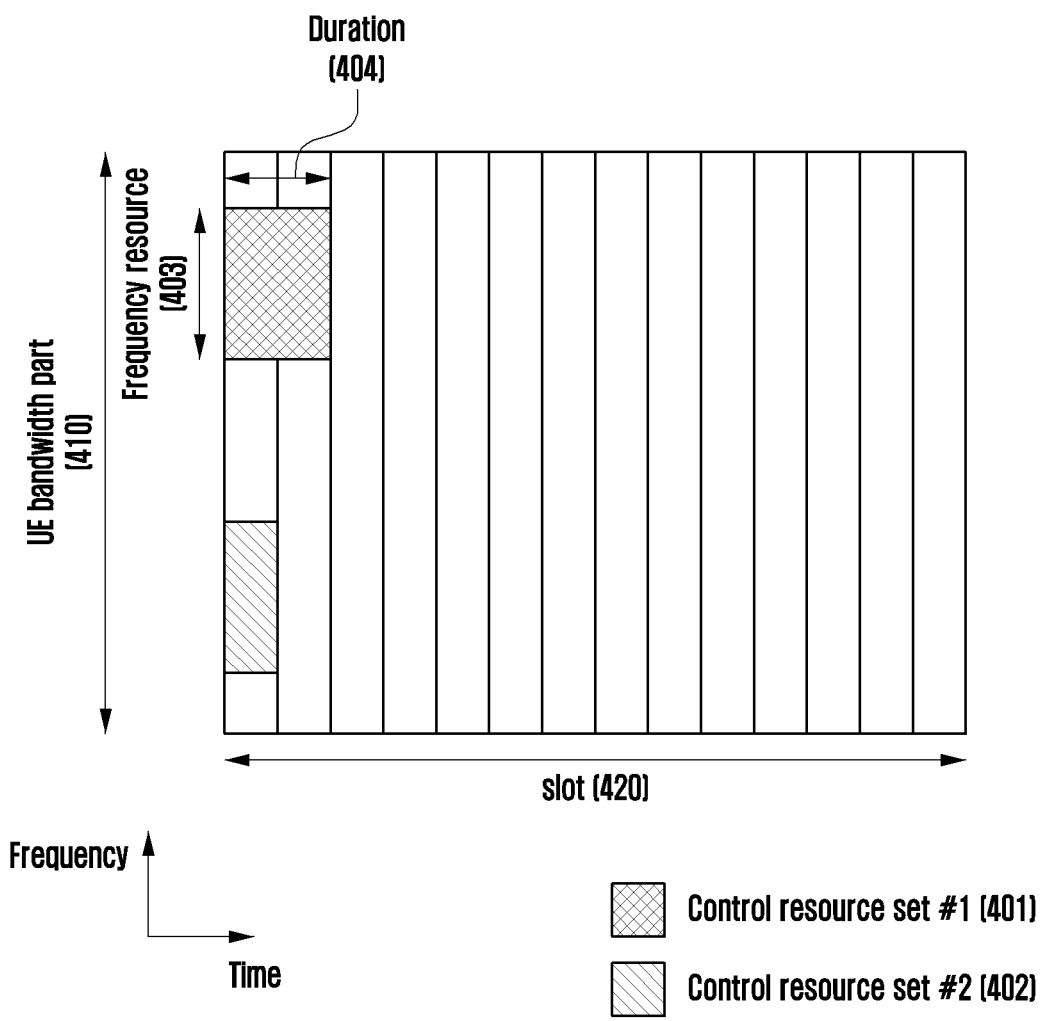
FIG. 4 illustrates a configuration of a control region of a DL control channel in a wireless communication system, according to an embodiment of the disclosure.

TABLE 7-continued 0 bit if only resource allocation type 0 is configured;
1 bit otherwise.
PRB bundling size indicator—0 or 1 bit
Rate matching indicator—0, 1, or 2 bits
ZP CSI-RS trigger—0, 1, or 2 bits
For transport block 1:
Modulation and coding scheme—5 bits
New data indicator—1 bit
Redundancy version—2 bits
For transport block 2:
Modulation and coding scheme—5 bits
New data indicator—1 bit
Redundancy version—2 bits
HARQ process number—4 bits
Downlink assignment index—0 or 2 or 4 bits
TPC command for scheduled PUCCH—2 bits
PUCCH resource indicator—3 bits
PDSCH-to-HARQ feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit PDCCH: CORESET, REG, CCE, Search Space FIG. 4 illustrates a configuration of a control region of a DL control channel in a wireless communication system, according to an embodiment of the disclosure. That is, FIG. 4 illustrates an example of a CORESET in which a DL control channel is transmitted in a 5G wireless communication system.

Referring to FIG. 4. a UE BWP 410 is configured in the frequency axis and CORESET #1 401 and CORESET #2 402 are configured within 1 slot 420 in the time axis. The CORESETs 401 and 402 may be configured in specific frequency resources 403 within a total UE BWP 410 in the frequency axis. The CORESET may be configured as one or a plurality of OFDM symbols in the time axis, which may be defined as a CORESET duration 404.

CORESET #1 401 may be configured as a CORESET duration of 2 symbols, and CORESET #2 402 may be configured as a CORESET duration of symbol.

The CORESETs in the 5G system may be configured through higher layer signaling (for example, an SIB, an MIB, or RRC signaling) in the UE by the BS. Configuring the CORESET in the UE may mean providing information such as a CORESET ID, a frequency location of the CORESET, and a symbol length of the CORESET. For example, the information shown below in Table 8 may be included.

TABLE 8

```
ControlResourceSet ::=                                          SEQUENCE {
        -- Corresponds to L1 parameter 'CORESET-ID'
        controlResourceSetId
        ControlResourceSetId,
        (control resource set identity)
        frequency DomainResources                               BIT   STRING
(SIZE (45)),
    (frequency axis resource allocation information)
        duration
        INTEGER (1..maxCoReSetDuration),
    (time axis resource allocation information)
        cce-REG-MappingType
            CHOICE {
    (CCE-to-REG mapping scheme)
                interleaved
        SEQUENCE {
                    reg-BundleSize
            ENUMERATED {n2, n3, n6},
            (REG bundle size)
                    precoderGranularity
            ENUMERATED {sameAsREG-bundle, allContiguousRBs},
                    interleaverSize
            ENUMERATED {n2, n3, n6}
                    (interleaver size)
                    shiftIndex
            INTEGER(0..maxNrofPhysicalResourceBlocks-1)
                                    OPTIONAL
                (interleaver shift)
        },
        nonInterleaved                                          NULL
        },
        tci-StatesPDCCH
        SEQUENCE(SIZE (1..maxNrofTCI-StatesPDCCH)) OF TCI-StateId
                                    OPTIONAL,
        (QCL configuration information)
        tci-PresentInDCI                                        ENUMERATED
{enabled}
                        OPTIONAL,       -- Need S
    }
```

In Table 8, tci-StatesPDCCH (referred to as a transmission configuration indication (TCI) state) configuration information may include information on one or a plurality of synchronization signal/PBCH block indexes or CSI-RS indexes having the QCL relationship with a DMRS transmitted in the corresponding CORESET.

Figure 5:
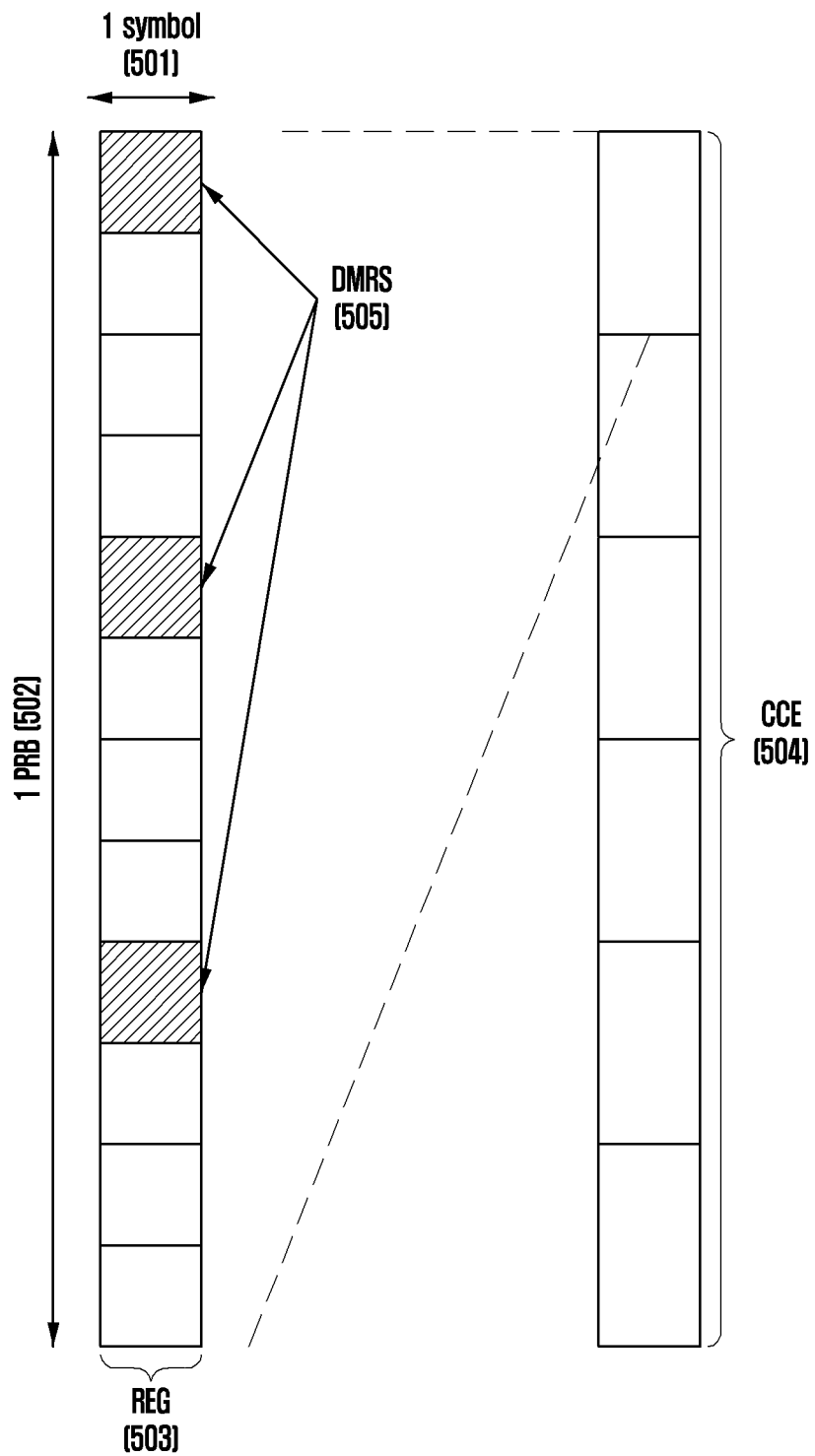
FIG. 5 illustrates a DL control channel in a wireless communication system, according to an embodiment of the disclosure.

FIG. 5 illustrates a DL control channel in a wireless communication system, according to an embodiment of the disclosure. More specifically, FIG. 5 illustrates an example of a basic unit of time and frequency resources included in a DL control channel which can be used in a 5G system.

Referring to FIG. 5, the basic unit of time and frequency resources included in the control channel may be a resource element group (REG) 503, which may be defined as 1 OFDM symbol 501 in the time axis and 1 PRB 502 in the frequency axis, that is, as 12 subcarriers. The BS may configure a DL control channel allocation unit by concatenating the REGs 503.

As illustrated in FIG. 5, when the basic unit for allocation of the DL control channel in the 5G system is a control channel eminent (CCE) 504, 1 CCE 504 may include a plurality of REGs 503. As an example, the REG 503 may include 12 REs and, when 1 CCE 504 includes 5 REGs 503, 1 CCE 504 may include 72 REs. When a DL CORESET is configured, the corresponding area may include a plurality of CCEs 504, and a specific DL control channel may be mapped to one or a plurality of CCEs 504 according to an aggregation level (AL) within the CORESET and then transmitted. CCEs 504 within the CORESET may be distinguished by numbers and the numbers of the CCEs 504 may be assigned according to a logical mapping scheme.

The basic unit of the DL control channel illustrated in FIG. 5, i.e., the REG 503, may include all of the REs to which the DCI is mapped and the areas to which DMRSs 505, which are RSs for decoding the REs, are mapped. 3 DMRSs 505 may be transmitted in 1 REG 503 The number of CCEs required to transmit the PDCCH may be 1, 2, 4, 8, or 15 according to the AL, and the different number of CCEs may be used to implement link adaptation of the DL control channel. For example, if AL=L, one DL control channel may be transmitted through L CCEs. The UE should detect a signal in the state in which the UE does not know information on the DL control channel, and a search space (SS) indicating a set of CCEs is defined to perform blind decoding (BD) in a wireless communication system (e.g., a 5G or NR system). The SS is a set of DL control channel candidates including CCEs for which the UE should attempt decoding at the given AL, and there are several ALs at which one set of CCEs is configured by 1, 2, 4, 8, and 16 CCEs, so that the UE may have a plurality of SSs. An SS set may be defined as a set of SSs at all of the configured ALs.

The SS may be classified into a common SS and a UE-specific SS. UEs in a predetermined group or all UEs may search for a common SS of the PDCCH in order to receive cell-common control information such as dynamic scheduling for SI or paging messages. For example, PDSCH scheduling allocation information for transmission of an SIB including information on a service provider of a cell may be received by searching for (monitoring) a common SS of the PDCCH. In the case of the common SS, UEs in a predetermined group or all UEs should receive the PDCCH, so that the common-SS may be defined as a set of pre-arranged CCEs. Scheduling allocation information for the UE-specific PDSCH or PUSCH may be received by searching for a UE-specific SS of the PDCCH. The UE-specific SS may be UE-specifically defined as a UE ID and a function of various system parameters.

A parameter for an SS of a PDCCH in a wireless communication system (e.g., a 5G or NR system) may be configured in the UE by the BS through higher-layer signaling (e.g., SIB, MIB, or RRC signaling).

For example, the BS may configure, in the UE, the number of PDCCH candidates at each AL L, a monitoring period of the SS, a monitoring occasion in units of symbols within the slot for the SS, an SS type, i.e., a common SS or a UE-specific SS, a combination of a DCI format and an RNTI to be monitored in the corresponding SS, and a CORESET index for monitoring the SS. For example, the information shown below in Table 9 may be included in the information configured by the BS.

TABLE 9

```
SearchSpace                                ::= SEQUENCE {
    -- Identity of the search space. SearchSpaceId = 0 identifies the
SearchSpace configured via PBCH (MIB) or ServingCellConfigCommon.
    searchSpaceId
        SearchSpaceId,
    (search space identifier)
        controlResourceSetId
        ControlResourceSetId,
    (control resource set identifier)
        monitoringSlotPeriodicityAndOffset     CHOICE {
    (monitoring slot level period)
            sl1
    NULL,
            sl2
    INTEGER (0..1),
            sl4
    INTEGER (0..3),
            sl5
    INTEGER (0..4),
            sl8
    INTEGER (0..7),
            sl10
    INTEGER (0..9),
            sl16
    INTEGER (0..15),
            sl20
    INTEGER (0..19)
        }
                                            OPTIONAL,
    duration (monitoring length)            INTEGER (2..2559)
        monitoringSymbolsWithinSlot            BIT
STRING (SIZE (14))
                                            OPTIONAL,
    (monitoring symbol within slot)
        nrofCandidates
        SEQUENCE {
    (number of PDCCH candidates at each aggregation level)
            aggregationLevel1
            ENUMERATED {n0, n1, n2, n3, n4, n5, n6, n8},
            aggregationLevel2
            ENUMERATED {n0, n1, n2, n3, n4, n5, n6, n8},
            aggregationLevel4
            ENUMERATED {n0, n1, n2, n3, n4, n5, n6, n8},
            aggregationLevel8
            ENUMERATED {n0, n1, n2, n3, n4, n5, n6, n8},
            aggregationLevel16
            ENUMERATED {n0, n1, n2, n3, n4, n5, n6, n8}
        },
        searchSpace Type                       CHOICE
{
    (search space type)
        -- Configures this search space as common search space
(CSS) and DCI formats to monitor.
            common
        SEQUENCE {
    (common search space)
```

TABLE 9-continued

```
        }
        ue-Specific
        SEQUENCE {
    (UE-specific search space)
            -- Indicates whether the UE monitors in this USS
for DCI formats 0-0 and 1-0 or for formats 0-1 and 1-1.
            formats
            ENUMERATED {formats0-0-And-1-0, formats0-1-And-1-1},
            ...
        }
```

The BS may configure one or more SS sets in the UE according to configuration information. The BS may configure SS set 1 and SS set 2 in the UE, and the configuration may be performed such that DCI format A scrambled by an X-RNTI (e.g., a first RNTI) in SS set 1 is monitored in the common SS and DCI format B scrambled by a Y-RNTI (e.g., a second RNTI) in SS set 2 is monitored in the UE-specific SS.

According to configuration information, one or more SS sets may exist in the common SS or the UE-specific SS. For example, SS set #1 and SS set #2 may be configured as common SSs, and SS set #3 and SS set #4 may be configured as UE-specific SSs.

In the common SS, the following combinations of DCI formats and RNTIs may be monitored. Of course, the disclosure is not limited to the following examples.

DCI format 0_0/1_0 with CRC scrambled by cell-RNTI (C-RNTI), configured scheduling (CS)-RNTI, semi-persistent (SP)-CSI-RNTI, RA-RNTI, temporary cell (TC)-RNTI, P-RNTI, and SI-RNTI;

DCI format 2_0 with CRC scrambled by SFI-RNTI;

DCI format 2_1 with CRC scrambled by interruption (INT)-RNTI;

DCI format 2_2 with CRC scrambled by TPC-PUSCH-RNTI and TPC-PUCCH-RNTI; and

DCI format 2_3 with CRC scrambled by TPC-SRS-RNTI.

In the UE-specific SS, the following combinations of DCI formats and RNTIs may be monitored. Of course, the disclosure is not limited to the following examples.

DCI format 0_0/1_0 with CRC scrambled by C-RNTI, CS-RNTI, and TC-RNTI; and

DCI format 1_0/1_1 with CRC scrambled by C-RNTI, CS-RNTI, and TC-RNTI.

The described RNTIs may follow the following definitions and uses.

C-RNTI: used for scheduling UE-specific PDSCH;

TC-RNTI: used for UE-specific PDSCH scheduling;

CS-RNTI: used for semi-statically configured UE-specific PDSCH scheduling;

RA-RNTI: used for PDSCH scheduling at RA stage;

P-RNTI: used for PDSCH scheduling through which paging is transmitted;

SI-RNTI: used for PDSCH scheduling through which SI is transmitted;

INT-RNTI: used for indicating whether puncturing is performed for PDSCH;

TPC for PUSCH RNTI (TPC-PUSCH-RNTI): used for indicating PUSCH power control command;

TPC for PUCCH RNTI (TPC-PUCCH-RNTI): used for indicating PUCCH power control command;

TPC for SRS RNTI (TPC-SRS-RNTI): used for indicating SRS power control command;

The DCI formats may follow the definition shown below in Table 10.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A CORESET p and an SS of an AL L in an SS set s in a wireless communication system (e.g., a 5G or NR system) may be expressed as shown below in Equation (1).

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{Equation (1)}$$

L: AL;
$n_{CI}$: carrier index;
$N_{CCE,p}$: total number of CCEs existing within CORESET p;
$n^\mu_{s,f}$: slot index;
$M_{s,max}^{(L)}$: number of PDCCH candidates at AL L;
$m_{s,n_{CI}}$ 32 0, . . . , $M_{s,max}^{(L)}$−1, PDCCH candidate index of AL L;
i=0, . . . , L−1;
$Y_{p,n_{s,f}^\mu} = (A_p \cdot Y_{p,n_{s,f}^\mu-1})$ mod D, $Y_{p,-1}=n_{RNTI} \neq 0$, $A_p=39827$ for pmod3=0, $A_p=39829$ for pmod3=1, A, =39839 for pmod3=2, D=65537
$n_{RNTI}$: terminal ID
For a common SS, $Y_{p,n_{s,f}^\mu}=0$.
For a UE-specific SS, the value of Y, may correspond to a value varying depending on the terminal's ID (a C-RNTI or an ID configured for the terminal by the BS) and the time index.

In a wireless communication system (e.g., a 5G or NR system), a set of SS sets monitored by the UE at every time point may vary as a plurality of SS sets can be configured as different parameters (e.g., the parameters in Table 9). When SS set #1 is configured on an X-slot period, SS set #2 is configured on a Y-slot period, and X and Y are different from each other. The UE may monitor all of SS set #1 and SS set #2 in a specific slot and monitor one of SS set #1 and SS set #2 in another specific slot.

PDCCH: BD/CCE Limit

If a plurality of SS sets are configured in the UE, a method of determining an SS set which the UE should monitor may be based on "Condition 1" and "Condition 2".

If the UE receives a configuration of a value of monitoringCapabilityConfig-r16, which is higher-layer signaling as r15monitoringcapability, the UE defines the number of PDCCH candidates that can be monitored and a maximum value for the number of CCEs included in entire SSs (indicating a set of entire CCE sets corresponding to a union area of a plurality of SS sets). When the UE receives a configuration of a value of monitoringCapabilityConfig-r16 as r16monitoringcapability, the UE may define the number of PDCCH candidates that can be monitored and a maximum value for the number of CCEs included in entire SSs (indicating entire CCE sets corresponding to a union area of a plurality of SS sets) for each span.

Condition 1 refers to limits on a maximum number of PDCCH candidates.

In a cell in which SCS is configured as $15 \cdot 2^\mu$ kHz, the maximum number of PDCCH candidates that the UE can monitor according to the configuration value of higher-layer signaling, as described above, follows Table 11, shown below, when the maximum number of PDCCH candidates $M^\mu$ is defined based on a slot or Table 12, shown below, when the maximum number $M^\mu$ of PDCCH candidates is defined based on a span.

TABLE 11

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 12

| | Maximum number $M^\mu$ of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

Condition 2 refers to limits on a maximum number of CCEs.

In a cell in which SCS is configured as 15.21, kHz, the maximum number of CCEs included in the entire SSs (indicating a set of entire CCE sets corresponding to a union area of a plurality of SS sets) according to the configuration value of higher-layer signaling, as described above, follows Table 13 when the maximum number $C^\mu$ of CCEs is defined based on a slot or Table 14, shown below, when the maximum number $C^\mu$ of CCEs is defined based on a span.

TABLE 13

| μ | Maximum number of non-overlapped CCEs per slot and per serving cell (Cμ) |
|---|---|
| 0 | 56 |
| 3 | 56 |
| 2 | 48 |
| 3 | 32 |

TABLE 14

| | Maximum number Cμ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For convenience of description, a situation satisfying both Conditions 1 and 2 at a specific time point is defined herein as "Condition A". Accordingly, not satisfying Condition A indicates that at least one of Conditions 1 or 2 is not satisfied.
PDCCH: Overbooking Condition A may not be satisfied at a specific time point according to a configuration of SS sets by the BS. If condition A is not satisfied at a specific time point, the UE may select and monitor only some of the SS sets configured to satisfy condition A at the corresponding time point, and the BS may transmit the PDCCH through the selected SS sets.

The following method may be applied as a method of selecting some of the configured SS sets.

If Condition A for the PDCCH is not satisfied at a specific time point (slot), the UE (or the BS) may select an SS set of which an SS type is configured as a common-SS among SS sets existing at the corresponding time point in preference to an SS set of which an SS type is configured as a UE-specific SS.

If SS sets configured as the common-SS are all selected (i.e., if condition A is satisfied even after all SSs configured as the common-SS are selected), the UE (or BS) may select SS sets configured as the UE-specific SS. If the number of SS sets of configured as the UE-specific SS is plural, an SS set having a lower SS set index may have a higher priority. UE-specific SS sets may be selected within a range in which condition A is satisfied in consideration of the priority.
Related to Rate Matching/Puncturing In the following description, a rate matching operation and a puncturing operation are described in detail When a time and frequency resources A at which a predetermined symbol sequence A is transmitted overlaps with a predetermined time and frequency resources B, a rate matching or puncturing operation may be considered as a transmission/reception operation of a channel A considering of resources C in an area in which the resources A and the resources B overlap each other.
Rate Matching Operation The BS may map and transmit the channel A only for the remaining resource areas, except for the resources C corresponding to the area in which the entire resources A for transmitting the symbol sequence A to the UE overlap the resources B. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may sequentially map the symbol sequence A to the remaining resources {resource #1, resource #2, resource #4}, except for {resource #3}corresponding to the resources C among the resources A, and transmit the same. As a result, the BS may map the symbol sequence {symbol #1, symbol #2, symbol #3} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on an assumption that the symbol sequence A is mapped to and transmitted in the remaining areas, except for the resources C among the entire resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may receive the symbol sequence A based on the assumption that the symbol sequence A is sequentially mapped to the remaining resources {resource #1, resource #2, resource #4}, except for {resource #3} corresponding to the resources C among the resources A. As a result, the UE may perform a series of reception operations based on the assumption that the symbol sequence {symbol #1, symbol #2, symbol #3} is mapped to and transmitted in {resource #1, resource #2, resource #4}, respectively.
Puncturing Operation When there are resources C corresponding to an area in which the entire resources A for transmitting the symbol sequence A to the UE overlap the resources B, the BS may map the symbol sequence A to all the resources A, but may perform transmission only in the remaining resource areas, except for the resources C among the resources A, without transmission in a resource area corresponding to the resources C. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may map the symbol sequence A includes {symbol #1, symbol #2, symbol #3, symbol #4} to the resources A {resource #1, resource #2, resource #3, resource #4}, respectively, and transmit only the symbol sequence {symbol #1, symbol #2, symbol #4} corresponding to the remaining resources {resource #1, resource #2, resource #4}, except for {resource #3} corresponding to the resources C among the resources A, without transmission of {symbol #3} mapped to {resource #3} corresponding to the resources C. As a result, the BS may map the symbol sequence {symbol #1, symbol #2, symbol #4} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on an assumption that the symbol sequence A is mapped to the entire resources A, but is transmitted only in the remaining areas, except for the resources C among the resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may assume that the symbol sequence A {symbol #1, symbol #2, symbol #3, symbol #4} is mapped to the resources A {resource #1, resource #2, resource #3, resource #4}, respectively, but {symbol #3} mapped to {resource #3} corresponding to the resources C is not transmitted, and may perform reception based on the assumption that the symbol sequence {symbol #1, symbol #2, symbol #4} corresponding to the remaining resources {resource #1, resource #2, resource #4}, except for {resource #3} corresponding to the resources C among the resources A, is mapped and transmitted. As a result, the UE may perform a series of reception operations based on the assumption that the symbol sequences {symbol #1, symbol #2, symbol #4} are mapped to and transmitted in {resource #1, resource #2, resource #4}, respectively.

In the following description, a method of configuring rate matching resources for the purpose of rate matching in the 5G communication system is described. Rate matching refers to the control of the size of a signal in consideration of the amount of resources available for transmitting the signal. For example, rate matching of a data channel may include mapping data channels to specific time and frequency resource domains without transmission, so as to control the size of data according thereto.

Figure 6:
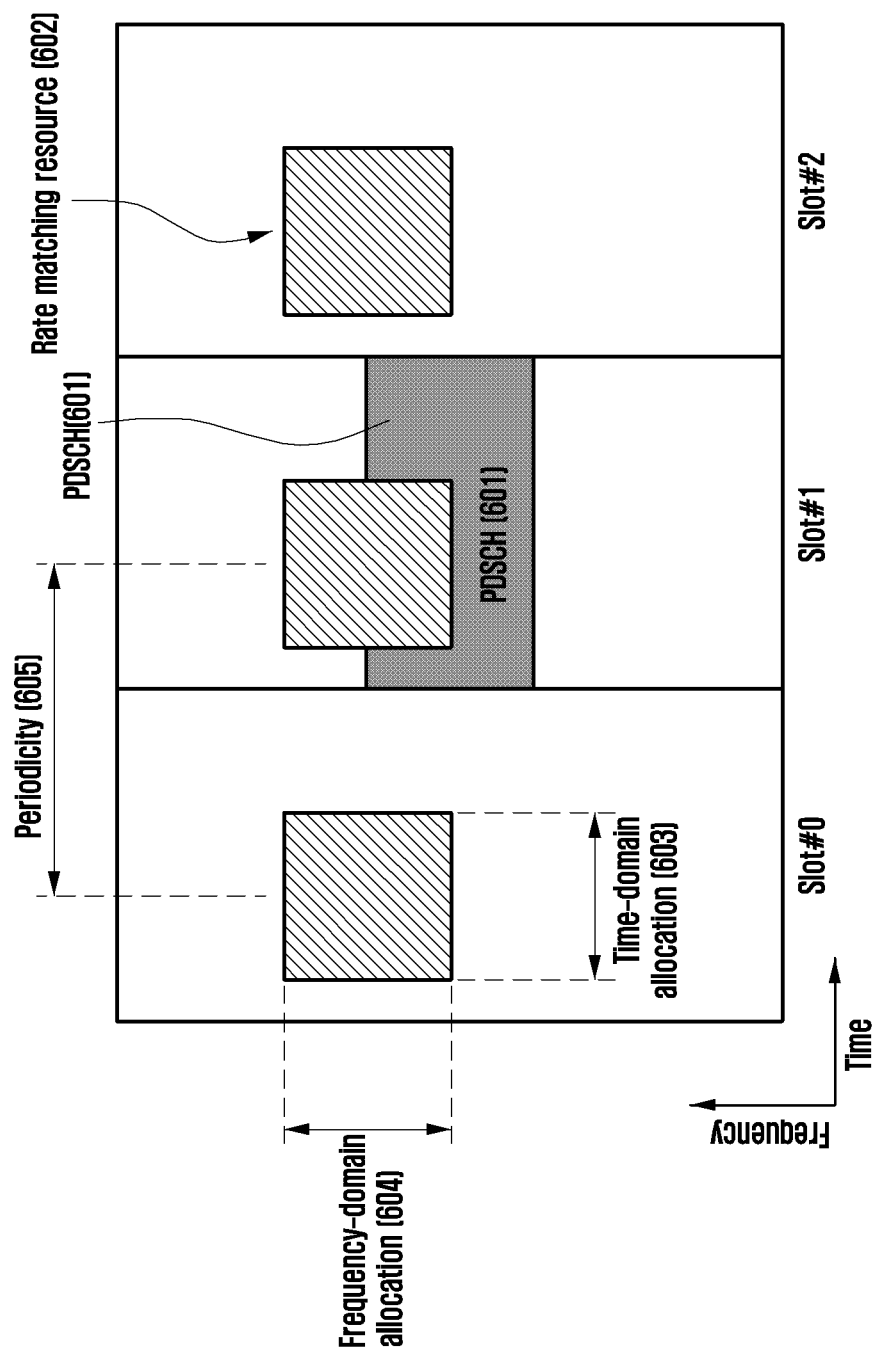
FIG. 6 illustrates a method for a BS and a terminal to transmit and receive data in consideration of a DL data channel and a rate matching resource in a wireless communication system according to an embodiment of the disclosure.

FIG. 6 illustrates a method for a BS and a UE to transmit and receive data in consideration of a DL data channel and rate matching resources according to an embodiment.

Referring to FIG. 6, a DL data channel (e.g., a PDSCH) 601 and a rate matching resource 602 are illustrated. The BS may configure one or a plurality of rate matching resources 602 in the UE through higher layer signaling (e.g., RRC signaling). The rate matching resource 602 configuration information may include time axis resource allocation information 603, frequency axis resource allocation information 604, and period information 605. In the following description, a bitmap corresponding to the frequency axis resource allocation information 604 is referred to as a "first bitmap", a bitmap corresponding to the time axis resource allocation information 603 is referred to as a "second bitmap", and a bitmap corresponding to the period information 605 is referred to as a "third bitmap". When all or some of the time and frequency resources of the scheduled data channel 601 overlap the configured rate matching resources 602, the BS may rate-match the data channel 601 in the part of the rate matching resources 602 and transmit the data channel, and the UE may perform reception and decoding on the basis of the assumption that the data channel 601 is rate-matched in the part of the rate matching resources 602.

The BS may dynamically notify the UE of whether to rate-match the data channel in the configured rate matching resource part through an additional configuration (corresponding to a "rate matching indicator" in the above-described DCI format). Specifically, the BS may select some of the configured rate matching resources, group the selected rate matching resources into a rate matching resource group, and inform the UE of whether to perform rate matching on the data channel for each rate matching resource group through DCI using a bitmap scheme.

For example, when 4 rate matching resources, RMR #1, RMR #2, RMR #3, and RMR #4 are configured, the BS may configure rate matching groups RMG #1={RMR #1, RMR #2} and RMG #2={RMR #3, RMR #4}, and inform the UE of whether to perform rate matching in each of RMG #1 and RMG #2 by using 2 bits within a DCI field. For example, "1" may be indicated when rate matching should be performed, and "0" may be indicated when rate matching should not be performed.

In the 5G system, granularity at an "RB symbol level" and an "RE level" is supported as a method of configuring the rate matching resource in the UE. More specifically, the following configuration method may be used.

RB Symbol Level

The UE may receive a configuration of a maximum of 4 RateMatchPatterns through higher layer signaling, and one RateMatchPattern may include the following content.

As reserved resources within a BWP, resources in which time and frequency resource areas of the corresponding reserved resources are configured by a combination of a bitmap at an RB level and a bitmap at a symbol level in the frequency axis may be included. The reserved resources may span one or two slots. A time domain pattern (periodicityAndPattern) in which the time and frequency domains including a pair of bitmaps at the RB level and the symbol level are repeated may be additionally configured.

Time and frequency domain resource areas configured as CORESETs within the BWP and resource areas corresponding to a time domain pattern configured as an SS configuration in which the corresponding resource areas are repeated may be included.

RE Level

The UE may receive a configuration of the following content through higher layer signaling.

As configuration information for REs corresponding to an LTE cell-specific RS or common RS (CRS) pattern, the number of LTE CRS ports (nrofCRS-Ports), values of LTE-CRS-vshift(s) (v-shift), information on a center subcarrier location (carrierFreqDL) of an LTE carrier from a frequency point that is a reference (e.g., reference point A), information on a bandwidth size of an LTE carrier (carrierBandwidthDL), subframe configuration information (mbsfn-SubframConfigList) corresponding to a multicast-broadcast single-frequency network (MBSFN), and the like may be included. The UE may determine the location of the CRS within the NR slot corresponding to the LTE subframe on the basis of the above-described information.

Configuration information for a resource set corresponding to one or a plurality of zero power (ZP) CSI-RSs within the BWP may be included.

Related to LTE CRS Rate Match

For the coexistence of LTE and NR (i.e., LTE-NR coexistence), NR provides a function of configuring a pattern of cell-specific reference signal (CRS) of LTE to an NR UE. More specifically, the CRS pattern may be provided by RRC signaling including at least one parameter within a ServingCellConfig information element (IE) or a ServingCellConfigCommon IE. The parameters may be, for example, lte-CRS-ToMatchAround, lte-CRS-PatternList1-r16, lte-CRS-PatternList2-r16, crs-RateMatch-PerCORESETPoolIndex-r16, etc.

In Rel-15 NR, a function of configuring one CRS pattern per serving cell may be provided through the parameter lte-CRS-ToMatchAround. In Rel-16 NR, the function is expanded to configure a plurality of CRS patterns per serving cell. More specifically, one CRS pattern per LTE carrier may be configured in a single-transmission and reception point (TRP) configuration UE, and two CRS patterns per LTE carrier may be configured in a multi-TRP configuration UE. For example, a maximum of three CRS patterns per serving cell may be configured in the single-TRP configuration UE through the parameter lte-CRS-PatternList1-r16.

In another example, the CRS may be configured for each TRP in the multi-TRP configuration UE. That is, a CRS pattern for TRP1 may be configured through the parameter lte-CRS-PatternList1-r16, and a CRS pattern for TRP2 may be configured through the parameter lte-CRS-PatternList2-r16. When the two TRPs are configured, whether to apply all of the CRS patterns of TRP1 and TRP2 to a specific PDSCH or only the CRS pattern for one TRP is determined through the parameter crs-RateMatch-PerCORESETPoolIndex-r16, and only the CRS pattern of one TRP is applied when the parameter crs-RateMatch-PerCORESETPoolIndex-r16 is configured to be enabled and, otherwise, all of the CRS patterns of the two TRPs are applied.

Table 15 shows the ServingCellConfig IE including the CRS pattern, and Table 16 shows the RateMatchPatternLTE-CRS IE including at least one parameter for the CRS pattern.

TABLE 15

| ServingCellConfig ::= | SEQUENCE { | |
|---|---|---|
| tdd-UL-DL-ConfigurationDedicated | | TDD-UL-DL-ConfigDedicated |

TABLE 15-continued

```
OPTIONAL,  -- Cond TDD
        initialDownlinkBWP                  BWP-DownlinkDedicated
OPTIONAL,  -- Need M
        downlinkBWP-ToReleaseList           SEQUENCE (SIZE
(1..maxNrofBWPs))                  OF                  BWP-Id
OPTIONAL,  -- Need N
        downlinkBWP-ToAddModList            SEQUENCE (SIZE
(1..maxNrofBWPs))                  OF                  BWP-Downlink
OPTIONAL,  -- Need N
        firstActiveDownlinkBWP-Id                       BWP-Id
OPTIONAL,  -- Cond SyncAndCellAdd
        bwp-InactivityTimer                 ENUMERATED {ms2, ms3,
ms4, ms5, ms6, ms8, ms10, ms20, ms30,
                                                        ms40,ms50,
ms60, ms80,ms100, ms200,ms300, ms500,
                                                        ms750,
ms1280, ms 1920, ms2560, spare 10, spare9, spare8,
                                                        spare7,
spare6, spare5, spare4, spare3, spare2, spare1 }   OPTIONAL,   --Need R
        defaultDownlinkBWP-Id                           BWP-Id
OPTIONAL,  -- Need S
        uplinkConfig                                    UplinkConfig
OPTIONAL,  -- Need M
        supplementaryUplink                             UplinkConfig
OPTIONAL,  -- Need M
        pdcch-ServingCellConfig             SetupRelease { PDCCH-
ServingCellConfig }                                     OPTIONAL,  --
Need M
        pdsch-ServingCellConfig             SetupRelease { PDSCH-
ServingCellConfig }                                     OPTIONAL,  --
Need M
        csi-MeasConfig                      SetupRelease { CSI-
MeasConfig }                                            OPTIONAL,  --
Need M
        sCellDeactivationTimer              ENUMERATED {ms20, ms40,
ms80, ms160, ms200, ms240,
                                                        ms320,
ms400, ms480, ms520, ms640, ms720,
                                                        ms840,
ms1280,  spare2,spare1}             OPTIONAL,            -- Cond
ServingCellWithoutPUCCH
        crossCarrierSchedulingConfig        CrossCarrierSchedulingConfig
OPTIONAL,  -- Need M
        tag-Id                              TAG-Id,
        dummy                               ENUMERATED
{enabled}
OPTIONAL,  -- Need R
        pathlossReferenceLinking            ENUMERATED {spCell,
sCell}                                                  OPTIONAL,  --
Cond SCellOnly
        servingCellMO                       MeasObjectId
OPTIONAL,  -- Cond MeasObject
        ...,
        [[
        lte-CRS-ToMatchAround               SetupRelease
{ RateMatchPatternLTE-CRS }                             OPTIONAL,
-- Need M
        rateMatchPatternToAddModList        SEQUENCE (SIZE
(1..maxNrofRateMatchPatterns)) OF RateMatchPattern      OPTIONAL,  --
Need N
        rateMatchPatternToReleaseList       SEQUENCE (SIZE
(1..maxNrofRateMatchPatterns)) OF RateMatchPatternId    OPTIONAL  --
Need N
        downlinkChannelBW-PerSCS-List       SEQUENCE (SIZE
(1..maxSCSs)) OF SCS-SpecificCarrier                    OPTIONAL  -
- Need S
        ]],
        [[
        supplementaryUplinkRelease          ENUMERATED {true}
OPTIONAL,  -- Need N
        tdd-UL-DL-ConfigurationDedicated-IAB-MT-r16     TDD-UL-DL-
ConfigDedicated-IAB-MT-r16                              OPTIONAL,  --
Cond TDD_IAB
        dormantBWP-Config-r16               SetupRelease
{             DormantBWP-Config-r16                      }
OPTIONAL,  -- Need M
        ca-SlotOffset-r16           CHOICE {
            refSCS15kHz                     INTEGER (-2..2),
            refSCS30KHz                     INTEGER (-5..5),
            refSCS60KHz                     INTEGER (-10..10),
```

TABLE 15-continued

```
            refSCS120KHz                INTEGER (-20..20)
        }
OPTIONAL,  -- Cond AsyncCA
            channelAccessConfig-r16        SetupRelease
{ ChannelAccessConfig-r16 }               OPTIONAL,
-- Need M
            intraCellGuardBandsDL-List-r16    SEQUENCE (SIZE
(1..maxSCSs)) OF IntraCellGuardBandsPerSCS-r16    OPTIONAL, --
Need S
            intraCellGuardBandsUL-List-r16    SEQUENCE (SIZE
(1..maxSCSs)) OF IntraCellGuardBandsPerSCS-r16    OPTIONAL, --
Need S
            csi-RS-ValidationWith-DCI-r16     ENUMERATED {enabled}
OPTIONAL,  -- Need R
            lte-CRS-PatternList1-r16       SetupRelease { LTE-CRS-
PatternList-r16 }                         OPTIONAL,  -- Need M
            lte-CRS-PatternList2-r16       SetupRelease { LTE-CRS-
PatternList-r16 }                         OPTIONAL,  -- Need M
            crs-RateMatch-PerCORESETPoolIndex-r16    ENUMERATED
{enabled}                                 OPTIONAL,
-- Need R
            enableTwoDefaultTCI-States-r16    ENUMERATED {enabled}
OPTIONAL,  -- Need R
            enableDefaultTCI-StatePerCoresetPoolIndex-r16    ENUMERATED
{enabled}                                 OPTIONAL, --
Need R
            enableBeamSwitchTiming-r16     ENUMERATED {true}
OPTIONAL,  -- Need R
            cbg-TxDiffTBsProcessingType1-r16    ENUMERATED {enabled}
OPTIONAL,  -- Need R
            cbg-TxDiffTBsProcessingType2-r16    ENUMERATED {enabled}
OPTIONAL    -- Need R
        ]]
    }
```

TABLE 16

```
-  RateMatchPatternLTE-CRS
    The IE RateMatchPatternLTE-CRS is used to configure a pattern to rate
match around LTE CRS. See TS 38.214 [19], clause 5.1.4.2.
    RateMatchPatternLTE-CRS information element
    -- ASN1START
    -- TAG-RATEMATCHPATTERNLTE-CRS-START
    RateMatchPatternLTE-CRS ::=    SEQUENCE {
        carrierFreqDL              INTEGER (0..16383),
        carrierBandwidthDL         ENUMERATED {n6, n15,
n25, n50, n75, n100, spare2, spare1},
        mbsfn-SubframeConfigList             EUTRA-MBSFN-
SubframeConfigList
OPTIONAL,  -- Need M
        nrofCRS-Ports              ENUMERATED {n1, n2,
n4},
        v-Shift                    ENUMERATED {n0, n1,
n2, n3, n4, n5}
    }
    LTE-CRS-PatternList-r16 ::=    SEQUENCE (SIZE (1..maxLTE-
CRS-Patterns-r16)) OF RateMatchPatternLTE-CRS
    --TAG-RATEMATCHPATTERNLTE-CRS-STOP
    -- ASN1STOP
    RateMatchPatternLTE-CRS field descriptions
    carrierBandwidthDL
    BW of the LTE carrier in number of PRBs (see TS 38.214 [19], clause
5.1.4.2).
    carrierFreqDL
    Center of the LTE carrier (see TS 38.214 [19], clause 5.1.4.2).
    mbsfn-SubframeConfigList
    LTE MBSFN subframe configuration (see TS 38.214 [19], clause
5.1.4.2).
    nrofCRS-Ports
    Number of LTE CRS antenna port to rate-match around (see TS 38.214
[19], clause 5.1.4.2).
    v-Shift
    Shifting value v-shift in LTE to rate match around LTE CRS (see TS
38.214 [19], clause 5.1.4.2).
```

PDSCH: Related to Frequency Resource Allocation

Figure 7:
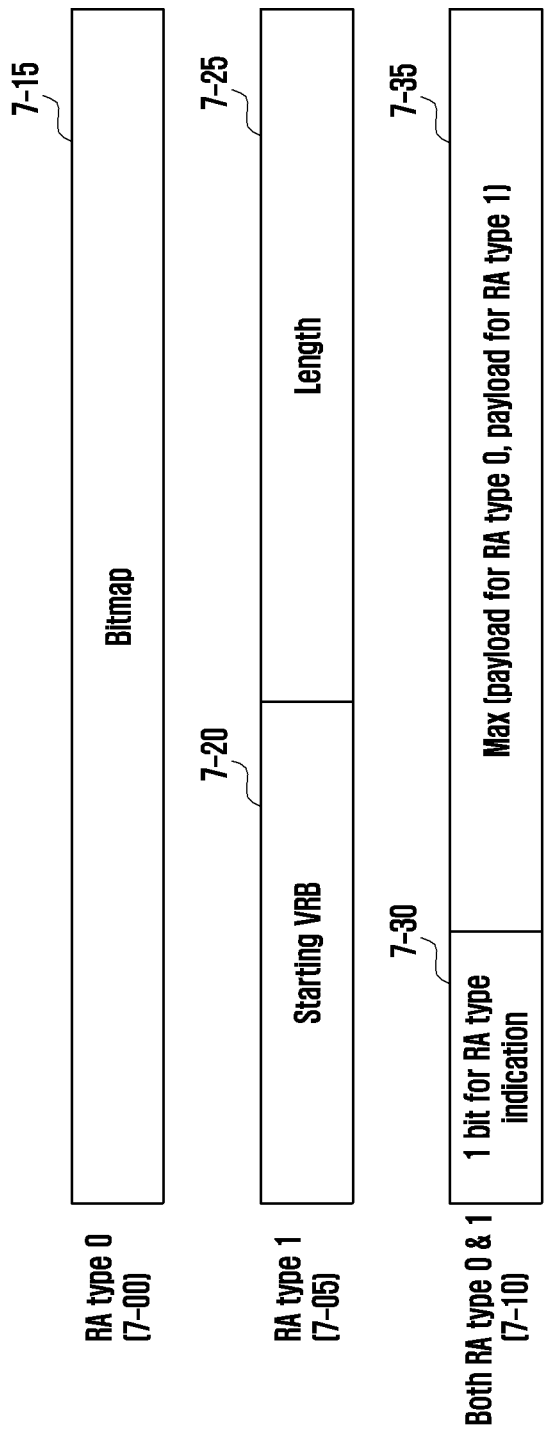
FIG. 7 illustrates frequency axis resource allocation of a PDSCH in a wireless communication system, according to an embodiment of the disclosure.

FIG. 7 illustrates frequency axis resource allocation of a PDSCH in a wireless communication system, according to an embodiment. More specifically, FIG. 7 illustrates three frequency axis resource allocation methods of type 0 7-00, type 1 7-05, and dynamic switch 7-10, which can be configured through a higher layer in the wireless communication system (e.g., a 5G system or NR system).

Referring to FIG. 7, when the UE is configured to use only resource type 0 through higher layer signaling as indicated by reference numeral 7-00, some pieces of DCI for allocating the PDSCH to the corresponding UE includes a bitmap of a number of resource block group (NRBG) bits. The NRBG may be determined as shown in Table 17, below, according to a BWP size allocated by a BWP indicator and a higher-layer parameter rbg-Size, and data is transmitted in an RBG indicated as 1 by the bitmap.

TABLE 17

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher layer signaling as indicated by reference numeral 7-05, some pieces of DCI for allocating the PDSCH to the corresponding UE includes frequency axis resource allocation information of $\rceil \log_2(N_{RB}^{DL,BWP}(N_{RB}^{DL,BWP}+1)/2\lfloor$ bits. The BS may configure a starting virtual RB(VRB) 7-20 and a length 7-25 of frequency axis resources allocated successively therefrom.

When the UE is configured to use both resource type 0 and resource type 1 through higher-layer signaling as indicated by reference numeral 7-10, some pieces of DCI for allocating the PDSCH to the corresponding UE includes frequency axis resource allocation information of bits of a larger value 7-35 among payload 7-15 for configuring resource type 0 and payload 7-20 and 7-25 for configuring resource type 1. At this time, one bit may be added to the first part (e.g., a most significant bit (MSB)) of the frequency axis resource allocation information within the DCI, and the use of resource type 0 may be indicated when the corresponding bit is "0" and the use of resource type 1 may be indicated when the corresponding bit is "1".

Related to Allocating Time Domain Resources for PDSCH/PUSCH

Hereinafter, a method of allocating time domain resources for a data channel in a wireless communication system (e.g., a 5G or NR system) according to an embodiment of the disclosure is described.

The BS may configure a table for time domain resource allocation information for a DL data channel (e.g., a PDSCH) and a UL data channel (e.g., a PUSCH) in the UE through higher-layer signaling (e.g., RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0 in Table 18) or PDCCH-to-PUSCH slot timing (corresponding to a time interval in units of slots between a time point at which a PDCCH is received and a time point at which a PUSCH scheduled by the received PDCCH is transmitted, and indicated by K2 in Table 19), a location and a length of a start symbol in which a PDSCH or a PUSCH is scheduled within the slot, and a mapping type of a PDSCH or a PUSCH. For example, information shown in Table 18 or Table 19, below, may be transmitted from the BS to the UE.

TABLE 18

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE
  K0 INTEGER (0..32
  OPTIONAL, --Need S
  (PDCCH-to-PDSCH timing, slot units)
  mapping type ENUMERATED {typeA, typeB},
  (PDSCH mapping type)
  startSymbolAndLength INTEGER (0..127)
  (Start symbol and length of PDSCH)
}

TABLE 19

PUSCH-TimeDomainResourceAllocationList information element

PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
  k2 INTEGER (0..32)
  OPTIONAL, --Need S
  (PDCCH-to-PUSCH timing, slot units)
  mapping type ENUMERATED {typeA, typeB},
  (PUSCH mapping type)
  startSymbolAndLength INTEGER (0..127)
  (Start symbol and length of PUSCH)
}

The BS may inform the UE of one of the entries in the table for the time domain resource allocation information through layer 1 (L1) signaling (e.g., DCI indicating a time domain resource allocation field). The UE may acquire time domain resource allocation information for a PDSCH or a PUSCH on the basis of the DCI received from the BS.

Figure 8:
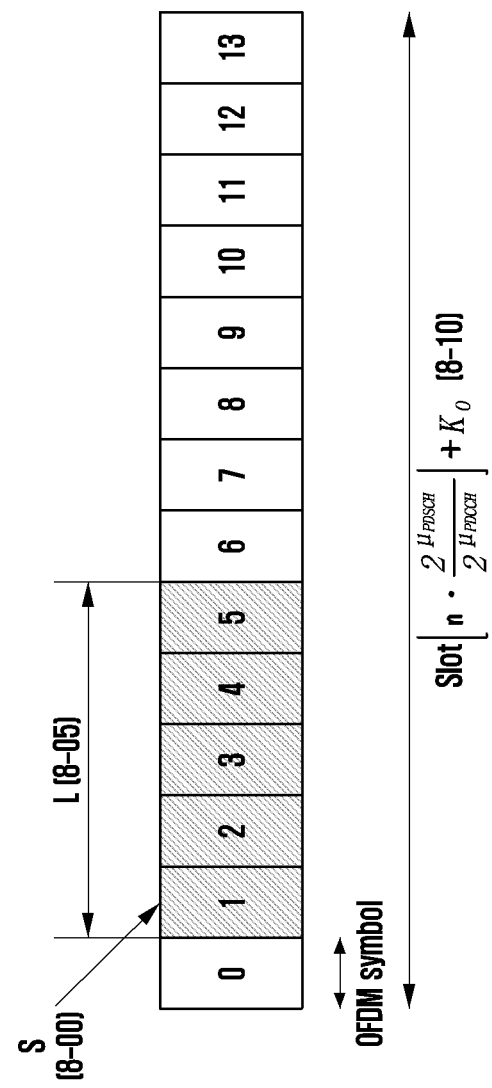
FIG. 8 illustrates allocation of time axis resources of a PDSCH in a wireless communication system, according to an embodiment of the disclosure.

FIG. 8 illustrates allocation of time axis resources of a PDSCH in a wireless communication system, according to an embodiment of the disclosure.

Referring to FIG. 8, the BS may indicate a time axis location of PDSCH resources according to SCS ($\mu_{PDSCH}$, $\mu_{PDCCH}$) of a data channel and a control channel configured using a higher layer, a scheduling offset (K0) value, and an OFDM symbol start location 8-00 and length 8-05 within one slot dynamically indicated through DCI.

Figure 9:
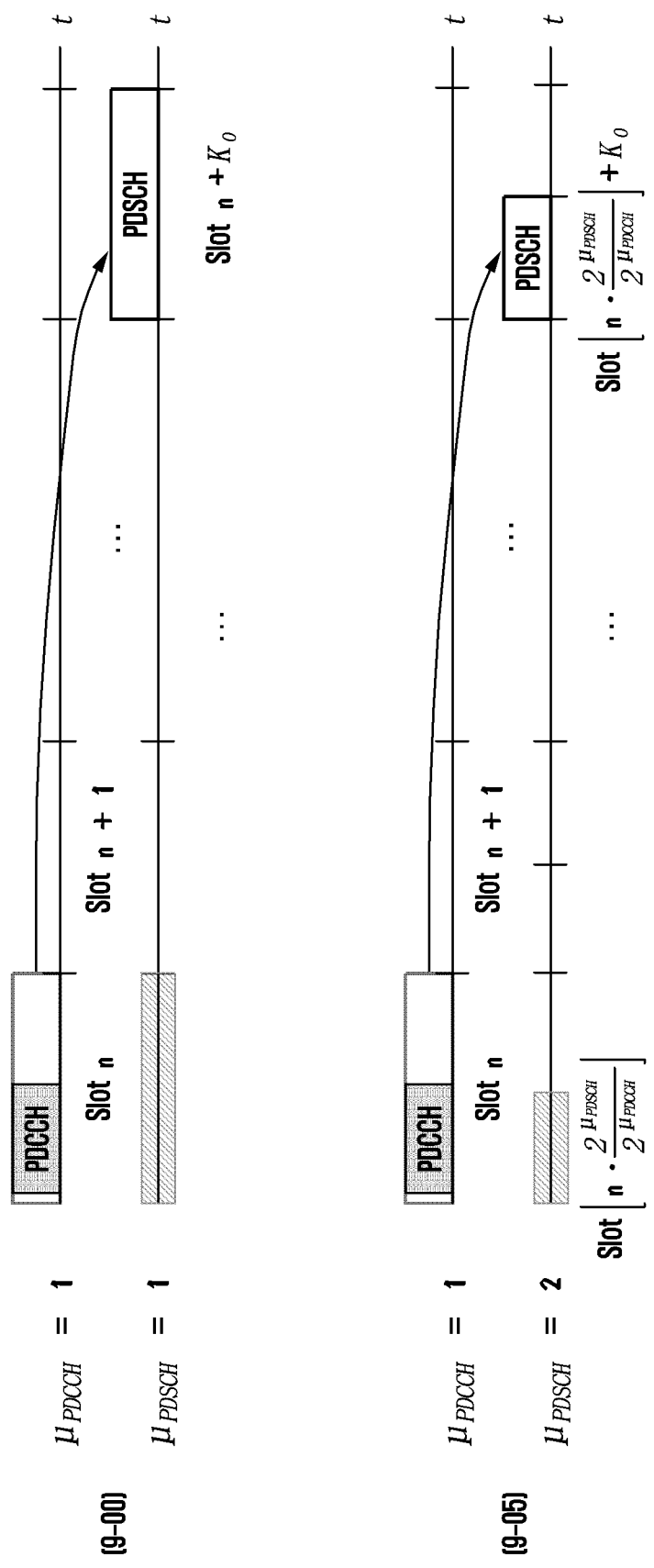
FIG. 9 illustrates allocation of time-axis resources according to SCS of a data channel and a control channel in a wireless communication system, according to an embodiment of the disclosure.

FIG. 9 illustrates allocation of time-axis resources according to SCS of a data channel and a control channel in a wireless communication system, according to an embodiment of the disclosure.

Referring to FIG. 9, when SCSs of a data channel and a control channel are the same as each other ($\mu_{PDSCH}=\mu_{PDCCH}$) as indicated by reference numeral 9-00, slot numbers for the data and the control are the same as each other, and thus the BS and the UE may generate a scheduling offset according to a predetermined slot offset K0. On the other hand, when SCSs of a data channel and a control channel are different from each other ($\mu_{PDSCH} \neq \mu_{PDCCH}$) as indicated by reference numeral 9-05, slot numbers for the data and the control are different from each other, and thus the BS and the UE may generate a scheduling offset according to a predetermined slot offset K0 on the basis of SCS of the PDCCH.
PUSCH: Related to Transmission Scheme PUSCH transmission may be dynamically scheduled by a UL grant within DCI or may operate by configured grant Type 1 or Type 2. Dynamic scheduling of PUSCH transmission can be indicated by DCI format 0_0 or 0_1.

Configured grant Type 1 PUSCH transmission may be semi-statically configured through reception of configuredGrantConfig including rrc-ConfiguredUplinkGrant in Table 20 through higher-layer signaling, without reception of a UL grant within DCI. Configured grant Type 2 PUSCH transmission may be semi-persistently scheduled by a UL grant within DCI after reception of configuredGrantConfig which does not include rrc-ConfiguredUplinkGrant in Table 20 through higher-layer signaling. When PUSCH transmission operates by a configured grant, parameters applied to PUSCH transmission are applied through confguredGrantConfig, which is higher-layer signaling of Table 20, except for dataScranmblingidentityPUSCH, txConfig, codebookSubset, maxRank, and scaling of UCI-OnPUSCH provided as pusch-Config of Table 21, which is higher-layer signaling. When the UE receives transformPrecoder within configuredGrantConfig which is higher-layer signaling of Table 20, the UE applies tp-pi2BPSK within pusch-Config of Table 21 to PUSCH transmission operating by the configured grant.

TABLE 20

```
ConfiguredGrantConfig ::=           SEQUENCE {
    frequencyHopping                    ENUMERATED
intraSlot,                                  interSlot}
OPTIONAL,   -- Need S,
    cg-DMRS-Configuration               DMRS-UplinkConfig,
    mcs-Table                           ENUMERATED
{qam256,                                qam64LowSE}
OPTIONAL,   -- Need S
    mcs-Table TransformPrecoder         ENUMERATED
{qam256,                                qam64LowSE}
OPTIONAL,   -- Need S
    uci-OnPUSCH                         SetupRelease { CG-
UCI-OnPUSCH                                            }
OPTIONAL,   -- Need M
    resourceAllocation                  ENUMERATED
{ resourceAllocation Type0, resourceAllocationType1, dynamicSwitch },
    rbg-Size                            ENUMERATED
{config2}
OPTIONAL,   -- Need S
    powerControlLoopToUse               ENUMERATED {n0,
n1},
    p0-PUSCH-Alpha                      P0-PUSCH-
AlphaSetId,
    transformPrecoder                   ENUMERATED
{enabled,                               disabled}
OPTIONAL,   -- Need S
    nrofHARQ-Processes                  INTEGER(1..16),
    repK                                ENUMERATED {n1,
n2, n4, n8},
    repK-RV                             ENUMERATED {s1-
0231, s2-0303, s3-0000}                     OPTIONAL,
-- Need R
    periodicity                         ENUMERATED {
                                            sym2, sym7,
sym1x14, sym2x14, sym4x14, sym5x14, sym8x14, sym10x14, sym16x14,
sym20x14,
                                            sym32x14,
sym40x14, sym64x14, sym80x14, sym128x14, sym160x14, sym256x14,
sym320x14, sym512x14,
                                            sym640x14,
sym1024x14, sym1280x14, sym2560x14, sym5120x14,
                                            sym6,
sym1x12, sym2x12, sym4x12, sym5x12, sym8x12, sym10x12, sym16x12,
sym20x12, sym32x12,
                                            sym40x12,
sym64x12, sym80x12, sym128x12, sym160x12, sym256x12, sym320x12,
sym512x12, sym640x12,
                                            sym1280x12,
sym2560x12
    },
    configuredGrantTimer                INTEGER (1..64)
OPTIONAL,   -- Need R
    rrc-ConfiguredUplinkGrant           SEQUENCE {
        timeDomainOffset                    INTEGER
(0..5119),
        timeDomainAllocation                INTEGER
(0..15),
        frequencyDomainAllocation           BIT STRING
(SIZE(18)),
        antennaPort                         INTEGER
(0..31),
        dmrs-SeqInitialization              INTEGER (0..1)
```

TABLE 20-continued

```
OPTIONAL,    -- Need R
             precodingAndNumberOfLayers        INTEGER
(0..63),
             srs-ResourceIndicator             INTEGER (0..15)
OPTIONAL,    -- Need R
             mcsAndTBS                         INTEGER
(0..31),
             frequencyHoppingOffset            INTEGER (1..
maxNrofPhysicalResourceBlocks-1)               OPTIONAL,  --
Need R
             pathlossReferenceIndex            INTEGER
(0..maxNrofPUSCH-PathlossReferenceRSs-1),
             ...
       }
OPTIONAL,    -- Need R
       ...
    }
```

A DMRS antenna port for a PUSCH transmission may be the same as an antenna port for SRS transmission. PUSCH transmission may follow each of a codebook-based transmission method and a non-codebook-based transmission method according to whether a value of txConfig within pusch-Config of Table 21 which is higher-layer signaling is 'codebook' or 'nonCodebook'.

As described above, PUSCH transmission may be dynamically scheduled through DCI format 0_0 or 0_1 or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID within the activated UL BWP in the serving cell in which case the PUSCH transmission is based on a single antenna port. The UE does not expect scheduling of PUSCH transmission through DCI format 0_0 within a BWP in which the PUCCH resource including pucch-spatialRelationInfo is not configured. When the UE does not receive a configuration of txConfig within pusch-Config of Table 21, the UE does not expect reception of scheduling through DCI format 0_1.

TABLE 21

```
PUSCH-Config ::=                                SEQUENCE {
        dataScramblingIdentityPUSCH             INTEGER (0..1023)
OPTIONAL,   -- Need S
        txConfig                                ENUMERATED
{codebook,                                      nonCodebook}
OPTIONAL,   -- Need S
        dmrs-UplinkForPUSCH-MappingTypeA        SetupRelease
{ DMRS-UplinkConfig }                           OPTIONAL,
-- Need M
        dmrs-UplinkForPUSCH-MappingTypeB        SetupRelease
{ DMRS-UplinkConfig }                           OPTIONAL,
-- Need M
        pusch-PowerControl                      PUSCH-
PowerControl
OPTIONAL,   -- Need M
        frequencyHopping                        ENUMERATED
{intraSlot, interSlot}                          OPTIONAL,
-- Need S
        frequencyHoppingOffsetLists             SEQUENCE (SIZE
(1..4)) OF INTEGER (1.. maxNrofPhysicalResourceBlocks-1)
OPTIONAL,   -- Need M
        resourceAllocation                      ENUMERATED
{ resourceAllocationType0, resourceAllocationType1, dynamicSwitch},
        pusch-TimeDomainAllocationList          SetupRelease
{ PUSCH-TimeDomainResourceAllocationList }      OPTIONAL,
-- Need M
        pusch-AggregationFactor                 ENUMERATED { n2,
n4, n8 }                                        OPTIONAL,  --
Need S
        mcs-Table                               ENUMERATED
{qam256,                                        qam64LowSE}
OPTIONAL,   -- Need S
        mcs-TableTransformPrecoder              ENUMERATED
{qam256,                                        qam64LowSE}
OPTIONAL,   -- Need S
        transformPrecoder                       ENUMERATED
{enabled, disabled}                             OPTIONAL,
-- Need S
        codebookSubset                          ENUMERATED
{fullyAndPartialAndNonCoherent, partialAndNonCoherent,nonCoherent}
OPTIONAL, -- Cond codebookBased
        maxRank                                 INTEGER (1..4)
```

TABLE 21-continued

```
OPTIONAL, -- Cond codebookBased
        rbg-Size                                    ENUMERATED
{ config2}                                          OPTIONAL, -- Need S
        uci-OnPUSCH                                     SetupRelease
{ UCI-OnPUSCH}                                      OPTIONAL, -- Need
M
        tp-pi2BPSK                                  ENUMERATED
{enabled}                                           OPTIONAL, -- Need S
        ...
    }
```

Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE determines a precoder for PUSCH transmission based on an SRS resource indicator (SRI), a transmission precoding matrix indicator (TPMI), and a transmission rank (e.g., the number of PUSCH transmission layers).

The SRI may be given through an SRI field within DCI or may be configured through srs-Resourceindicator, which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within DCI or may be configured through precodingAndNumberOfLayers which is higher layer signaling. The TPMI may be used to indicate a precoder applied to PUSCH transmission. When the UE receives a configuration of one SRS resource, the TPMI is used to indicate a precoder to be applied to the one configured SRS resource. When the UE received a configuration of a plurality of SRS resources, the TPMI is used to indicate a precoder to be applied to SRS resources indicated through the SRI.

The precoder to be used for PUSCH transmission is selected from a UL codebook having the number of antenna ports, which is the same as a value of nrofSRS-Ports within SRS-Config, which is higher-layer signaling.

In codebook-based PUSCH transmission, the UE determines a codebook subset on the basis of the TPMI and a codebookSubset within pusch-Config which is higher-layer signaling. The codebookSubset within pusch-Config which is higher-layer signaling may be configured as one of 'fullyAndPartialAndNonCoherent', 'partialAndNonCoherent', or 'nonCoherent' based on the UE capability that the UE reports to the BS.

When the UE reports 'partialAndNonCoherent' as the UE capability, the UE does not expect a configuration of the value of the codebookSubset which is higher layer signaling as 'fullyAndPartialAndNonCoherent'. Further, when the UE reports 'nonCoherent' as the UE capability, the UE does not expect a configuration of the value of the codebookSubset which is higher layer signaling as 'fullyAndPartialAndNonCoherent'or'partialAndNonCoherent'. When nrofSRS-Ports within SRS-ResourceSet, which is higher-layer signaling, indicates two SRS antenna ports, the UE does not expect a configuration of the value of the codebookSubset, which is higher-layer signaling as 'partialAndNonCoherent'.

The UE may receive a configuration of one SRS resource set having a value of usage within an SRS-ResourceSet, which is higher-layer signaling, configured as 'codebook', and one SRS resource may be indicated through the SRI within the corresponding SRS resource set. When several SRS resources are configured within the SRS resource set having the value of usage within SRS-ResourceSet, which is higher-layer signaling configured as 'codebook', the UE expects a configuration of the same value of nrofSRS-Ports within the SRS-Resource, which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform PUSCH transmission by using transmission beam information of the corresponding SRS resource. In codebook-based PUSCH transmission, the SRI is used as information for selecting an index of one SRS resource and is included in DCI. In addition, the BS may insert information indicating the TPMI and the rank to be used for PUSCH transmission by the UE into DCI. The UE performs PUSCH transmission by applying a precoder indicated by the rank and the TPMI indicated based on the transmission beam of the corresponding SRS resource using the SRS resource indicated by the SRI.

Non-codebook-based PUSCH transmission may be dynamically scheduled through DCI format 0_0 or 0_1 or semi-statically operate by the configured grant. When at least one SRS resource is configured within the SRS resource set having the value of usage configured as 'non-Codebook' within SRS-ResourceSet, which is higher-layer signaling, the UE may receive scheduling of non-codebook-based PUSCH transmission through DCI format 0_1.

For the SRS resource set having the value of usage configured as 'nonCodebook' within SRS-ResourceSet, which is higher-layer signaling, the UE may receive a configuration of one connected non-ZP CSI-RS (NZP CSI-RS). The UE may calculate a precoder for SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet, which is higher-layer signaling, is configured as 'aperiodic', the connected NZP CSI-RS is indicated by an SRS request which is a field within DCI format 0_1 or 1_1. When the connected NZP CSI-RS resource is an aperiodic NZP CSI-RS resource, a case in which the value of the SRS request field within DCI format 0_1 or 1_1 is not '00' indicates the existence of the connected NZP CSI-RS. The corresponding DCI should not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. TCI states configured in the scheduled subcarrier are not configured as QCL-TypeD.

When the periodic or semi-persistent SRS resource set is configured, the connected NZP CSI-RS may be indicated through an associated CSI-RS within SRS-ResourceSet, which is higher-layer signaling. For non-codebook-based transmission, the UE does not expect configurations of both spatialRelationInfo, which is higher layer signaling, for the SRS resource and associate dCSI-RS within SRS-Resource-Set, which is higher-layer signaling.

When the UE receives a configuration of a plurality of SRS resources, the UE may determine a precoder and a transmission rank to be applied to PUSCH transmission based on an SRI indicated by the BS. the SRI may be indicated through an SRI field within DCI or may be configured through srs-ResourceIndicator, which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI. The UE may use one or a plurality of SRS resources for SRS transmission, and the maximum number of SRS resources that can be simultaneously transmitted in the same symbol within one SRS resource set and the maximum number of SRS resources are determined by the UE capability which the UE reports to the BS. SRS resources that the UE simultaneously transmits occupy the same RB. The UE configures one SRS port for each SRS resource. The number of SRS resource sets having the value of usage configured as 'nonCodebook' within SRS-ResourceSet, which is higher-layer signaling, is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set based on the measurement result when the corresponding NZP-CSI-RS is received. When transmitting one or a plurality of SRS resources within the SRS resource set having usage configured as 'nonCodebook' to the BS, the UE applies the calculated precoder and the BS selects one or more SRS resources from among the one or more received SRS resources. In non-codebook-based PUSCH transmission, the SRI indicates an index that may express one SRS resource or a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

PUSCH: Preparation Process Time

When the BS schedules to transmit a PUSCH to the UE by using DCI format 0_0, 0_1, or 0_2, the UE may need a PUSCH preparation process time for transmitting a PUSCH by applying a transmission method (e.g., a transmission precoding method of SRS resources, the number of transmission layers, and a spatial domain transmission filter) indicated through DCI. In NR, the PUSCH preparation process time considering the same is defined. The PUSCH preparation process time of the UE may follow Equation (2) below.

$$T_{proc,2} = \max((N_2 + d_{2,1} + d_2)(2048 + 144)\kappa 2^{-\mu} T_c + T_{ext} + T_{switch}, d_{2,2}) \quad \text{Equation (2)}$$

In $T_{proc,2}$ of Equation (2), each parameter may have the following meaning.

$N_2$: the number of symbols determined according to UE processing capability 1 or 2 based on a UE capability and numerology $\mu$. $N_1$ may have a value in Table 22 when UE processing capability 1 is reported according to a UE capability report and may have a value in Table 23 when UE processing capability 2 is reported and information indicating that UE processing capability 2 can be used is configured through higher layer signaling.

TABLE 22

| $\mu$ | PUSCH preparation time $N_2$ [symbols] |
|---|---|
| 0 | 10 |
| 1 | 12 |
| 2 | 23 |
| 3 | 36 |

TABLE 23

| $\mu$ | PUSCH preparation time $N_2$ [symbols] |
|---|---|
| 0 | 5 |
| 1 | 5.5 |
| 2 | 11 for frequency range 1 |

$d_{2,1}$: the number of symbols determined as 0 when all REs of a first OFDM symbol in PUSCH transmission include only DM-RSs and, otherwise, determined as 1.

$\kappa$: 64.

$\mu$: follows a value among or making $T_{proc,2}$ larger. is DL numerology for transmitting a PDCCH including DCI scheduling a PUSCH and is UL numerology for transmitting a PUSCH.

$T_c$: has $1/(\Delta f_{max} \cdot N_f)$, $\Delta f_{max} = 480 \cdot 10^3$ Hz, and $N_f = 4096$.

$d_{2,2}$: follows a BWP switching time when DCI scheduling a PUSCH indicates BWP switching and, otherwise, has 0.

$d_2$: a value of $d_2$ of a PUSCH having a high priority index is used when OFDM symbols of the PUCCH, the PUSCH having the high priority index, and a PUCCH having a low priority index overlap in the time. Otherwise, $d_2$ is 0.

$T_{ext}$: the UE may calculate $T_{ext}$ and apply the same to a PUSCH processing time when the UE uses a shared spectrum channel access scheme. Otherwise, it is assumed that $T_{ext}$ is 0.

$T_{switch}$: it is assumed that $T_{switch}$ is a switching interval time when a UL switching interval is triggered. Otherwise, it is assumed that $T_{switch}$ is 0.

In consideration of time axis resource mapping information of the PUSCH scheduled through DCI and an effect of UL-DL timing advance, the BS and the UE may determine that the PUSCH preparation process time is not sufficient when a first symbol of the PUSCH starts earlier than a first UL symbol at which the cyclic prefix (CP) starts after $T_{proc,2}$ from a last symbol of the PDCCH including the DCI scheduling the PUSCH. Otherwise, the BS and the UE determine that the PUSCH preparation process time is sufficient. The UE may transmit the PUSCH only when the PUSCH preparation process time is sufficient, and may ignore DCI scheduling the PUSCH when the PUSCH preparation process time is not sufficient.

Related to CA/DC

Figure 10:
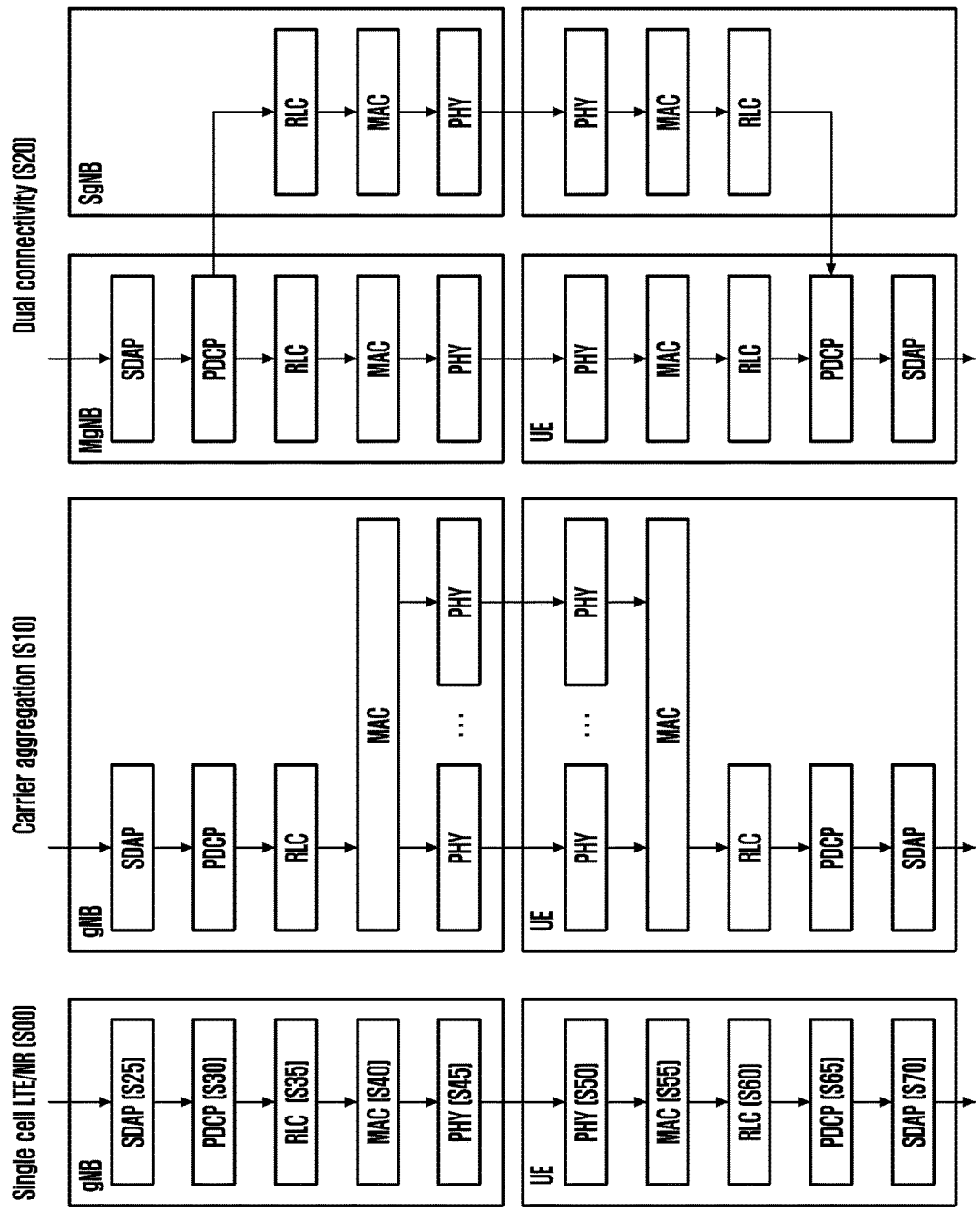
FIG. 10 illustrates a wireless protocol structure of a BS and a UE in a single cell environment, a carrier aggregation (CA) environment, and a dual connectivity (DC) environment in a wireless communication system, according to an embodiment of the disclosure.

FIG. 10 illustrates a wireless protocol structure of a BS and a UE in single cell environment, CA environment, and DC environment, according to an embodiment of the disclosure.

Referring to FIG. 10, a wireless protocol of a wireless communication system (e.g., a 5G or NR system) includes an NR service data adaptation protocol (SDAP) S25 or S70, an NR packet data convergence protocol (PDCP) S30 or $S_{65}$, an NR radio link control (RLC) S35 or S60, and an NR medium access control (MAC) S40 or S55 in each of the UE and the NR gNB.

Functions of the NR SDAP S25 or S70 may include at least some of the following functions:
 a user data transmission function (transfer of user-plane data);
 a function of mapping quality of service (QoS) flow and a data bearer for UL and DL (mapping between a QoS flow and a data radio bearer (DRB) for both DL and UL);
 a function of marking a QoS flow ID for UL and DL (marking QoS flow ID in both DL and UL packets); and
 a function of mapping reflective QoS flow to a data bearer for UL SDAP PDUs (reflective QoS flow to DRB mapping for the UL SDAP protocol data units (PDUs)).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of non-access stratum (NAS) reflective QoS of the SDAP header and a 1 bit-indicator of AS reflective QoS may indicate that the UE updates or reconfigures information on mapping of QoS flow and a data bearer in UL and DL. The SDAP header may include QoS flow ID information indicating the QoS.

The QoS information may be used as data-processing-priority or scheduling information to support a seamless service.

Functions of the NR PDCP S30 or S65 may include at least some of the following functions:
 a header compression and decompression function (header compression and decompression: robust header compression (ROHC) only);
 a user data transmission function (transfer of user data);
 a sequential delivery function (in-sequence delivery of upper-layer PDUs);
 a non-sequential delivery function (out-of-sequence delivery of upper-layer PDUs);
 a reordering function (PDCP PDU reordering for reception);
 a duplicate detection function (duplicate detection of lower-layer service data units (SDUs));
 a retransmission function (retransmission of PDCP SDUs);
 a ciphering and deciphering function (ciphering and deciphering); and
 a timer-based SDU removal function (timer-based SDU discard in UL).

The reordering function of the NR PDCP layer device is a function of sequentially reordering PDCP PDUs received from a lower layer on the basis of a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Functions of the NR RLC S35 or S60 may include at least some of the following functions:
 a data transmission function (transfer of upper-layer PDUs);
 a sequential delivery function (in-sequence delivery of upper-layer PDUs);
 a non-sequential delivery function (out-of-sequence delivery of upper-layer PDUs);
 an automatic repeat request (ARQ) function (error correction through ARQ);
 a concatenation, segmentation, and reassembly function (concatenation, segmentation and reassembly of RLC SDUs);
 a re-segmentation function (re-segmentation of RLC data PDUs);
 a reordering function (reordering of RLC data PDUs);
 a duplicate detection function (duplicate detection);
 an error detection function (protocol error detection);
 an RLC SDU deletion function (RLC SDU discard); and
 an RLC reestablishment function (RLC reestablishment).

The sequential delivery function (in-sequence delivery) of the NR RLC layer device is a function of sequentially transmitting RLC SDUs received from a lower layer to the higher layer. When one original RLC SDU is divided into a plurality of RLC SDUs and then received, the sequential delivery function (in-sequence delivery) of the NR RLC layer device may include a function of reassembling and transmitting the RLC SDUs, a function of reordering the received RLC PDUs based on an RLC SN or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (in-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer.

Alternatively, the sequential delivery function (in-sequence delivery) of the NR RLC layer device may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (according to an arrival order regardless of a serial number or a SN) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC S40 or S55 may be connected to a plurality of NR RLC layer devices configured in one UE and functions of the NR MAC may include at least some of the following functions:
- a mapping function (mapping between logical channels and transport channels);
- a multiplexing and demultiplexing function (multiplexing/demultiplexing of MAC SDUs);
- a scheduling information report function (scheduling information reporting);
- a HARQ function (error correction through HARQ);
- a logical channel priority control function (priority handling between logical channels of one UE);
- a UE priority control function (priority handling between UEs using dynamic scheduling);
- a multimedia broadcast multicast services (MBMS) service identification function (i.e., an MBMS service identification);
- a transport format selection function (transport format selection); and
- a padding function (padding).

The NR PHY layer S45 or S50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol may be variously changed according to a carrier (or cell) operation scheme. For example, when the BS transmits data to the UE based on a single carrier (or cell), the BS and the UE use a protocol structure having a single structure for each layer as indicated by reference numeral S00. However, when the BS transmits data to the UE based on CA using multiple carriers in a single TRP, the BS and the UE use a protocol structure in which layers up to RLC have a single structure, but the PHY layer is multiplexed through the MAC layer as indicated by reference numeral S10.

In another example, when the BS transmits data to the UE based on DC using multiple carriers in multiple TRPs, the BS and the UE use a protocol structure in which layers up to RLC have a single structure, but the PHY layer is multiplexed through the MAC layer as indicated by reference numeral S20.

Referring to the PDCCH and beam configuration-related descriptions described above, it may be difficult to achieve the required reliability in a scenario requiring high reliability, such as URLLC, since PDCCH repetition transmission is not currently supported in Rel-15 and Rel-16 NRs. The disclosure improves PDCCH reception reliability of a terminal by providing a PDCCH repetition transmission method via multiple TRPs. Specific methods are described in detail in the following examples.

Hereinafter, embodiments of the disclosure are applicable in frequency division duplexing (FDD) and time-division duplexing TDD systems. Higher signaling (or higher layer signaling) may be a signal transmission method of transmitting a signal from a BS to a terminal by using a DL data channel of a physical layer or from the terminal to the BS by using a UL data channel of the physical layer, and may be referred to as RRC signaling, PDCP signaling, or a MAC control element (CE).

When determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as "a non-coherent joint transmission (NC-JT)" case.

Determining priority between A and B may be mentioned in various ways, such as selecting one having a higher priority according to a predetermined priority rule to perform an operation corresponding thereto, or omitting or dropping an operation of one having a lower priority.

Hereinafter, the examples are described through a plurality of embodiments in the disclosure, but these may be not independent and one or more embodiments may be applied simultaneously or in combination.

Higher layer signaling may include signaling corresponding to at least one of or a combination of one or more of the following signaling:
- MIB signaling;
- SIB or SIB X (X=1, 2, . . . ) signaling;
- RRC signaling; and
- MAC CE signaling.

L1 signaling may be signaling corresponding to at least one of or a combination of one or more of signaling methods using the following physical layer channels or signaling:
- a PDCCH;
- DCI;
- UE-specific DCI;
- group common DCI;
- common DCI;
- scheduling DCI (e.g., DCI used to schedule DL or UL data);
- non-scheduling DCI (e.g., DCI other than DCI used to schedule DL or UL data);
- a PUCCH; and
- UCI.

The disclosure provides, in case that repeated PDCCH transmission is configured in a UE, a PDSCH rate-matching method and a PUCCH resource determination method according to monitoring with respect to the repeated PDCCH transmission.

A BS may repeatedly transmit a PDCCH to a UE in order to provide higher PDCCH reception reliability. The repeatedly transmitted PDCCHs may include the same DCI. For convenience in the following description, the repeated transmission of the PDCCH is referred to as repeated PDCCH transmission. A BS may configure, for a UE, at least one of following information (e.g., first information, second information, third information, etc.) for repeated PDCCH transmission.

The BS may configure, for the UE, two or more search spaces (SSs) with the first information. The UE may monitor (or receive) a PDCCH through blind decoding (BD) in the search space. Each of the search spaces may be distinguished by different indexes (or IDs). Each search space configuration may include at least one of following information.

The search space configuration may include information about a CORESET to which the search spaces belong. For example, each search space may belong to the same CORESET or different CORESETs.

The search space configuration may include information about the number of PDCCH candidates for each aggregation level (AL) in the search spaces. At least 1, 2, 4, 8, and 16 may be supported for ALs.

The search space configuration may include information about a symbol (that is, time) with respect to PDCCH monitoring occasion (PDCCH MO). The information may include information about a cycle in units of slot and a symbol in which a PDCCH monitoring occasion starts in an offset and a slot. The information about a symbol in which a PDCCH monitoring occasion starts in a slot may be indicated in a form of bitmap (e.g., 14-bit), and N-th bit of the bitmap indicates whether PDCCH monitoring occasion starts in a N-th OFDM symbol in a slot. In case that the N-th bit of the bitmap corresponds to 1, PDCCH monitoring occasion starts in the N-th OFDM symbol in a slot. In case that the N-th bit of the bitmap corresponds to 0, PDCCH monitoring occasion does not start in the N-th OFDM symbol in a slot.

The BS may configure, for the UE, two or more search spaces through which a PDCCH is repeatedly transmitted, with the second information. The BS may configure, for the UE, two or more search spaces by using indexes (or IDs) of two or more search spaces to which a PDCCH is repeatedly transmitted. The search spaces to which a PDCCH is repeatedly transmitted may be expressed as being linked to each other. The two linked search spaces may have the same AL (e.g., 1, 2, 4, 8, and 16) and the same number of PDCCH candidates for each AL.

More specifically, the second information may be configured by one of following two methods.

A first configuration method: A BS may configure a search space group for repeated PDCCH transmission, and the search space group may include at least two search spaces. The search space group may be distinguished by uniquely different indexes (or IDs). The search spaces included in the search space group may be configured by a unique index (or ID) of the search space. For example, the BS may configure search space group 1 for repeated PDCCH transmission, and configure {1, 2}, which are the indexes (or IDs) of respective search spaces, in a UE in order to include search space 1 and search space 2 into search space group 1. In other words, {1, 2}, which are the indexes (or IDs) of respective search spaces, may be configured in response to the index (or ID) of search space group 1.

A second configuration method: In case that each search space is configured for repeated PDCCH transmission, a BS may configure indexes (or IDs) of search spaces, which are linked to each search space. For example, in order to link search space 1 and search space 2, in case that search space 1 is configured, the BS may include information indicating that search space 2 is linked, into the configuration of search space 1. In the same manner, in case that search space 2 is configured, the BS may include information indicating that search space 1 is linked into the configuration of search space 2. The "information indicating being linked" may serve as an index (or ID) of a linked search space. In addition, in case of configuring each a search space, a unique index (or ID) of a search space group including the search space or linked search spaces may be configured.

In the above-described example, in case that search space 1 is configured, the configuration of search space 1 may be configured to include information (e.g., the index of search space 2) indicating that search space 2 is linked and information (e.g., the index of search space group 1) indicating that search space 1 and search space 2 are included in search space group 1. In the same manner, in case that search space 2 is configured, the BS may configure the configuration of search space 2 to include information (e.g., the index of search space 1) indicating that search space 1 is linked and information (e.g., the index of search space group 1) indicating that search space 2 and search space 1 are included in search space group 1. The "information indicating being included in a search space group" may correspond to a unique index (or ID) of a search space group.

As described above, the two linked search spaces may have the same AL (e.g., 1, 2, 4, 8, and 16) and the same number of PDCCH candidates for each AL. The UE may assume that the same DCI is transmitted in a PDCCH candidate corresponding to the same index of the same AL (e.g., 1, 2, 4, 8, and 16) in two search spaces. For example, it may be assumed that the linked search spaces are search space 1 and search space 2 and that two PDCCH candidates (index=0 and index=1) of AL 4 and a PDCCH candidate (index=0) of AL 8 are configured in search space 1 and search space 2. Here, the same DCI may be transmitted through a first PDCCH candidate (index=0) of AL 4 of search space 1 and search space 2, the same DCI may be transmitted through a second PDCCH candidate (index=1) of AL 4 of search space 1 and search space 2, and the same DCI may be transmitted through the PDCCH candidate (index=0) of AL 8 of search space 1 and search space 2. Therefore, the UE may receive the same DCI from PDCCH candidates of each search space, based on the configuration information (the same AL (e.g., 1, 2, 4, 8, and 16) and the number of PDCCH candidates for each of the same number of ALs) of the linked search spaces.

In the description below, it may be assumed that a PDCCH candidate corresponding to the same index of the same AL (e.g., 1, 2, 4, 8, and 16) is linked in two search spaces. In the above-described example, a first PDCCH candidate (index=0) of AL 4 of search space 1 is linked to a first PDCCH candidate (index=0) of AL 4 of search space 2, a second PDCCH candidate (index=1) of AL 4 of search space 1 is linked to a second PDCCH candidate (index=1) of AL 4 of search space 2, and a first PDCCH candidate (index=0) of AL 8 of search space 1 is linked to a first PDCCH candidate (index=0) of AL 8 of search space 2.

In case that the BS links two or more search spaces, the BS should transmit the same DCI through PDCCH candidates of the linked search spaces. That is, in case that first DCI is transmitted through linked PDCCH candidates of a partial search space of the linked search spaces and second DCI is transmitted through linked PDCCH candidates of another partial search space of the linked search spaces, the first DCI and the second DCI should not be different from each other. From the viewpoint of the UE, in a case in which two or more search spaces are linked, the UE may always expect that the same DCI is transmitted through the linked PDCCH candidates of the linked search spaces. That is, in a case in which the UE receives first DCI through linked PDCCH candidates of a partial search space of the linked search spaces and second DCI through linked PDCCH candidates of another partial search space of the linked search spaces, the first DCI and the second DCI may be expected not to be different from each other. That is, if the first DCI and the second DCI are different from each other, the UE may determine the case as an error case.

Under the assumption of the operations of the BS and the UE as described above, the UE may receive the linked PDCCH candidates of the linked search spaces through which the same DCI is transmitted through following methods.

As a first reception method, the UE may independently or separately receive a PDCCH candidate through a portion of linked search spaces or one search space. That is, even though the UE received a configuration that the same DCI is repeatedly transmitted from the linked PDCCH candidates in the linked search spaces, the UE may receive DCI by blind decoding PDCCH candidates through a partial or one search space. In case that a PDCCH candidate is blind decoded in a partial or one search space, PDCCH candidates in the partial or one search space may be used without considering a linked PDCCH candidate of another linked search space. As such, the blind decoding is performed for each partial or one search space and thus it may be expressed as independent or separate. The method is referred to as separate PDCCH decoding herein for convenience.

In the separate PDCCH decoding, the UE may have multiple PDCCH reception occasions by using different search spaces, and in case that the UE undergoes different channel environments in the multiple PDCCH reception occasions, PDCCH reception success probability may be increased. For example, in a case in which a channel environment of some search space of linked search spaces is inferior (e.g., if interference is high in the band/time in which the search space is transmitted, a TRP through which the corresponding search space is transmitted is blocked and a received SNR is lowered, etc.), a PDCCH may be successfully received through a search space with an excellent channel environment among the remaining search spaces. Generally, the separate PDCCH decoding may be suitable for when a linked search space is transmitted through different channel environments.

As a second reception method, the UE may cooperatively or jointly receive a linked PDCCH candidate through a linked search space. That is, the UE received a configuration that the same DCI is repeatedly transmitted through linked PDCCH candidates of a linked search space, and thus the UE may receive DCI by soft-combining and blind-decoding determination values (e.g., a log-likelihood ratio (LLR) value or determination values used for a decoding process similar thereto) of the linked PDCCH candidates of the linked search space. The UE performs blind decoding by using the linked PDCCH candidates of the linked search space and thus it may be expressed as cooperative or joint. This method is referred to as joint PDCCH decoding herein for convenience. The BS repeatedly transmits the same DCI through the linked PDCCH candidates of the linked search space, and thus the UE may perform joint PDCCH decoding. Since the UE repeatedly receives the same DCI multiple times, the joint PDCCH decoding may obtain an SNR gain (or a channel code gain) due to multiple iterations as well as a gain due to different channel environments provided by the separate PDCCH decoding.

The UE may selectively use one of the separate PDCCH decoding (e.g., the first reception method) or the joint PDCCH decoding (e.g., the second reception method) and perform PDCCH BD. Further, the UE may perform the PDCCH BD by using both the separate PDCCH decoding and the joint PDCCH decoding. This is determined according to the implementation of the UE, and the BS may not force the UE to perform the PDCCH blind-decoding in a specific method or to perform the PDCCH blind-decoding by using the two methods. In other words, although the BS configures that the same DCI is repeatedly transmitted through the linked PDCCH candidate in the linked search space, the UE may perform the PDCCH blind-decoding by using a portion or the entirety of the linked search space and the BS may not recognize which PDCCH blind-decoding method the UE uses.

In view of the foregoing, an aspect of the disclosure is to solve the above-described misunderstanding between the BS and the UE, which may be caused by ambiguity of the PDCCH blind-decoding method used by the UE.

Although operations of a UE in a state in which two search spaces (e.g., search space 1 and search space 2) are linked are described herein, the description may be extended to a state in which two or more search spaces are linked.

First Embodiment: PDSCH Rate-Matching Method According to Whether PDCCH Reception (Monitoring) is Possible FIG. 11 illustrates PDSCH rate matching in consideration of repeated PDCCH transmission according to an embodiment of the disclosure.

Figure 11:
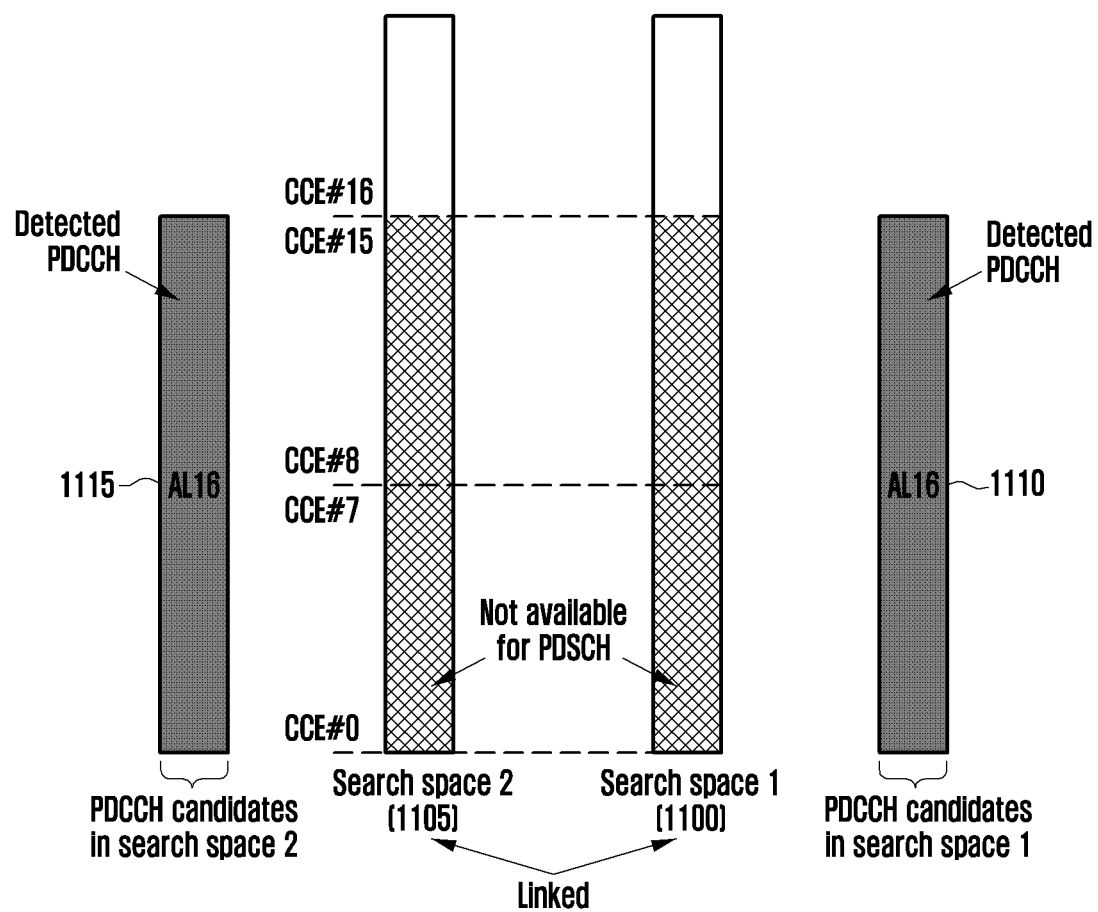
FIG. 11 illustrates PDSCH rate matching in consideration of repeated PDCCH transmission according to an embodiment of the disclosure.

Referring to FIG. 11, in a case in which a BS and a UE transmit or receive a PDSCH, a resource to which a PDCCH is transmitted (or received) may be assumed to be a resource not available to the PDSCH. The resource of the received PDCCH may include linked PDCCH candidates. For example, in FIG. 11, the UE may receive a configuration that search space 1 1100 and search space 2 1105 are linked, and a PDCCH candidate 1110 of AL 16 of search space 1 1100 and a PDCCH candidate 1 15 of AL 16 of search space 2 1105 are linked. That is, the PDCCH candidate 1110 of AL 16 of search space 1 1100 and the PDCCH candidate 1115 of AL 16 of search space 2 1105 may be configured to receive the same DCI. In a case in which the UE receives (monitors) two linked PDCCH candidates and receives DCI for scheduling a PDSCH through the two PDCCH candidates, the UE may assume that time-frequency resources corresponding to the two PDCCH candidates are unavailable for the PDSCH.

A partial search space of the linked search space or a partial PDCCH candidates of the search space may not be used (monitored) for PDCCH reception due to a specific reason. The UE may not perform blind decoding with respect to the PDCCH candidate which may not be used (monitored) for PDCCH reception. Accordingly, as the UE does not perform blind-decoding, power consumption of the UE may be reduced and the blind-decoding that has not been used may be used for receiving (monitoring) another PDCCH candidate.

For example, a PDCCH candidate overlapping a time-frequency resource of at least following cases (e.g., a first case, a second case, or a third case) may not be available for PDCCH reception (monitoring).

As the first case, a PDCCH candidate overlapping a time-frequency resource used for a synchronization signal/PBCH block (SSB) may not be used for PDCCH reception. The SSB may be used as information about QCL of the UE and an initial cell access of the UE, and thus the BS is required to periodically transmit the SSB through a determined time-frequency resource. Therefore, a DL signal (including a PDCCH) may not be transmitted through a location overlapping a location of a time-frequency resource used for the SSB. The location of the time-frequency resource of the SSB may be configured in an SIB received while the UE accesses a cell or configured during an RRC configuration process.

As the second case, a PDCCH candidate overlapping a rate matching resource configured by the BS is unavailable for PDCCH reception. The rate matching resource may include at least one of RateMatchPattern, lte-CRS-ToMatchAround, LTE-CRS-PatternList-r16, or availableRB-SetsPerCell. The RateMatchPattern is a rate matching resource in units of RBs configured by the BS to the UE, lte-CRS-ToMatchAround or LTE-CRS-PatternList-r16 is a rate matching resource in units of REs, and available RB-SetsPerCell is a rate matching resource in units of RB-sets (a group of RBs). When lte-CRS-ToMatchAround or LTE-CRS-PatternList-r16 is configured to be a higher-layer signal, a PDCCH candidate overlapping time-frequency resource corresponding to lte-CRS-ToMatchAround or LTE-CRS-PatternList-r16 may not be used for PDCCH reception. The RateMatchPattern may be configured as a higher-layer signal and it is additionally indicated whether the RateMatchPattern is available through a DCI format (e.g., DCI format 1_1, DCI format 1_2) for scheduling a PDSCH. In a case in which it is not indicated whether the RateMatchPattern is available through a DCI format for scheduling a PDSCH, a PDCCH candidate overlapping the time-frequency resource corresponding to the RateMatchPattern may not be used for PDCCH reception. The available RB-SetsPerCell may be configured as a higher-layer signal and available RB sets may be indicated through DCI format 2_0 indicating a slot format.

As the third case, a PDCCH candidate overlapping a partial symbol in a direction of a symbol may not be used for PDCCH reception, e.g., in a case that a symbol that is configured as a UL symbol, indicated by a UL symbol, or a symbol having a UL signal or channel scheduled therein is used for UL transmission, and thus a PDCCH candidate overlapping the symbol may not be used for PDCCH reception. The UL symbol to be configured may be a symbol configured as a UL symbol by tdd-UL-DL-Configuration-Common in an SIB received during cell access process or tdd-UL-DL-ConfigurationDedicated in an RRC signal. The UL symbol to be indicated may be a UL symbol indicated through DCI format 2_0 indicating a slot format. The symbol having a UL signal or channel scheduled therein may be a symbol in which a PUSCH, an SRS, a PUCCH, etc., are scheduled by DCI format 0_0/0_1/0_2/1_0/1_1/1_2. Further, the symbol having a UL signal or channel scheduled therein may be a symbol in which a periodic transmission signal and channel is configured as a higher layer such as a configured grant PUSCH, a periodic SRS, or a PUCCH for transmitting HARQ-ACK of a SPS PDSCH.

A time-frequency resource through which PDCCH reception (monitoring) is not possible by the first case, the second case, and the third case may be expressed as a reserved resource. However, the expression does not limit a technical scope of the disclosure.

When a partial search space of the linked search space or a partial PDCCH candidate of the search space is not available for PDCCH reception by the UE due to a specific reason, a PDCCH candidate linked to the PDCCH candidate may be used for PDCCH reception. For example, in a case in which search space 1 and search space 2 are linked and a partial search space of search space 1 or a partial PDCCH candidate of search space 1 corresponds to the above-described cases (e.g., the first case, the second case, or the third case) not to be used for PDCCH reception, i.e., overlaps a reserved resource, the UE may receive a PDCCH through a PDCCH candidate of linked search space 2. Here, the UE may successfully receive DCI through one PDCCH candidate through the above-described separate PDCCH decoding or joint PDCCH decoding.

It may be assumed that the received DCI schedules a PDSCH and a time-frequency resource of the scheduled PDSCH overlaps linked PDCCHs. In order to successfully transmit and receive a PDSCH, the BS and the UE should determine which time-frequency resource of time-frequency resources of a PDSCH is unavailable for a PDSCH. Thereafter, the BS and the UE should perform rate-matching based on a resource available for a PDSCH. Hereinafter, methods for a UE to determine an available resource for PDSCH reception will be described.

Method 1-1 PDSCH Rate-Matching Method Regardless of Whether Reception (Monitoring) is Possible for Each Search Space The UE may determine a PDSCH rate-matching method regardless of whether reception (monitoring) of a PDCCH candidate is possible. Specifically, when at least one PDCCH candidate of linked PDCCH candidates is a receivable PDCCH candidate, the UE may receive a DCI format for scheduling a PDSCH through the receivable PDCCH candidate. Time-frequency resources corresponding to the receivable PDCCH candidate and all PDCCH candidates linked to the receivable PDCCH candidate may be determined as resources unavailable for the PDSCH. That is, even when the linked PDCCH candidate corresponds to a reserved resource (e.g., the first case, the second case, or the third case) not to be used for PDCCH reception (monitoring), the UE may determine that a time-frequency resource of the linked PDCCH candidate is a resource unavailable for the PDSCH.

Figure 12:
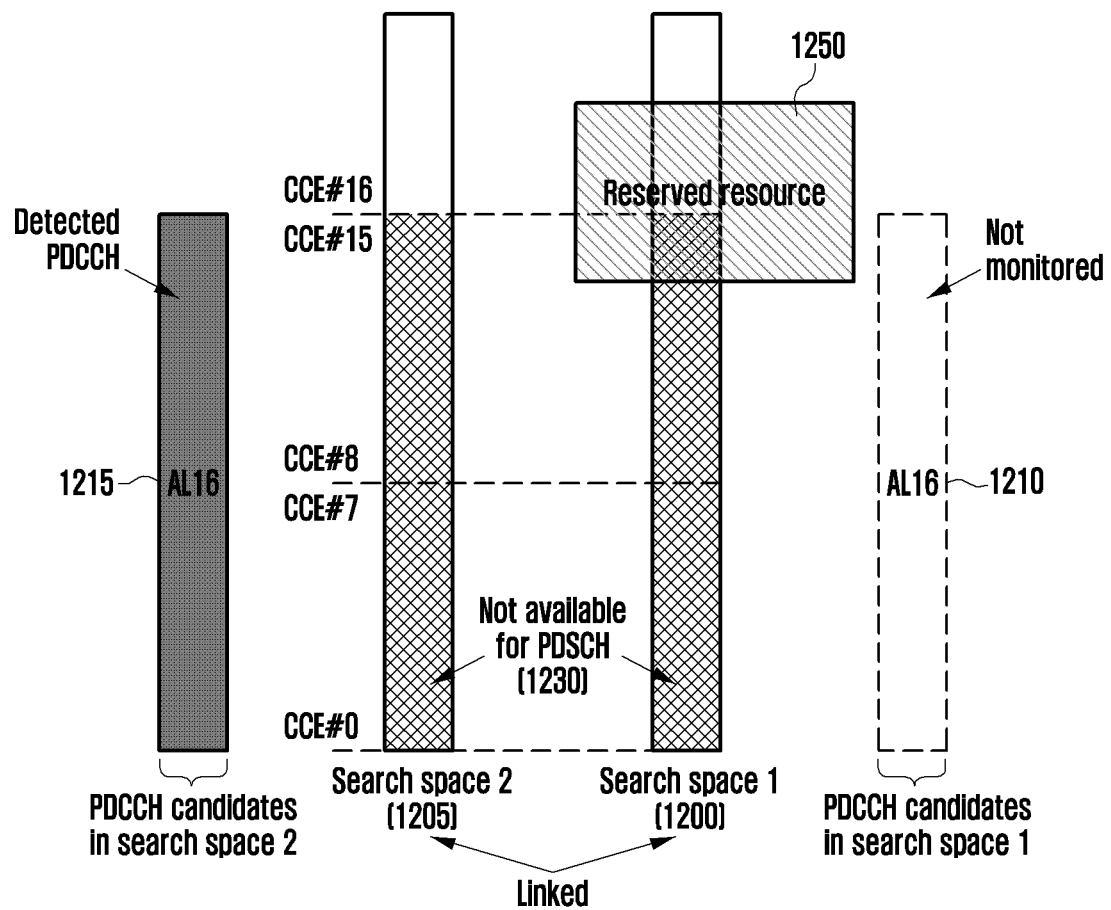
FIG. 12 illustrates a PDSCH rate matching method when a PDCCH candidate overlaps with a reserved resource according to an embodiment of the disclosure.

FIG. 12 illustrates a PDSCH rate matching method in which a PDCCH candidate overlaps with a reserved resource according to an embodiment of the disclosure. More specifically, FIG. 12 illustrates the above-described Method 1-1.

Referring to FIG. 12, the UE may receive a configuration that search space 1 1200 and search space 2 1205 are linked, and a PDCCH candidate 1210 of AL 16 of search space 1 1200 and a PDCCH candidate 1215 of AL 16 of search space 2 1205 are linked. That is, the UE may receive a configuration to receive the same DCI through the PDCCH candidate 1210 of AL 16 of search space 1 1200 and the PDCCH candidate 1215 of AL 16 of search space 2 1205. A partial resource of a PDCCH candidate of search space 1 1200 overlaps a time-frequency resource of a reserved resource (e.g., the first case, the second case, or the third case) 1250. Accordingly, the UE may not receive (monitor) a PDCCH through a PDCCH candidate 1210 of search space 1 1200 but may receive (monitor) a PDCCH through a PDCCH candidate 1215 of search space 2 1205.

According to Method 1-1, when the UE receives DCI for scheduling a PDSCH through the PDCCH candidate 1215 of search space 2 1205, time-frequency resources corresponding to the PDCCH candidate 1210 of search space 1 1200 and the PDCCH candidate 1215 of search space 2 1205 may be included in time-frequency resources unavailable for the PDSCH. That is, when a time-frequency resource in which the PDSCH is scheduled overlaps the time-frequency resources of the PDCCH candidate 1210 of search space 1 and the PDCCH candidate 1215 of search space 2 1205, the overlapped resource 1230 may be unavailable for the PDSCH.

By determining using Method 1-1, the UE does not need to determine whether usage (monitoring) is possible for each PDCCH candidate, thus achieving excellence in terms of implementation. However, the UE may notice that the linked PDCCH candidate is not being used and therefore, does not use the time-frequency resource overlapping the PDCCH candidate even though the time-frequency resource is available for a PDSCH, thus causing resource loss. For example, the UE in FIG. 12 does not use the PDCCH candidate 1210 of search space 1 1200 not used for reception (monitoring) to the PDSCH, thus causing resource loss.

Method 1-2 PDSCH Rate-Matching Method According to Whether Reception (Monitoring) is Possible for Each Search Space The UE may determine a PDSCH rate-matching method according to whether reception (monitoring) of a PDCCH candidate is possible. Specifically, when at least one PDCCH candidate of linked PDCCH candidates is a receivable PDCCH candidate, the UE may receive a DCI format for scheduling a PDSCH through the receivable PDCCH candidate. The UE may determine whether reception (monitoring) of the PDCCH candidate and the linked PDCCH candidate is possible. When the linked PDCCH candidate is a candidate for which reception (monitoring) is possible, the UE may determine that a time-frequency resource corresponding to the linked PDCCH candidate is not available for the PDSCH. When the linked PDCCH candidate is a candidate for which reception (monitoring) is not possible, the UE may determine that a time-frequency resource corresponding to the linked PDCCH is available for the PDSCH.

Figure 13:
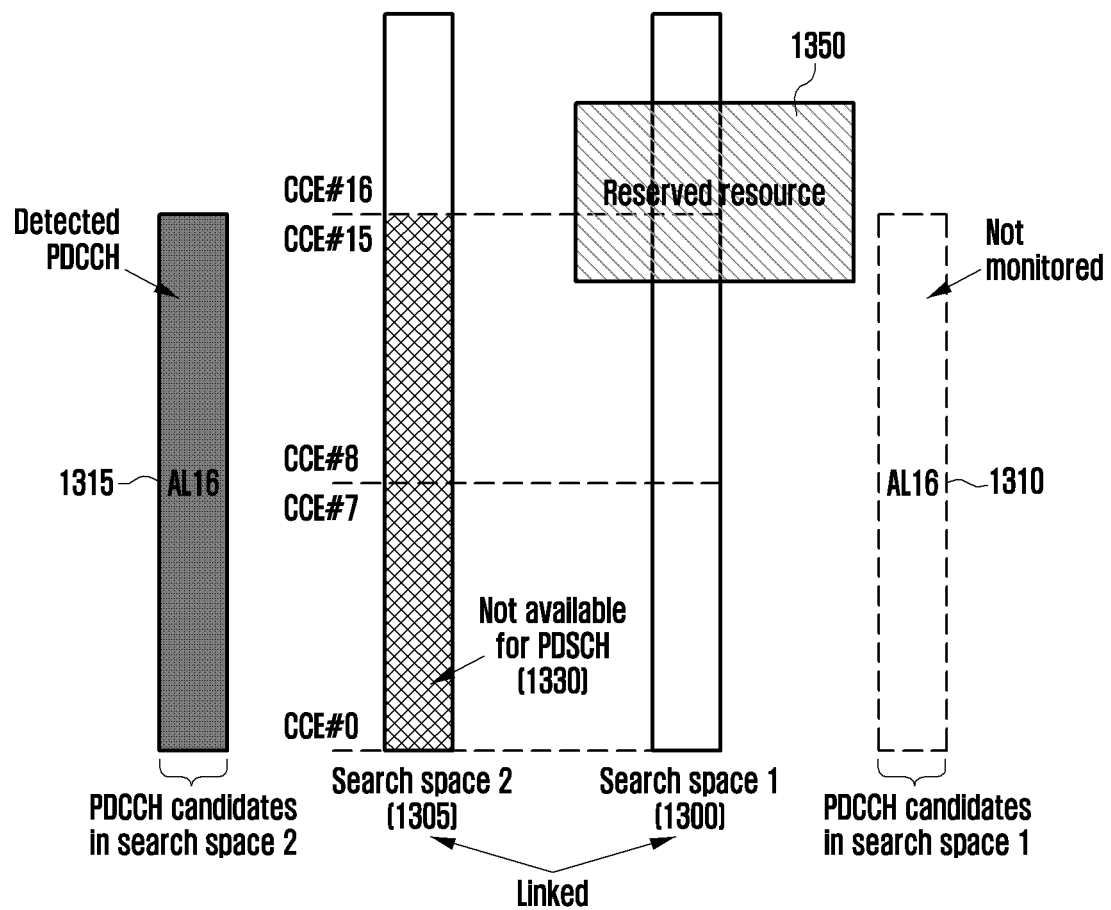
FIG. 13 illustrates a method of determining PDSCH rate matching according to whether to receive a PDCCH candidate for a respective SS according to an embodiment of the disclosure.

FIG. 13 illustrates a method for determining PDSCH rate matching according to whether reception of each PDCCH candidate of respective search space is possible, according to an embodiment of the disclosure. More specifically, FIG. 13 illustrates the above-described Method 1-2.

Referring to FIG. 13, the BS may configure the UE that search space 1 1300 and search space 2 1305 are linked, and a PDCCH candidate 1310 of AL 16 of search space 1 and a PDCCH candidate 1315 of AL 16 of search space 2 are linked. That is, the UE may receive a configuration to receive the same DCI through the PDCCH candidate of AL 16 of search space 1 and the PDCCH candidate of AL 16 of search space 2. A partial resource of a PDCCH candidate of search space 1 overlaps a time-frequency resource of a reserved resource (e.g., the first case, the second case, or the third case) 1350. Accordingly, the UE may not receive (monitor) the PDCCH candidate of search space 1 but may receive (monitor) the PDCCH candidate search space 2.

According to Method 1-2, when the UE receives DCI for scheduling a PDSCH through the PDCCH candidate of search space 2, a time-frequency resource 1330 corresponding to the PDCCH candidate of search space 2 may be included in a time-frequency resource unavailable for the PDSCH. However, since the UE does not receive (monitor) the PDCCH through the PDCCH candidate of search space 1, a time-frequency resource corresponding to the PDCCH candidate may be available for a PDSCH.

By determining using Method 1-2, resource loss may be reduced compared to Method 1-1. However, the UE should determine whether PDCCH reception (monitoring) is possible every time for PDSCH rate-matching, thus increasing implementation complexity of the UE.

Method 1-2-1 Include Only Signal and Channel Configured as Higher Layer in Reserved Resource (Ignore DCI Information)

A reserved resource may include all of the first case, the second case, and the third case in above-described Method 1-2. However, the reserved resource may include a portion of the first case, the second case, and the third case. As Method 1-2-1, the reserved resource may include only resources configured as a higher layer. More specifically, the first case is configured as a higher layer signal (i.e., an SIB and a dedicated RRC signal) and thus may be included in a reserved resource of Method 1-2. In the second case, lte-CRS-ToMatchAround or LTE-CRS-PatternList-r16 is configured as a higher layer and thus may be included in a reserved resource. In the second case, RateMatchPattern may be configured as a higher layer or additional indicated by DCI. In case that the RateMatchPattern is additionally indicated by DCI, the RateMatchPattern may be included in a reserved resource. In case that the RateMatchPattern is not additionally indicated by DCI, the RateMatchPattern may not be included in a reserved resource. In the second case, availableRB-SetsPerCell is indicated by DCI format 2_0, and thus availableRB-SetsPerCell may not be included in a reserved resource. In the third case, a configured UL symbol is configured as a higher layer and thus may be included in a reserved resource. Among symbols in which a UL signal or channel is scheduled, a symbol in which a periodic transmission symbol and channel are scheduled, such as a Configured grant PUSCH, a periodic SRS, and a PUCCH for transmitting HARQ-ACK of an SPS PDSCH configured as a higher layer may be included in a reserved resource. However, the UL signal and channel scheduled by an indicated UL symbol or DCI format may not be included in a reserved resource.

As shown in Method 1-2-1, only a time-frequency resource of a signal or channel configured as a higher layer is included in a reserved resource and thus the UE may have following two advantages. First, a reserved resource is determined only according to a higher layer signal, and thus the reserved resource does not change in the middle. Accordingly, the UE may determine a reserved resource with low complexity.

Second, when a resource indicated by DCI is included in a reserved resource, a reserved resource may change according to DCI reception, and the change of the reserved resource may change possibility of PDCCH candidate reception (monitoring) and thus affect PDSCH rate-matching. Accordingly, when a resource indicated by DCI is included in a reserved resource, misunderstanding may occur in PDSCH rate-matching between the BS and the UE. However, only the signal and channel configured as a higher layer is included in a reserved resource and thus the miss-understanding may be prevented.

Method 1-2-2 Include Signal and Channel Configured as Higher Layer and Signal and Channel Indicated by DCI in Reserved Resource In above-described Method 1-2-1, a reserved resource includes only a signal and channel configured as a higher layer but does not include a signal and channel indicated by DCI. However, a signal and channel indicated by partial DCI may be included in a reserved resource. Among signals and channels indicated by DCI, a signal and channel which may be included in a reserved resource are described.

As a first example, all signals and channels indicated by DCI may be included in a reserved resource in the first case, the second case, and the third case. That is, the reserved resource may include all signals and channels corresponding to in the first case, the second case, and the third case.

As a second example, even when RateMatchPattern of the second case is indicated by DCI, the RateMatchPattern may be included in a reserved resource according to DCI. That is, when DCI indicates the RateMatchPattern as a resource unavailable for a PDSCH, the RateMatchPattern may still be included in a reserved resource. As such, even when RateMatchPattern indicated by DCI is included in a reserved resource, the DCI is for scheduling a PDSCH and thus a misunderstanding will not occur in PDSCH rate-matching between the BS and the UE.

As a third example, a UL symbol and a UL channel and signal indicated by DCI in the third case may be included in a reserved resource. The reason for selectively including only UL is that the area is used as UL by the BS and thus may not be used for DL reception such as PDCCH reception and PDSCH reception. Accordingly, even when a UL symbol and a UL channel and signal indicated by DCI are included in a reserved resource, PDSCH reception is not possible through the symbols and thus misunderstanding does not occur in a PDSCH rate between the BS and the UE.

As a fourth example, a channel and signal indicated by DCI received through a common search space may be included in a reserved resource in the second case and the third case. However, a channel and signal indicated by DCI received through a UE-specific search space may not be included in a reserved resource because DCI received in the common search space may have higher reliability.

As a fifth example, a channel and signal indicated by DCI received through a UE-specific search space may be included in a reserved resource in the second case and the third case. However, a channel and signal indicated by DCI received through a common search space may not be included in a reserved resource because, in a case of a UE-specific search space, it is possible to configure a QCL suitable for a UE and configure an AL, so that higher reliability may be achieved.

The BS may configure, for the UE, information about a reserved resource. The information about a reserved resource may include information about a signal and channel included in a reserved resource. For example, in order to include only a portion of the channel and signal indicated by DCI in a reserved source, the BS may configure, for the UE, information about a portion of the channel and signal indicated by the DCI.

Method 1-3 PDSCH Rate-Matching Method in Case that any One of REs, Through which Wideband RS of CORESET Having Linked PDCCH Included Therein is Received, Overlaps a Reserved Resource A wideband RS with respect to a specific CORESET may be configured for the UE. Here, the UE may assume that all REs corresponding to RSs of the CORESET are transmitted through the same precoder. Accordingly, the UE may estimate a channel of the entire CORESET by using the REs. When a wideband RS is not configured, the UE may assume the same precoder from REs corresponding to RSs in an REG bundle of the CORESET.

If a wideband RS of a CORESET is configured for the UE and REs corresponding to the RS overlap a reserved resource, the UE should determine whether PDCCH reception (monitoring) is possible through the CORESET. Since the time-frequency resource of the PDCCH candidate overlaps the reserved resource in Methods 1-1 to 1-2 described above, the PDCCH candidate is unavailable for PDCCH reception (monitoring). However, in Method 1-3, the PDCCH candidate does not overlap the reserved resource, but a portion of REs corresponding to RSs of the CORESET to which the PDCCH candidate belongs overlaps the reserved resource, and thus, the UE may receive (monitor) a PDCCH candidate by performing channel estimation based on non-overlapping REs.

As a first example, when a wideband RS of a CORESET is configured for the UE and REs corresponding to the RS overlap a reserved resource, the UE may determine that PDCCH reception (monitoring) is impossible through the CORESET. In addition, the reception has been determined to be impossible, the resource of the PDCCH candidate may be used for PDSCH transmission.

As a second example, when a wideband RS of a CORESET is configured for the UE and REs corresponding to the RS overlap a reserved resource, the terminal may determine that PDCCH reception (monitoring) is possible through the CORESET. In addition, the reception has been determined to be possible, the resource of the PDCCH candidate may not be used for PDSCH transmission.

If a wideband RS is configured in a first CORESET with which a partial search space of linked search spaces configured for the UE is associated but a wideband RS is not configured in a second CORESET with which remaining search spaces are associated, the UE should determine a resource available for a PDSCH in the first CORESET or the second CORESET. Based on first to fourth examples below, a method by a UE for determining an available resource for a PDSCH in the first CORESET or the second CORESET is provided.

As a first example, when the UE succeeds in reception of DCI for scheduling a PDSCH through a PDCCH candidate of search spaces associated with the first CORESET, among linked search spaces, the UE may determine that a resource corresponding to the PDCCH candidate of the first CORESET and REs corresponding to a RS of the first CORESET are unavailable resources for a PDSCH. Further, the UE may determine that resources corresponding to PDCCH candidates of the second CORESET linked to the PDCCH candidate are unavailable resources for a PDSCH. However, the UE may determine that REs corresponding to RSs of the second CORESET are available for a PDSCH because a wideband RS is not configured in the second CORESET. The first example may identically apply to a case in which DCI for scheduling a PDSCH is received through a PDCCH candidate of search spaces associated with the second CORESET, among linked search spaces.

As a second example, when the UE succeeds in reception of DCI for scheduling a PDSCH through a PDCCH candidate of search spaces associated with the first CORESET, among linked search spaces, the UE may determine that a resource corresponding to the PDCCH candidate of the first CORESET and REs corresponding to RSs of the first CORESET are unavailable resources for a PDSCH. Further, the UE may determine that resources corresponding to PDCCH candidates of the second CORESET linked to the PDCCH candidate and REs corresponding to RSs of the second CORESET are unavailable resources for a PDSCH. In the second example, when a wideband RS is configured through one CORESET, the UE may determine a resource not used for a PDSCH similarly to the case of receiving a wideband RS in a CORESET in which an RS is not configured. The second example may identically apply to a case in which DCI for scheduling a PDSCH is received through a PDCCH candidate of search spaces associated with the second CORESET, among linked search spaces.

As a third example, when the UE succeeds in reception of DCI for scheduling a PDSCH through a PDCCH candidate of search spaces associated with the second CORESET, among linked search spaces, the UE may determine that resources corresponding to PDCCH candidates of the second CORESET linked to the PDCCH candidate are unavailable resources for a PDSCH. Further, when all PDCCH candidates overlap a reserved resource in search spaces associated with the first CORESET, the UE may determine that a resource corresponding to the PDCCH candidate of the first CORESET and REs corresponding to RSs of the first CORESET are available resources for a PDSCH. That is, since all PDCCH candidates overlap the reserved resource in search spaces associated with the first CORESET, none of PDCCH candidates may be received through search spaces associated with the first CORESET. The UE may not receive PDCCH candidates and thus time-frequency resources of the PDCCH candidates may be available for a PDSCH.

As a fourth example, when the UE succeeds in reception of DCI for scheduling a PDSCH through a PDCCH candidate of search spaces associated with the second CORESET, among linked search spaces, the UE may determine that resources corresponding to PDCCH candidates of the second CORESET linked to the PDCCH candidate are unavailable resources for a PDSCH. Further, when all PDCCH candidates overlap a reserved resource in search spaces associated with the first CORESET, the UE may determine that a resource corresponding to the PDCCH candidate of the first CORESET and REs corresponding to RSs of the first CORESET are unavailable resources for a PDSCH. That is, since all PDCCH candidates overlap the reserved resource in search spaces associated with the first CORESET, none of the PDCCH candidates may be received through search spaces associated with the first CORESET and the UE may not use the time-frequency resources of the PDCCH candidates for a PDSCH.

The third example and the fourth example described above may apply to a case in which a wideband RS is configured in the second CORESET.

Second Embodiment: Method for Distinguishing AL 8 and AL 16 and Rate-Matching According Thereto In the description above, when the UE receives DCI for scheduling a PDSCH, it is assumed that the time-frequency resource used for receiving a PDCCH including the DCI is not used for PDSCH reception. This is based on the assumption that the UE may know the time-frequency resource used for PDCCH reception. However, there may be a case in which the UE has successfully received the DCI but may not determine a time-frequency resource having been used for receiving a PDCCH including the DCI. In a description below, this case will be referred to as an ambiguity case.

FIG. 14A to FIG. 14D illustrate ambiguity of AL determination according to embodiments.

Referring to FIGS. 14A to 14D, the BS may configure, for the UE, a CORESET 1410 having a symbol length of 1 and the CORESET may be configured with non-interleaved mapping. Thereafter, the BS may configure, for the UE, a search space 1410 belonging to the CORESET. The search space may include at least one PDCCH candidate 1405 of AL 8 and at least one PDCCH candidate 1400 of AL 16. That is, the UE needs to perform blind decoding on at least one PDCCH candidate of AL 8 and at least one PDCCH candidate of AL 16 in the search space.

Figure 14A:
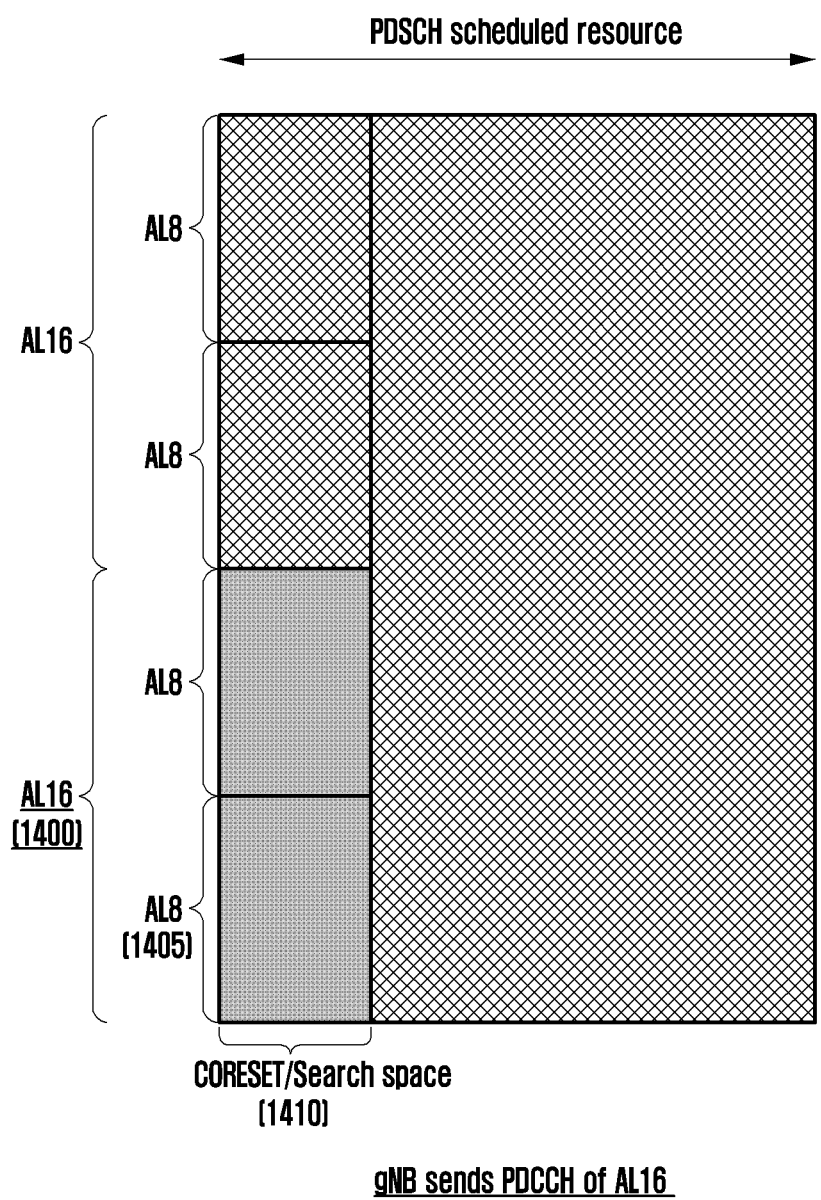
FIG. 14A illustrates ambiguity of AL determination according to an embodiment of the disclosure.
Figure 14B:
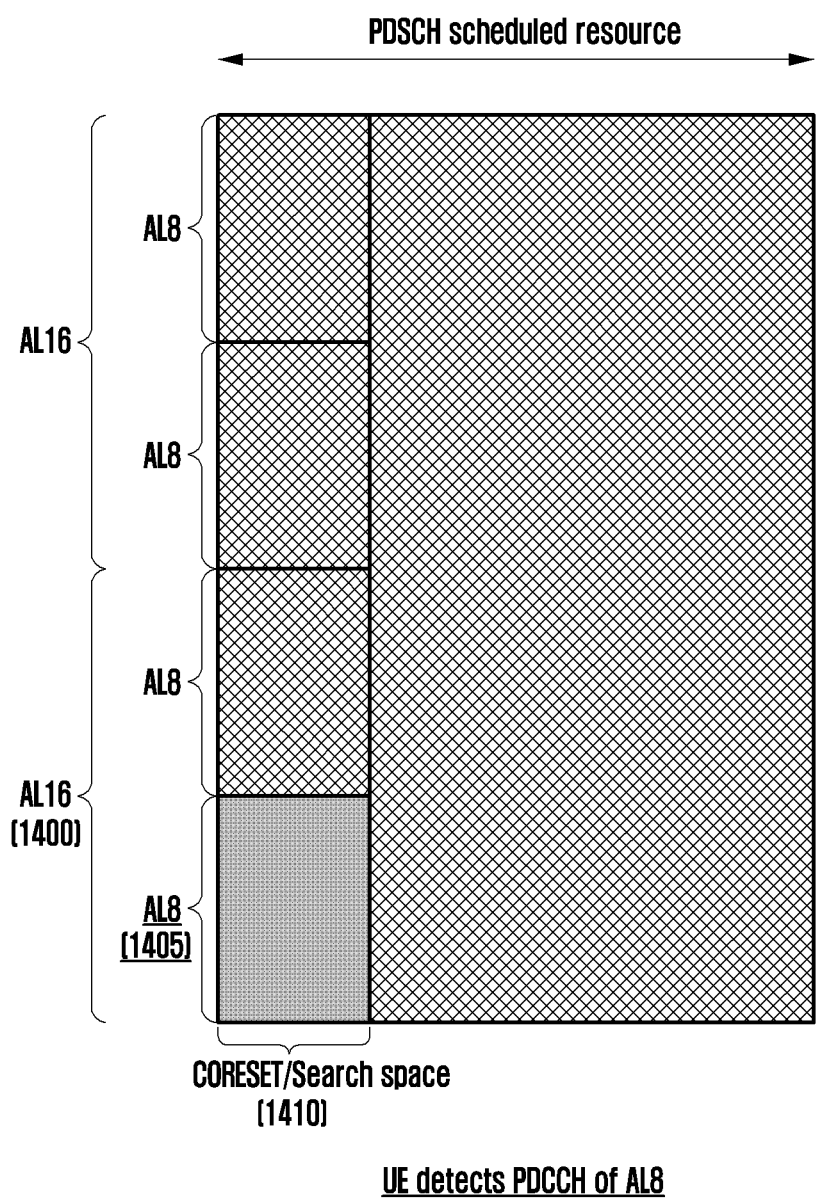
FIG. 14B illustrates ambiguity of AL determination according to an embodiment of the disclosure.

Referring to FIG. 14A, the BS may transmit DCI for scheduling a PDSCH through the PDCCH candidate 1400 of AL 16. Here, the PDCCH candidate includes a total of 16 CCEs and a time-frequency resource corresponding to the 16 CCEs is not used for a PDSCH. That is, when generating and transmitting a PDSCH, the BS does use the time-frequency resource corresponding to the 16 CCEs for a PDSCH.

Referring to 14B, the UE may perform blind decoding on the PDCCH candidate 1405 of AL 8 and the PDCCH candidate 1400 of AL 16 in the search space. In case that a start CCE index of the PDCCH candidate of AL 8 and a start CCE index of the PDCCH candidate of AL 16 are identical to each other, the UE may receive DCI through the PDCCH of AL 8. This is because there is possibility that in case that eight CCEs corresponding to the PDCCH candidate of AL 8 are excellent in a signal-noise rate or remaining eight CCEs have a strong interference, the BS transmits DCI through the PDCCH candidate of AL 16 but decoding is performed on the PDCCH candidate of AL 8.

Here, the UE receives DCI for scheduling a PDSCH through the PDCCH candidate of AL 8, and thus the UE may assume that eight CCEs corresponding to the PDCCH candidate of AL 8 may not be used for the PDSCH reception. Therefore, the UE receives the PDSCH through remaining resource spaces excluding time-frequency resource areas of the eight CCEs. Here, the PDSCH transmitted by the BS and the PDSCH received by the UE are transmitted/received through different resource areas and thus the UE may not successfully receive the PDSCH.

Figure 14C:
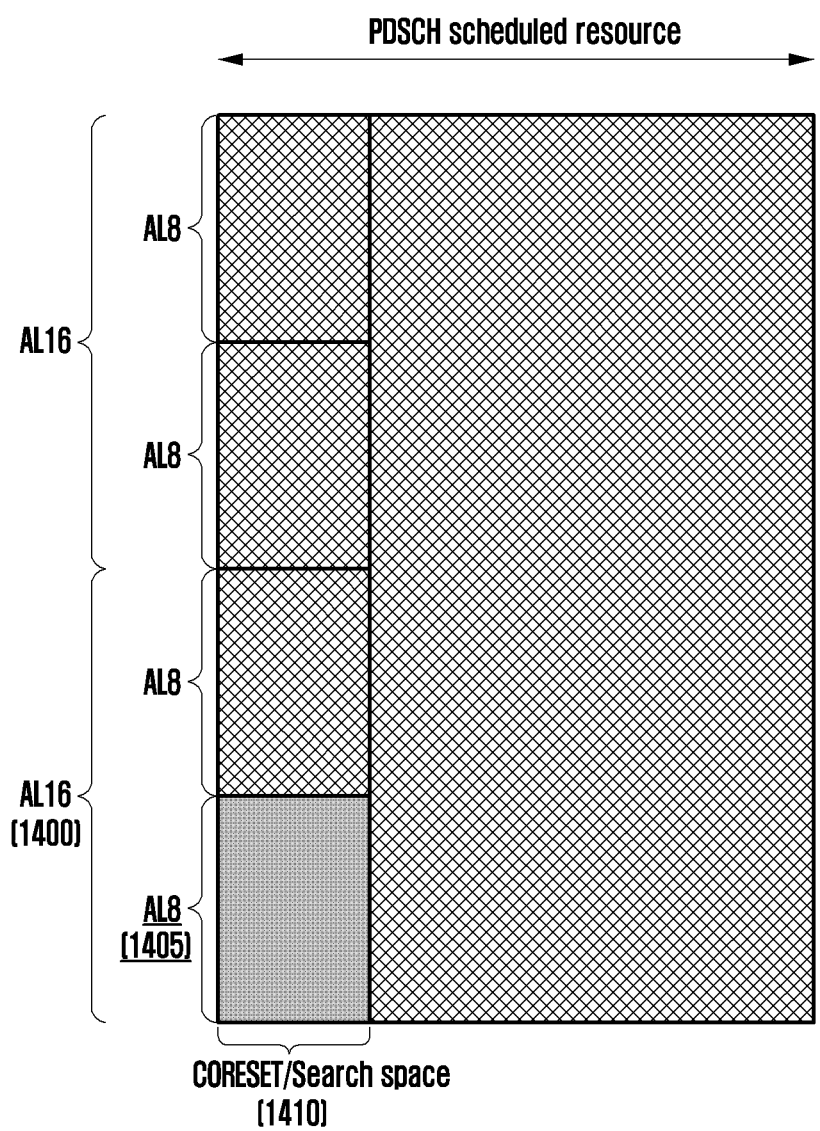
FIG. 14C illustrates ambiguity of AL determination according to an embodiment of the disclosure.
Figure 14D:
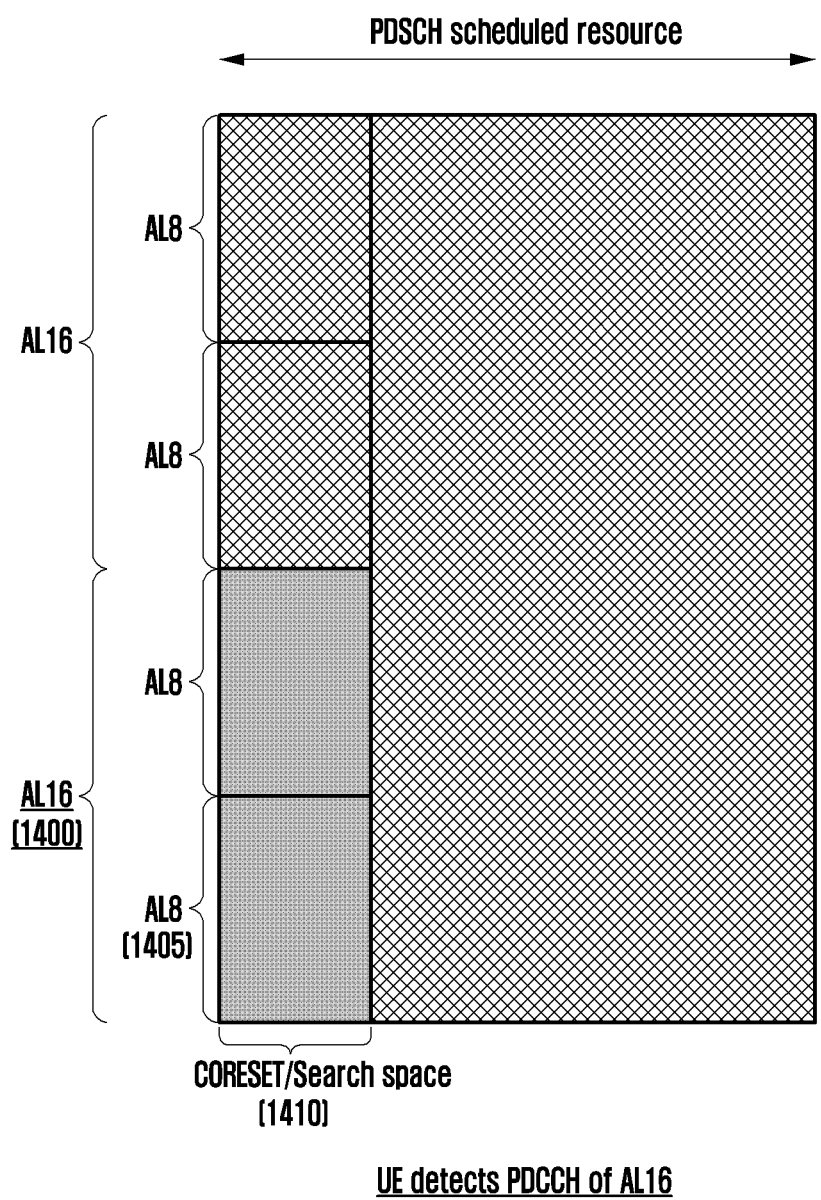
FIG. 14D illustrates ambiguity of AL determination according to an embodiment of the disclosure.

Referring to FIG. 14C, the BS may transmit DCI for scheduling a PDSCH through the PDCCH candidate 1405 of AL 8. Here, the PDCCH candidate includes a total of 8 CCEs and a time-frequency resource corresponding to the 8 CCEs is not used for a PDSCH. That is, when generating and transmitting a PDSCH, the BS does use the time-frequency resource corresponding to the 8 CCEs for a PDSCH.

Referring to 14D, the UE may perform blind decoding on the PDCCH candidate 1405 of AL 8 and the PDCCH candidate 1400 of AL 16 in the search space. When a start CCE index of the PDCCH candidate of AL 8 and a start CCE index of the PDCCH candidate of AL 16 are identical to each other, the UE may receive DCI through the PDCCH of AL 16. This is because there is possibility that in case that eight CCEs corresponding to the PDCCH candidate of AL 8 are excellent in a signal-noise rate and remaining eight CCEs are low in a signal-noise rate, the BS transmits DCI through the PDCCH candidate of AL 8 but decoding is performed on the PDCCH candidate of AL 16. Here, the UE receives DCI for scheduling a PDSCH through the PDCCH candidate of AL 16, and thus the UE may assume that 16 CCEs corresponding to the PDCCH candidate of AL 16 may not be used for the PDSCH reception. Therefore, the PDSCH is received through remaining resource spaces excluding time-frequency resource areas of the 16 CCEs. Here, the PDSCH transmitted by the BS and the PDSCH received by the UE are transmitted/received through different resource areas and thus the UE may not successfully receive the PDSCH.

The description of FIGS. 14A to 14D corresponds to one example, but may be extended to another ambiguity case.

As such, the PDCCH candidate through which the BS transmits DCI and the PDCCH through which the UE receives DCI may not be the same. According thereto, PDSCH rate-matching of the UE may be affected. To this end, the 3Gpp Rel-15 defines an operation of a UE as follows:

3GPP Rel-15 UE operation: In case that a CORESET is configured as 1-symbol and non-interleaved mapping, a UE monitors a PDCCH candidate of AL 8 and an PDCCH candidate of AL 16 which start from the same CCE index, and DCI for scheduling a PDSCH is received through the PDCCH candidate of AL 8, the UE does not use a time-frequency resource corresponding to the PDCCH candidate of AL 16 for PDSCH reception.

As described above, in the 3GPP Rel-15 UE operations, when there is ambiguity between AL 8 and AL 16, the UE assumes that DCI is received of AL 16, which is the largest of the two. Assuming this, a PDSCH does not use a time-frequency resource of the PDCCH candidate of AL 16, thus causing resource loss, although misunderstanding with respect to PDSCH rate-matching between the BS and the UE may be prevented.

Figure 15A:
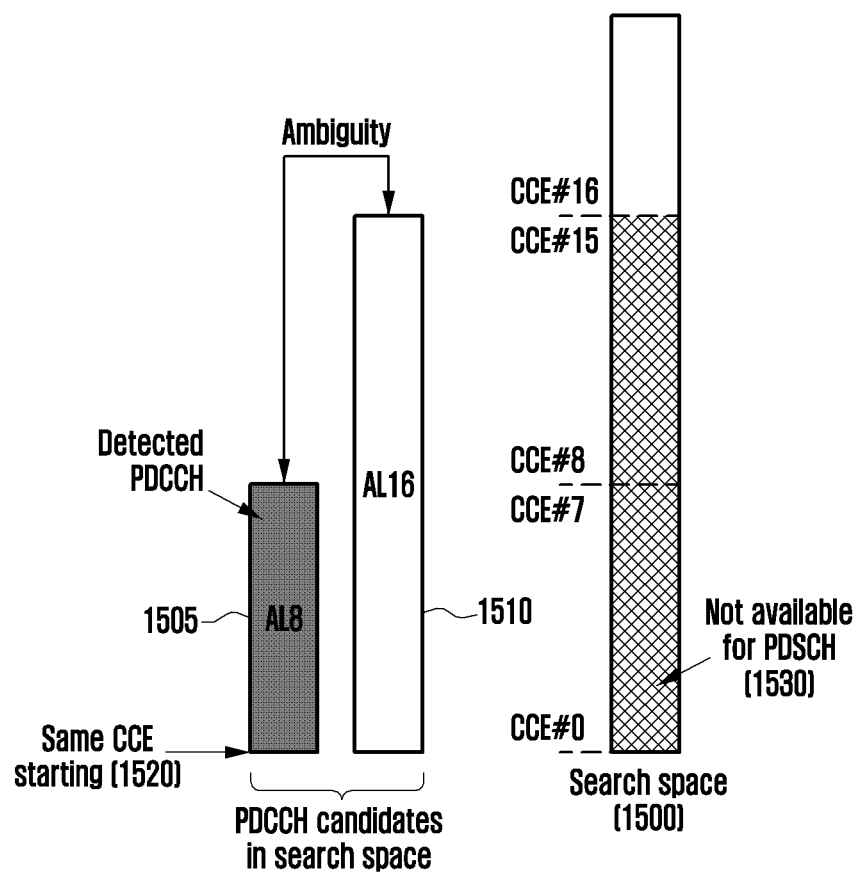
FIG. 15A illustrates PDSCH rate matching in case of ambiguity of AL determination according to an embodiment of the disclosure.
Figure 15B:
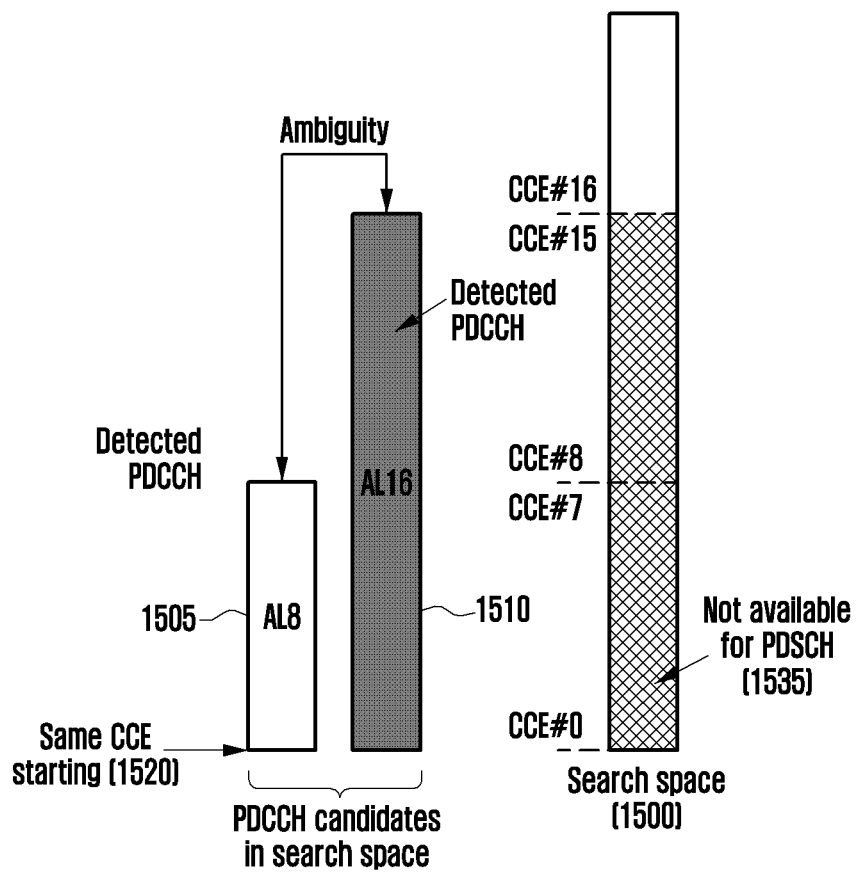
FIG. 15B illustrates PDSCH rate matching in case of ambiguity of AL determination according to an embodiment of the disclosure.

FIGS. 15A and 15B illustrate PDSCH rate-matching methods in case of ambiguity of AL determination according to an embodiment of the disclosure.

Referring to FIGS. 15A and 15B, the UE monitors a PDCCH candidate 1505 of AL 8 and a PDCCH candidate 1510 of AL 16, which start from the same CCE 1520 in the search space 1500.

In FIG. 15A, when the UE receives DCI for scheduling a PDSCH through the PDCCH candidate 1505 of AL 8, the UE does not use a time-frequency resource 1530 corresponding to the PDCCH of AL 16 for PDSCH reception.

In FIG. 15B, when the UE receives DC for scheduling a PDSCH through the PDCCH candidate 1510 of AL 16, the UE does not use a time-frequency resource 1535 corresponding to the PDCCH of AL 16 for PDSCH reception.

Based on FIGS. 15A and 15B, even when the UE receives DCI for scheduling a PDSCH through a PDCCH candidate of any AL, the same resource is not used for PDSCH transmission and thus misunderstanding with respect to PDSCH rate-matching between the BS and the UE may be prevented.

Figure 16:
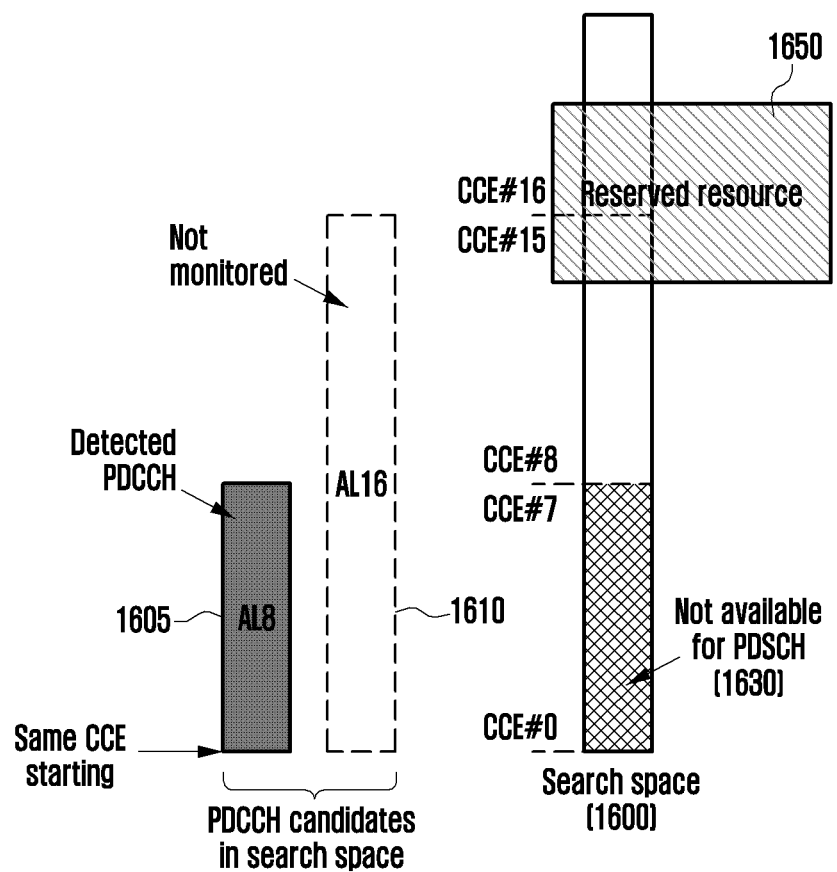
FIG. 16 illustrates an example in which some PDCCH candidates are not monitored according to an embodiment of the disclosure.

FIG. 16 illustrates an example in which a portion of a PDCCH candidate is not monitored according to an embodiment of the disclosure.

Referring to FIG. 16, even though the UE receives a configuration to monitor two PDCCH candidates 1605 and 1610, the PDCCH candidate 1610 of the two overlaps a reserved resource 1650 and thus the PDCCH candidate may not be received (monitored).

In the example of FIG. 16, the PDCCH candidate 1610 corresponding to the AL of 16 overlaps the reserved resource 1650 and thus the PDCCH candidate may not be received (monitored). Here, the UE may receive DCI for scheduling a PDSCH through the PDCCH candidate 1605 of AL 8.

In the description of FIGS. 15A and 15B above, there is ambiguity between the AL 8 and the AL 16 and thus the UE assumes the AL 16. However, in FIG. 16, the PDCCH candidate of AL 16 is not received (monitored) and thus there is no ambiguity between the AL 8 and the AL 16. Therefore, the UE may receive the PDSCH assuming the AL 8.

That is, in case of receiving a PDSCH, the UE may not use a time-frequency resource 1630 corresponding to the AL 8 for PDSCH reception.

FIGS. 17 to 20 illustrate methods for PDSCH rate matching in consideration of repeated PDCCH transmission, ambiguity of AL determination, and a reserved resource according to an embodiment of the disclosure.

Referring to FIGS. 17 to 20, two search spaces (e.g., search space 1 and search space 2) may be configured to a UE and at least one PDCCH candidate of AL 8 and at least one PDCCH candidate of AL 16 may be configured in each search space. The PDCCH candidate of AL 8 and the PDCCH candidate of AL 16 may start from the same CCE in both search spaces. Here, even when the UE performs separate PDCCH decoding, the UE may have AL determination ambiguity in search space 1 and AL determination ambiguity in search space 2. Further, even when the UE performs joint PDCCH decoding, AL determination ambiguity may occur in two search spaces. For example, in the two linked search spaces, two PDCCH candidates of AL 8 always transmit the same DCI, and two PDCCHs of AL 16 always transmit the same DCI.

According to an embodiment of the disclosure, operation of the UE may include the following.

In a case in which at least one of the two linked search spaces that the UE monitors satisfies <Condition>, and the UE receives DCI for scheduling a PDSCH through a PDCCH candidate of AL 8 in one or two of the linked search spaces, the UE does not use a time-frequency resource corresponding to a PDCCH candidate of AL 16 for PDSCH reception in both search spaces.

<Condition> is defined as follows.

<Condition>: A 1-symbol, non-interleaved mapping CORESET is configured and a PDCCH candidate of AL 8 and a PDCCH candidate of AL 16 which start from the same CCE index are included.

The above-described condition is just one example of a condition by which a UE may not determine a received PDCCH candidate. Herein, although operations of a UE according to the above-described condition are provided, the operations may utilize another condition by which the UE may not determine the received PDCCH candidate.

The operation of a UE for solving AL ambiguity with respect to one search space proposed by the 3GPP Rel-15 may be extended and applied to multiple linked search spaces.

Referring to FIGS. 17 to 20, a case in which a partial PDCCH candidate is not received (monitored) through one search space among linked search spaces may be considered. The PDCCH candidate of AL 16 in search space 1 overlaps the reserved resource and thus is not received (monitored). The PDCCH candidate of AL 8 in search space 1, and the PDCCH candidate of AL 8 and the PDCCH candidate of AL 16 in search space 2 may be received (monitored). Here, the BS may transmit DCI through one of two following methods.

As a first method, the BS may repeatedly transmit DCI through the linked PDCCH candidate of AL 8 of the two linked search spaces. That is, the BS may repeatedly transmit the same DCI through the PDCCH candidate of AL 8 of search space 1 and the PDCCH candidate of AL 8 of search space 2.

As a second method, the BS may transmit DCI through the PDCCH candidate of AL 16 of search space 2. That is, the BS may transmit DCI through the PDCCH candidate of AL 16 of search space 2, and since the linked PDCCH candidate of AL 16 of linked search space 1 overlaps the reserved resource, the BS may not transmit DCI through the linked PDCCH candidate of AL 16 of search space 1.

The UE may perform blind decoding on the PDCCH through the separate PDCCH decoding or joint PDCCH decoding as described below in order to receive the DCI for scheduling a PDSCH. When the UE receives the DCI for scheduling a PDSCH, a resource unavailable for the PDSCH may be determined based on following methods. For reference, regardless of a PDCCH decoding process (separate PDCCH decoding or joint PDCCH decoding) of the UE, the same PDSCH rate-matching method may be used. Accordingly, in a description below, separate PDCCH decoding process of the UE may be omitted.

Method 2-1 Determine PDSCH Rate-Matching for Each Linked Search Space

An embodiment of Method 2-1 will be described with reference to FIGS. 17 to 18. The UE may determine a resource unavailable for a PDSCH for each linked search space. More specifically, the UE may determine ALs based on PDCCHs received through each linked search space or a configuration of each search space, and determine a resource unavailable for a PDSCH based on the ALs for each search space.

Figure 17:
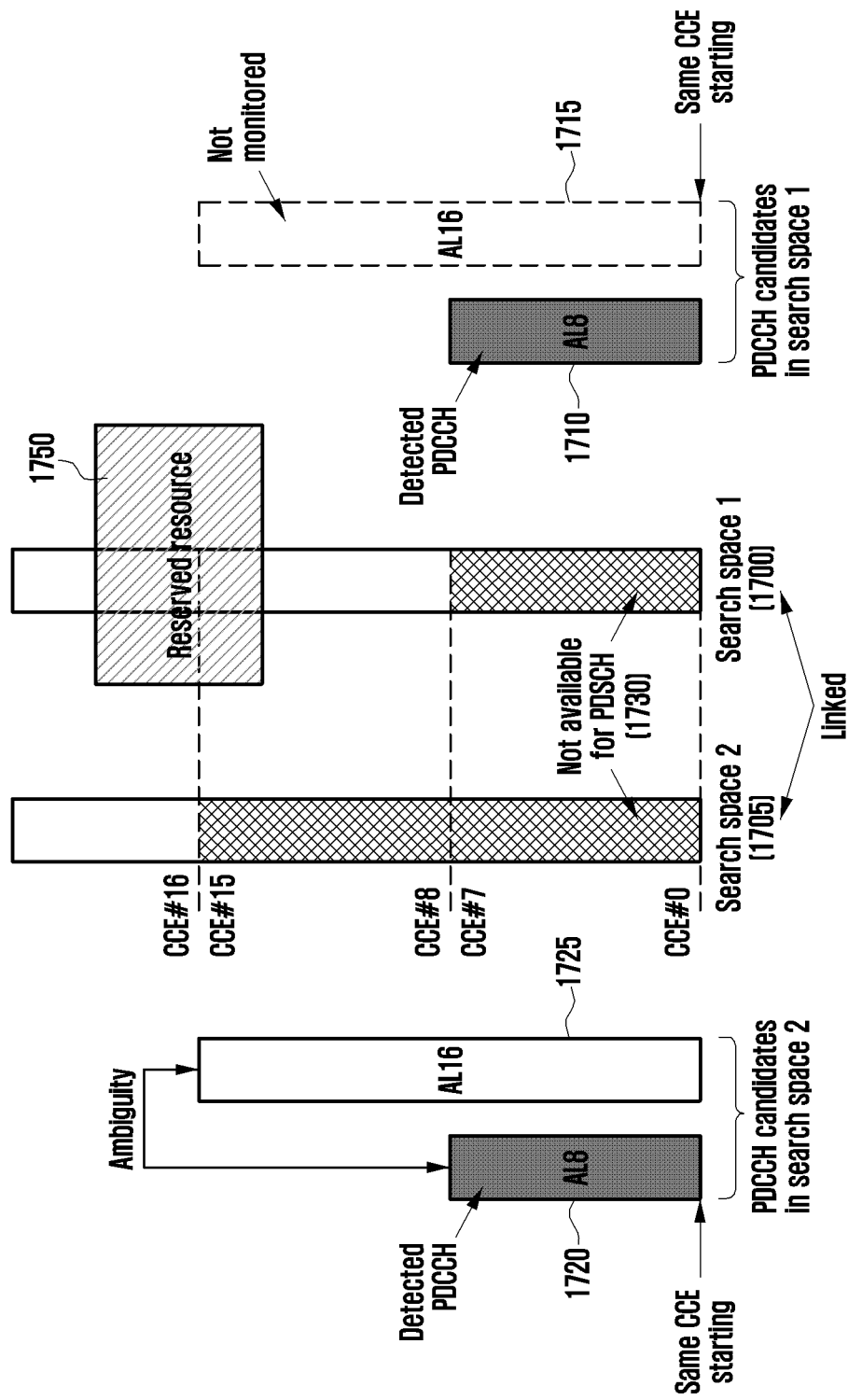
FIG. 17 illustrates a method for PDSCH rate matching in consideration of PDCCH repetition transmission, ambiguity of AL determination, and a reserved resource according to an embodiment of the disclosure.

Referring to FIG. 17, it may be assumed that the UE receives PDCCHs 1720 and 1710 of AL 8 through linked search spaces 1700 and 1705. The UE may determine an AL in each of two linked search spaces. For example, the PDCCH candidate 1720 of AL 8 and the PDCCH candidate 1725 of AL 16, which satisfy aforementioned <Condition>, exist in search space 2 1705, and thus the UE may determine an AL in SS 2 is 16 (AL 16 is a super-set (or higher set) of AL 8, thus it is determined as AL 16). That is, the UE may assume that a time-frequency resource corresponding to the PDCCH candidate of AL 16 of search space 2 is unavailable for a PDSCH. The PDCCH candidate 1710 of AL 8 and the PDCCH candidate 1715 of AL 16, which satisfy aforementioned <Condition>, do not exist in search space 1 1700. This is because the PDCCH candidate of AL 16 of search space 1 is not received (monitored). Therefore, AL 8, which is the received AL, may be assumed in search space 1. That is, the UE may assume that a time-frequency resource 1730 corresponding to the PDCCH candidate of AL 8 of search space 1 is unavailable for a PDSCH.

The UE operations of FIG. 17 may be applied to a case in which the UE receives a PDCCH of AL 16 in a linked search space. That is, although the UE receives PDCCH of AL 16 in a linked search space, there is ambiguity between AL 8 and AL 16 as described above and thus the same UE operations may be defined as those of the case in which the PDCCH of AL 8 is received.

When the UE receives a PDCCH of AL 16 in a linked search space, operations different from FIG. 17 may be defined.

Figure 18:
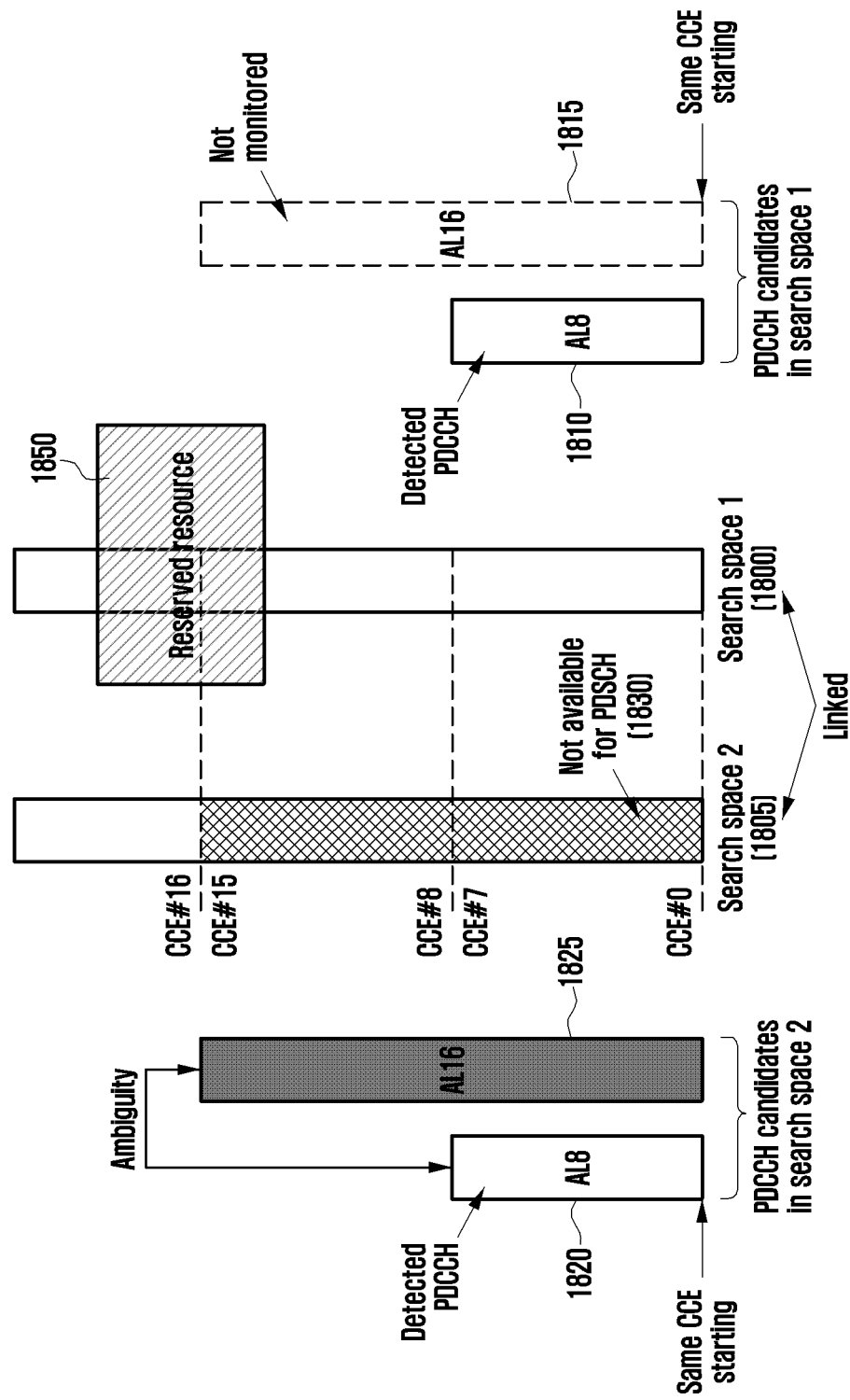
FIG. 18 illustrates a method for PDSCH rate matching in consideration of PDCCH repetition transmission, ambiguity of AL determination, and a reserved resource according to an embodiment of the disclosure.

Referring to FIG. 18, it may be assumed that the UE receives PDCCHs 1815 and 1825 of AL 16 through linked search spaces 1800 and 1805. The UE may determine an AL in each of two linked search spaces. For example, the PDCCH candidate 1820 of AL 8 and the PDCCH candidate 1825 of AL 16, which satisfy aforementioned <Condition>, exist in search space 2 1805, and thus, the UE may determine an AL in search space 2 is 16 (AL 16 is a super-set (or higher set) of AL 8, thus it is determined as AL 16). That is, the UE may assume that a time-frequency resource 1830 corresponding to the PDCCH candidate of AL 16 of search space 2 is unavailable for a PDSCH. The PDCCH candidate of AL 8 and the PDCCH candidate of AL 16, which satisfy aforementioned <Condition>, do not exist in search space 1. This is because the PDCCH candidate 1815 of AL 16 of search space 1 is not received (monitored). Therefore, a PDCCH candidate corresponding to AL 16 is not received in search space 1 1800 and thus the UE may assume that all time-frequency resources of search space 1 are available for a PDSCH.

Method 2-2 Determine PDSCH Rate-Matching Based on Search Space Having Ambiguity in Case that any One of Linked Search Spaces has Ambiguity An embodiment of Method 2-2 will be described with reference to FIG. 19. The UE may determine a resource unavailable for a PDSCH based on configurations of all linked search spaces through which a received PDCCH is transmitted. More specifically, in case that ambiguity with respect to AL determination occurs at least one search space of all linked search spaces through which a received PDCCH is transmitted, the UE may determine a resource unavailable for a PDSCH by determining an AL in the search space in which the ambiguity occurs, and determine a resource unavailable for a PDSCH in remaining linked search spaces based on the AL. For example, in an search space satisfying the aforementioned <Condition>, i.e., in a search space in which a 1-symbol, non-interleaving mapping CORESET is configured and a PDCCH candidate of AL 8 and a PDCCH candidate of AL 16, which start from the same CCE index, are included, ambiguity with respect to AL determination may occur.

Figure 19:
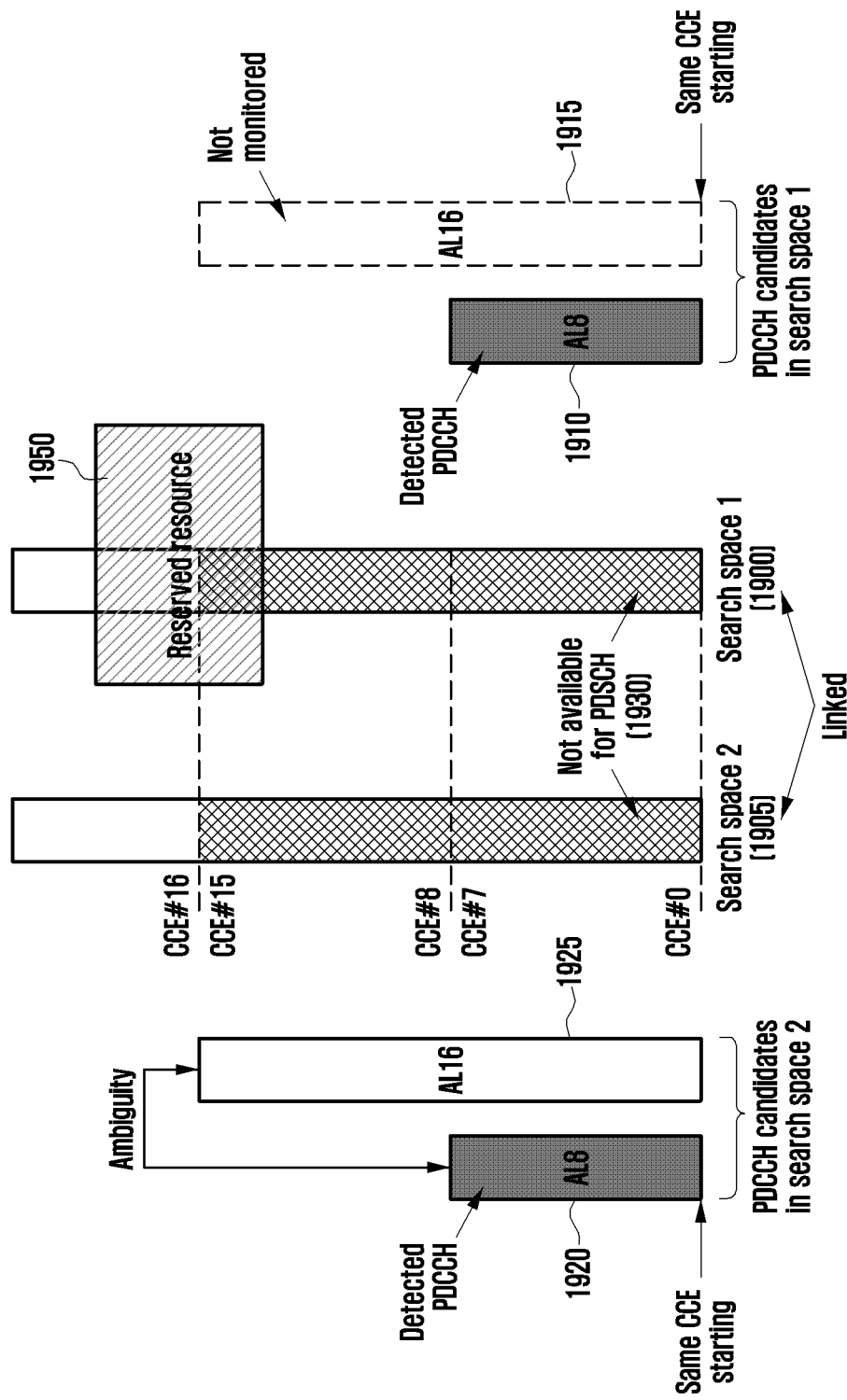
FIG. 19 illustrates a method for PDSCH rate matching in consideration of PDCCH repetition transmission, ambiguity of AL determination, and a reserved resource according to an embodiment of the disclosure.

FIG. 19 illustrates a method for PDSCH rate matching in consideration of PDCCH repetition transmission, ambiguity of AL determination, and a reserved resource according to an embodiment of the disclosure.

Referring to FIG. 19, it is assumed that the UE receives PDCCHs through two linked search spaces 1900 and 1905. An AL of the received PDCCH may correspond to one of 8 or 16. The UE may determine whether a search space satisfying above-described <Condition> exists among two search spaces. For example, search space 1 1900 does not satisfy <Condition>, but search space 2 1905 satisfies <Condition>. According to Method 2-2, the UE may determine an AL in search space 2 in which ambiguity with respect to AL determination occurs. An AL may be assumed to be 16 in search space 2 (AL 16 is a super-set (or higher set) of AL 8, thus it is determined as AL 16). That is, the UE may assume that a time-frequency resource corresponding to the PDCCH candidate of AL 16 in search space 2 is not used for a PDSCH. The AL may be identically applied to remaining search space 1. Therefore, the UE may assume that a time-frequency resource 1930 corresponding to the PDCCH candidate of AL 16 in search space 1 is not used for a PDSCH as well.

Method 2-3 Determine PDSCH Rate-Matching Based on Search Space Having No Ambiguity in a Case in which at Least One of Linked Search Spaces has Ambiguity An embodiment of Method 2-3 will be described with reference to FIG. 20. The UE may determine a resource unavailable for a PDSCH based on configurations of all linked search spaces through which a received PDCCH is transmitted. More specifically, in case that ambiguity with respect to AL determination occurs in at least one search space of all linked search spaces through which a received PDCCH is transmitted, the UE may determine a resource unavailable for a PDSCH by determining an AL in the search space in which the ambiguity does not occur, and determine a resource unavailable for a PDSCH in remaining linked search spaces based on the AL. For example, in a search space satisfying aforementioned <Condition>, i.e., in a search space in which a 1-symbol, non-interleaving mapping CORESET is configured and a PDCCH candidate of AL 8 and a PDCCH candidate of AL 16, which start from the same CCE index, are included, ambiguity with respect to AL determination may occur.

Figure 20:
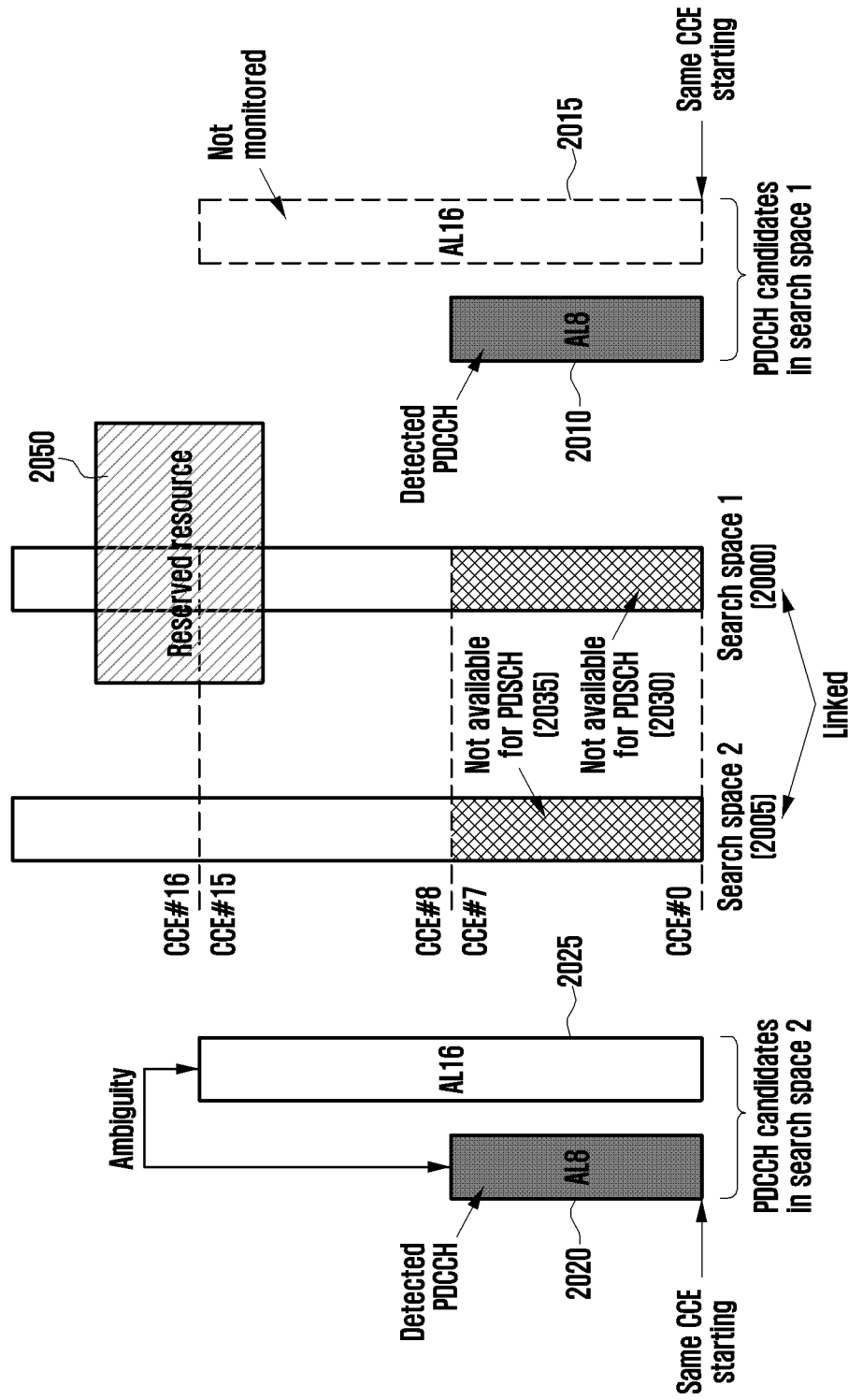
FIG. 20 illustrates a method for PDSCH rate matching in consideration of PDCCH repetition transmission, ambiguity of AL determination, and a reserved resource according to an embodiment of the disclosure.

FIG. 20 illustrates a method for PDSCH rate matching in consideration of PDCCH repetition transmission, ambiguity of AL determination, and a reserved resource according to an embodiment of the disclosure.

Referring to FIG. 20, it is assumed that the UE receives PDCCHs through two linked search spaces 2000 and 2005. An AL of the received PDCCH may correspond to one of 8 or 16. The UE may determine whether a search space satisfying above-described <Condition> exists among two search spaces. For example, search space 1 2000 does not satisfy <Condition>, but search space 2 2005 satisfies <Condition>. According to Method 2-3, the UE may determine an AL in search space 1 in which ambiguity with respect to AL determination does not occur.

When the UE receives a PDCCH 2010 of AL 8 through search space 1, the UE may assume the AL 8. That is, the UE may assume that a time-frequency resource of the PDCCH candidate 2030 of AL 8 in search space 1 is not used for a PDSCH. The UE may assume the same AL in remaining search space 2 2005. That is, the UE may assume that a time-frequency resource of the PDCCH candidate 2035 of AL 8 in search space 2 is not used for a PDSCH.

When the UE is not capable of receiving a PDCCH of AL 8 through search space 1, the UE may assume that the PDCCH candidate of AL 8 is not transmitted through search space 1. That is, the UE may use the time-frequency resource of search space 1 for a PDSCH. Here, the UE should determine an AL in search space 2. Since search space 2 satisfies <Condition>, it is preferable to determine as AL 16 (AL 16 is a super-set (or higher set) of AL 8, thus it is determined as AL 16). That is, the UE may assume that a time-frequency resource of the PDCCH candidate of AL 16 in search space 2 is not used for a PDSCH.

Method 2-2 or Method 2-3 determines an AL based on one search space among linked search spaces, and applies the determined AL to the remaining search space. The one search space may be a search space satisfying <Condition> in Method 2-2 or a search space not satisfying <Condition> in Method 2-3.

As another method, the one search space may be determined regardless of <Condition>. For example, a search space having the lowest (or highest) index or ID among linked search space may be selected. The UE may determine an AL based on the search space having the lowest (highest) index or ID among linked search spaces and apply the determined AL to the remaining search spaces.

As another example, among the linked search spaces, the earliest (or latest) search space in time may be selected. The UE may determine an AL based on the earliest (or latest) search space in time among linked search spaces and apply the determined AL to the remaining search spaces. In case that one search space is determined, an AL to be assumed in the search space may be determined through the methods of FIGS. 17 to 20.

In FIGS. 17 to 20, in case that there is no reserved resource, both search spaces satisfied <Condition>. Due to the reserved resource, one search space of two search spaces satisfied <Condition>, and the remaining one search space did not satisfy <Condition>. A case in which one of two search spaces satisfies <Condition> and the other does not satisfy <Condition>, even when there is no reserved resource, will be described below with reference to FIGS. 21 to 23B. For example, as described above, whether <Condition> is satisfied may be determined according to whether a 1-symbol, non-interleaving mapping CORESET is configured and a PDCCH candidate of AL 8 and a PDCCH candidate of AL 16, which start from the same CCE index, are included.

FIGS. 21 to 23B illustrate a PDSCH rate matching for repeated PDCCH transmission and ambiguity of AL determination according to an embodiment of the disclosure.

Referring to FIGS. 21 to 23B, two linked search spaces, i.e., search space 1 and search space 2 are configured for the UE. The two search spaces may belong to different CORESETs, and linked PDCCH candidates may start at different CCE indexes according to indexes (or IDs) of the CORESET in the different CORESETs. For example, PDCCH candidates of AL 16 of search space 1 and search space 2 start at CCE index 0. However, a PDCCH candidate of AL 8 of search space 2 may start at CCE index 0, and a PDCCH candidate of AL 8 of search space 1 may start at CCE index 16. Therefore, the case of search space 2 satisfies <Condition>, but the case of search space 1 does not satisfy <Condition>. In the above-described search space configuration, a resource not used for a PDSCH may be determined based on a method described below.

Method 2-1 Determine PDSCH Rate-Matching for Each Linked Search Space

An embodiment of Method 2-1 will be described with reference to FIG. 21. The UE may determine a resource unavailable for a PDSCH for each linked search space. More specifically, the UE may determine ALs based on PDCCHs received through each linked search space or a configuration of each search space, and determine a resource unavailable for a PDSCH based on the ALs for each search space.

Figure 21:
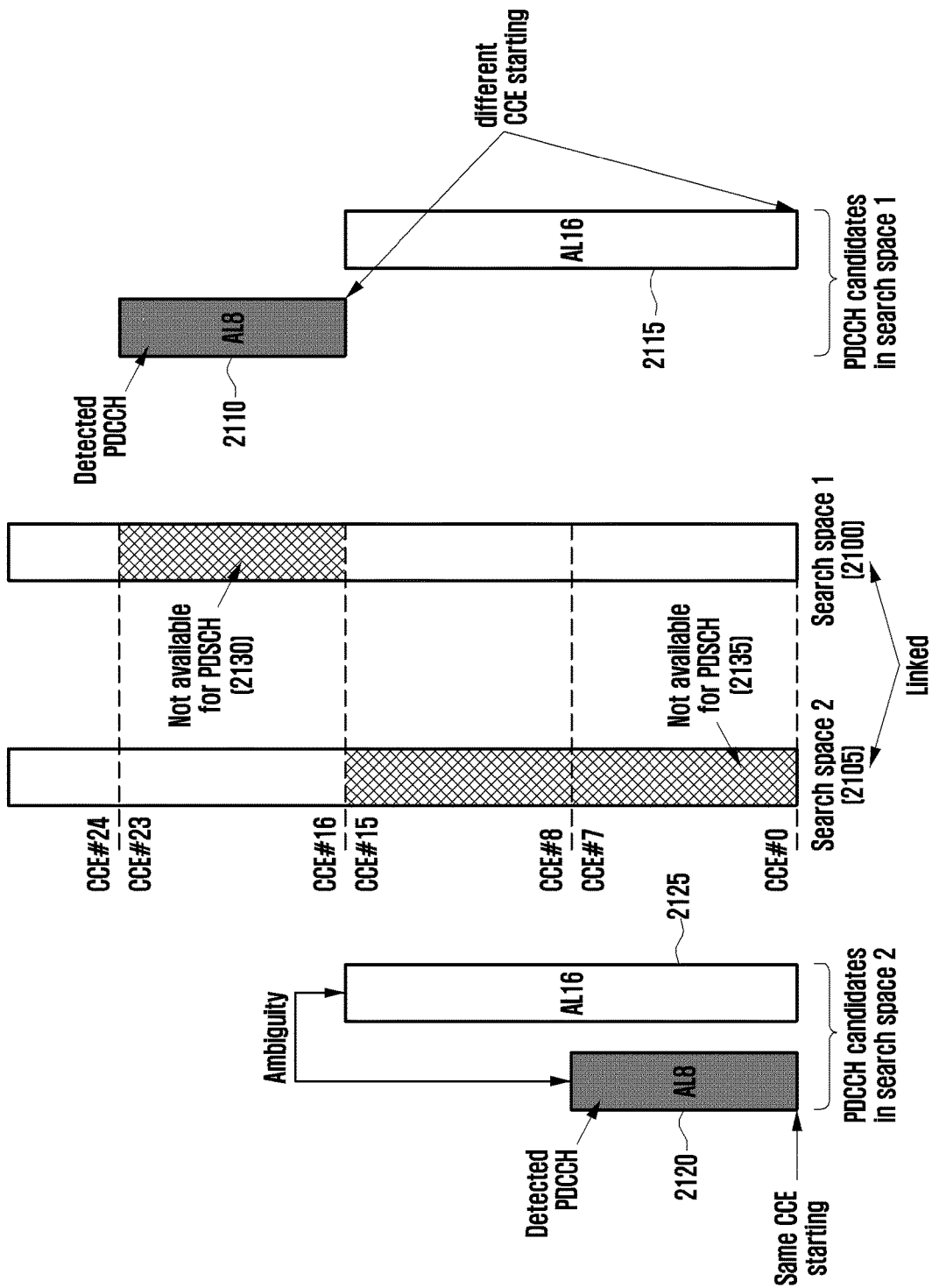
FIG. 21 illustrates PDSCH rate matching in case of repeated PDCCH transmission and ambiguity of AL determination according to an embodiment of the disclosure.

FIG. 21 illustrates PDSCH rate matching in case of repeated PDCCH transmission and ambiguity of AL determination according to an embodiment of the disclosure.

Referring to FIG. 21, it is assumed that the UE receives PDCCHs 2110 and 2120 of AL 8 through linked search spaces 2100 and 2105. The UE may determine an AL in each of the two linked search spaces. For example, the PDCCH candidate 2120 of AL 8 and the PDCCH candidate 2125 of AL 16, which satisfy aforementioned <Condition>, exist in search space 2 2105, and thus the UE may determine an AL in search space 2 is 16 (AL 16 is a super-set (or higher set) of AL 8, thus it is determined as AL 16). That is, the UE may assume that a time-frequency resource 2135 corresponding to the PDCCH candidate of AL 16 of search space 2 is unavailable for a PDSCH. The PDCCH candidate 2110 of AL 8 and the PDCCH candidate 2115 of AL 16, which satisfy aforementioned <Condition>, do not exist in search space 1 2100. This is because the PDCCH candidate of AL 16 of search space 1 is not received (monitored). Therefore, AL 8, which is the received AL, may be assumed in search space 1. That is, the UE may assume that a time-frequency resource 2130 corresponding to the PDCCH candidate of AL 8 of search space 1 is unavailable for a PDSCH.

Method 2-2 Determine PDSCH Rate-Matching Based on Search Space Having Ambiguity in Case that any One of Linked Search Spaces has Ambiguity An embodiment of Method 2-2 will be described with reference to FIG. 22. The UE may determine a resource unavailable for a PDSCH based on configurations of all linked search spaces through which a received PDCCH is transmitted. More specifically, when ambiguity with respect to AL determination occurs at least one search space of all linked search spaces through which a received PDCCH is transmitted, the UE may determine a resource unavailable for a PDSCH by determining an AL in the search space in which the ambiguity occurs, and determine a resource unavailable for a PDSCH in remaining linked search spaces based on the AL.

Figure 22:
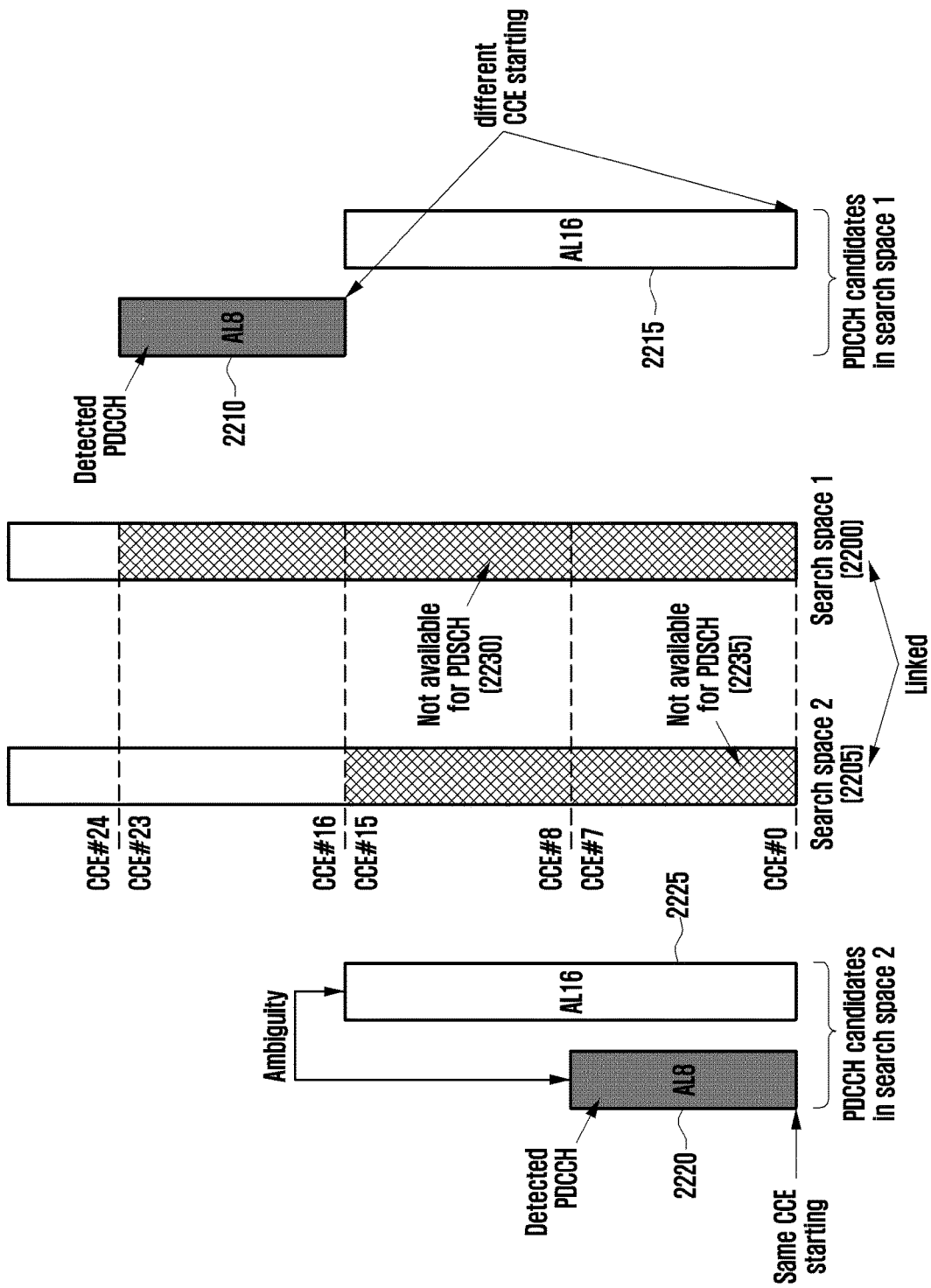
FIG. 22 illustrates PDSCH rate matching in case of repeated PDCCH transmission and ambiguity of AL determination according to an embodiment of the disclosure.

FIG. 22 illustrates PDSCH rate matching in case of repeated PDCCH transmission and ambiguity of AL determination according to an embodiment of the disclosure.

Referring to FIG. 22, it is assumed that the UE receives PDCCHs through two linked search spaces 2200 and 2205. An AL of the received PDCCH may correspond to one of 8 or 16. The UE may determine whether a search space satisfying aforementioned <Condition> exists among two search spaces. For example, search space 1 2200 does not satisfy <Condition>, but search space 2 2205 satisfies <Condition>. According to Method 2-2, the UE may determine an AL in search space 2 in which ambiguity with respect to AL determination occurs. An AL is assumed to be 16 in search space 2 (AL 16 is a super-set (or higher set) of AL 8, thus it is determined as AL 16). That is, the UE may assume that a time-frequency resource 2235 corresponding to the PDCCH candidate of AL 16 in search space 2 is not used for a PDSCH. The time-frequency resource of the PDCCH candidate 2225 of AL 16 in search space 2 2205 may include all of time-frequency resources of the PDCCH candidate 2220 of AL 8. Accordingly, assuming, by the UE, that the time-frequency resource corresponding to the PDCCH candidate of AL 16 in search space 2 is not used for a PDSCH is the same as assuming, by the UE, that the time-frequency resources corresponding to the PDCCH candidate of AL 8 the PDCCH candidate of AL 16 in search space 2 are not used for a PDSCH.

In addition, a resource not used for a PDSCH in remaining search space 1 2200 may be determined based on the AL. AL 16, which is a super-set (or higher set) of AL 8 and AL 16, is assumed to AL 16 in search space 2. However, AL 16 2215 in search space 1 is not a super-set of AL 8 2210. Therefore, the UE may assume that a union 2230 of the time-frequency resource corresponding to the PDCCH candidate 2210 of AL 8 and the time-frequency resource corresponding to the PDCCH candidate 2215 of AL 16 in search space 1 is not used for a PDSCH. That is, it may be assumed that both PDCCH candidates are not used for a PDSCH in search space 1.

Method 2-3 Determine PDSCH Rate-Matching Based on Search Space Having No Ambiguity in Case that any One of Linked Search Spaces has Ambiguity An embodiment of Method 2-3 will be described with reference to FIGS. 23A to 23B. The UE may determine a resource unavailable for a PDSCH based on configurations of all linked search spaces through which a received PDCCH is transmitted. More specifically, when ambiguity with respect to AL determination occurs at least one search space of all linked search spaces through which a received PDCCH is transmitted, the UE may determine a resource unavailable for a PDSCH by determining an AL in the search space in which the ambiguity does not occur, and determine a resource unavailable for a PDSCH in remaining linked search spaces based on the AL.

Figure 23A:
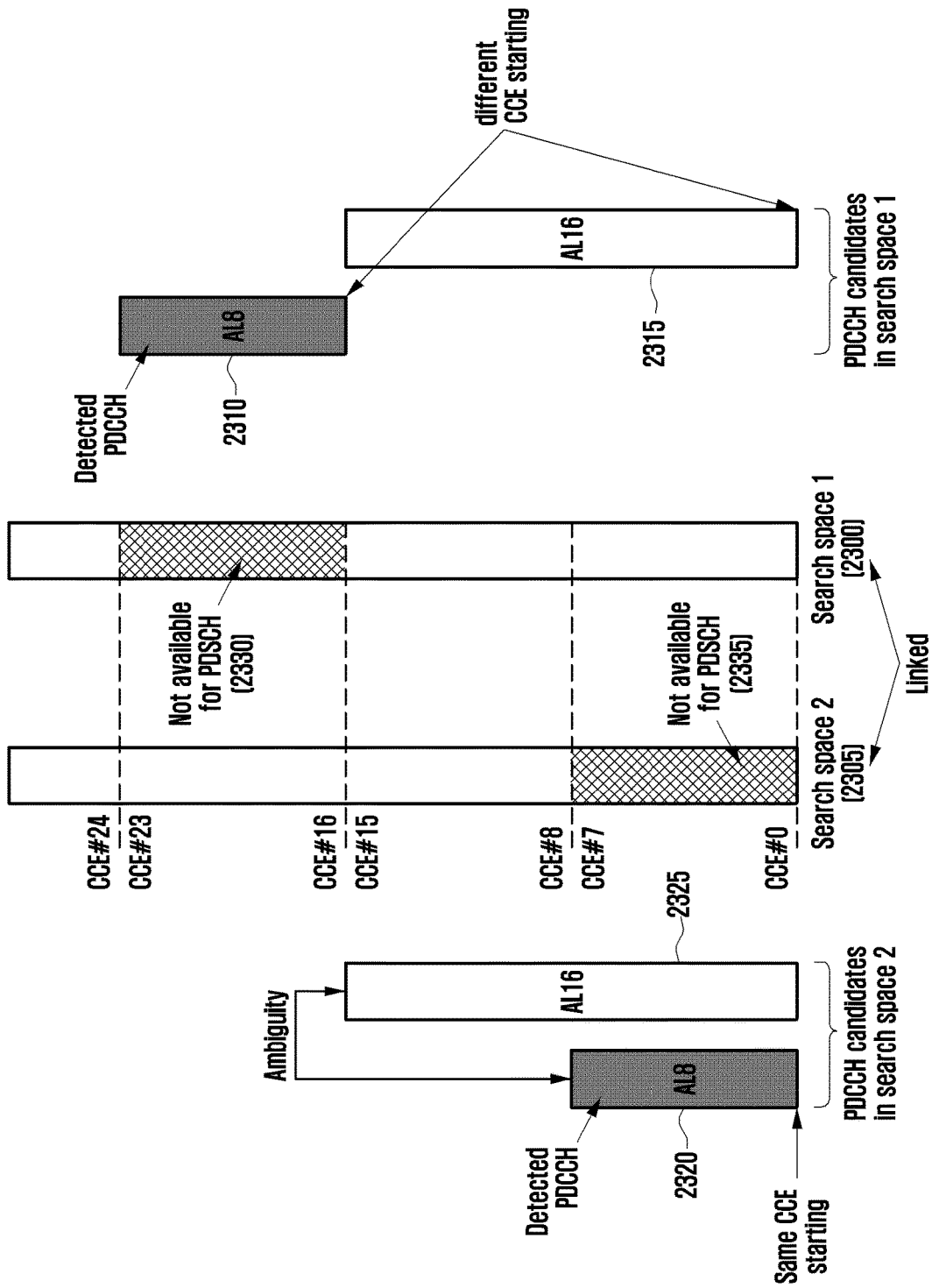
FIG. 23A illustrates PDSCH rate matching in case of repeated PDCCH transmission and ambiguity of AL determination according to an embodiment of the disclosure.

FIG. 23A illustrates PDSCH rate matching in case of repeated PDCCH transmission and ambiguity of AL determination according to an embodiment of the disclosure.

Referring to FIG. 23A, it is assumed that the UE receives PDCCHs 2310, 2320 of AL 8 through two linked search spaces 2300 and 2305. The UE may determine whether a search space satisfying above-described <Condition> exists among two search spaces. For example, search space 1 2300 does not satisfy <Condition>, but search space 2 2305 satisfies <Condition>. According to Method 2-3, the UE may determine an AL in search space 1 in which ambiguity with respect to AL determination does not occur. When the UE receives a PDCCH 2310 of AL 8 through search space 1, the UE may assume the AL 8. That is, the UE may assume that a time-frequency resource 2330 corresponding to the PDCCH candidate of AL 8 in search space 1 is not used for a PDSCH. The UE may assume the same AL in remaining search space 2. That is, the UE may assume that a time-frequency resource 2335 corresponding to the PDCCH candidate of AL 8 in SS 2 is not used for a PDSCH.

Figure 23B:
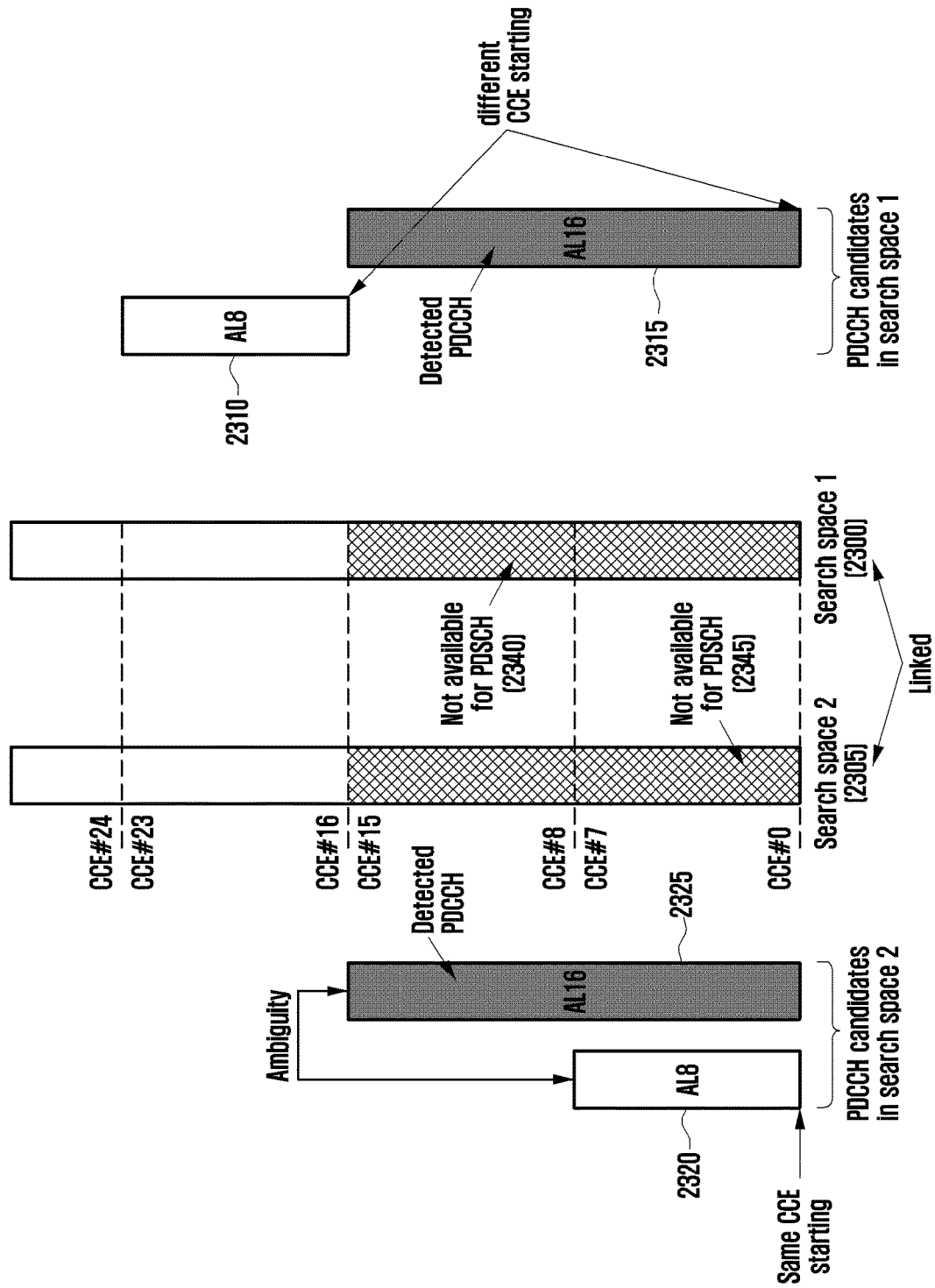
FIG. 23B illustrates PDSCH rate matching in case of repeated PDCCH transmission and ambiguity of AL determination according to an embodiment of the disclosure.

FIG. 23B illustrates PDSCH rate matching in case of repeated PDCCH transmission and ambiguity of AL determination according to an embodiment of the disclosure.

Referring to FIG. 23B, it is assumed that the UE receives PDCCHs 2315 and 2325 of AL 16 through two linked search spaces 2300 and 2305. The UE may determine whether a search space satisfying above-described <Condition> exists among two search spaces. For example, search space 1 2300 does not satisfy <Condition>, but search space 2 2305 satisfies <Condition>. According to Method 2-3, the UE may determine an AL in search space 1 in which ambiguity with respect to AL determination does not occur. When the UE receives a PDCCH 2315 of AL 16 through search space 1, the UE may assume the AL 16. That is, the UE may assume that a time-frequency resource 2340 corresponding to the PDCCH candidate of AL 16 in search space 1 is not used for a PDSCH. The UE may assume the same AL in remaining search space 2. That is, the UE may assume that a time-frequency resource 2345 corresponding to the PDCCH candidate of AL 16 in search space 2 is not used for a PDSCH.

Figure 24:
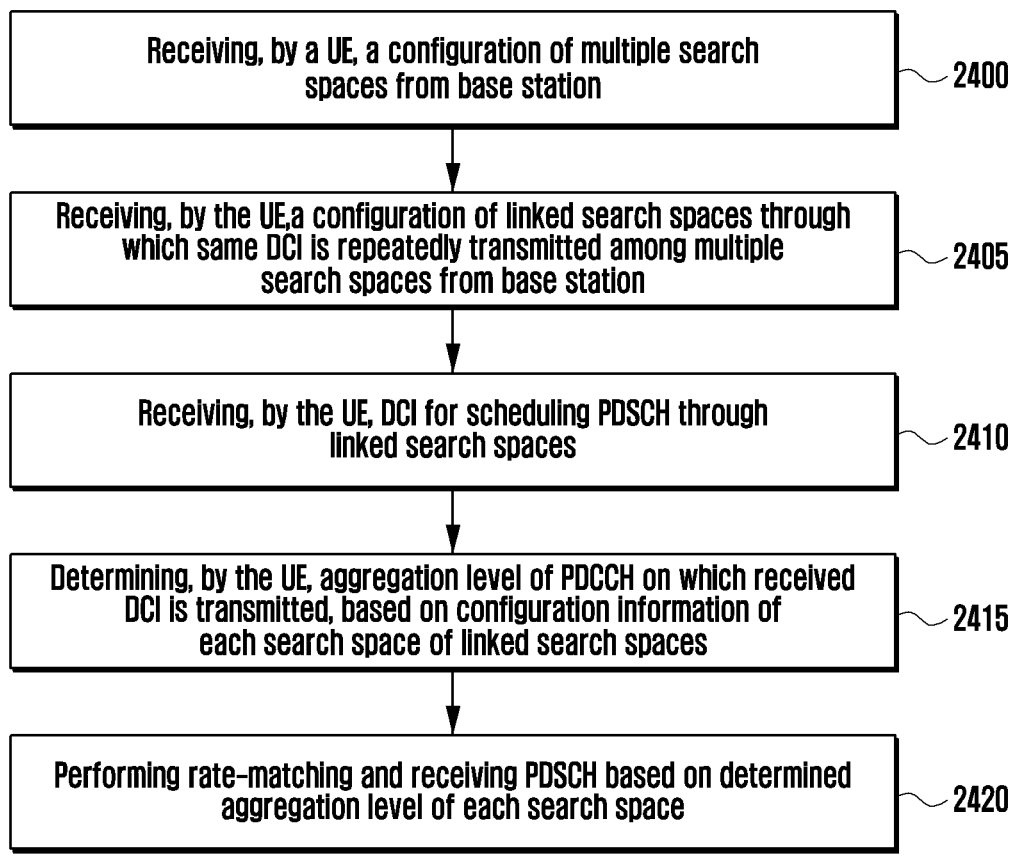
FIG. 24 is a flowchart illustrating a PDSCH rate-matching method according to an embodiment of the disclosure.
Figure 25:
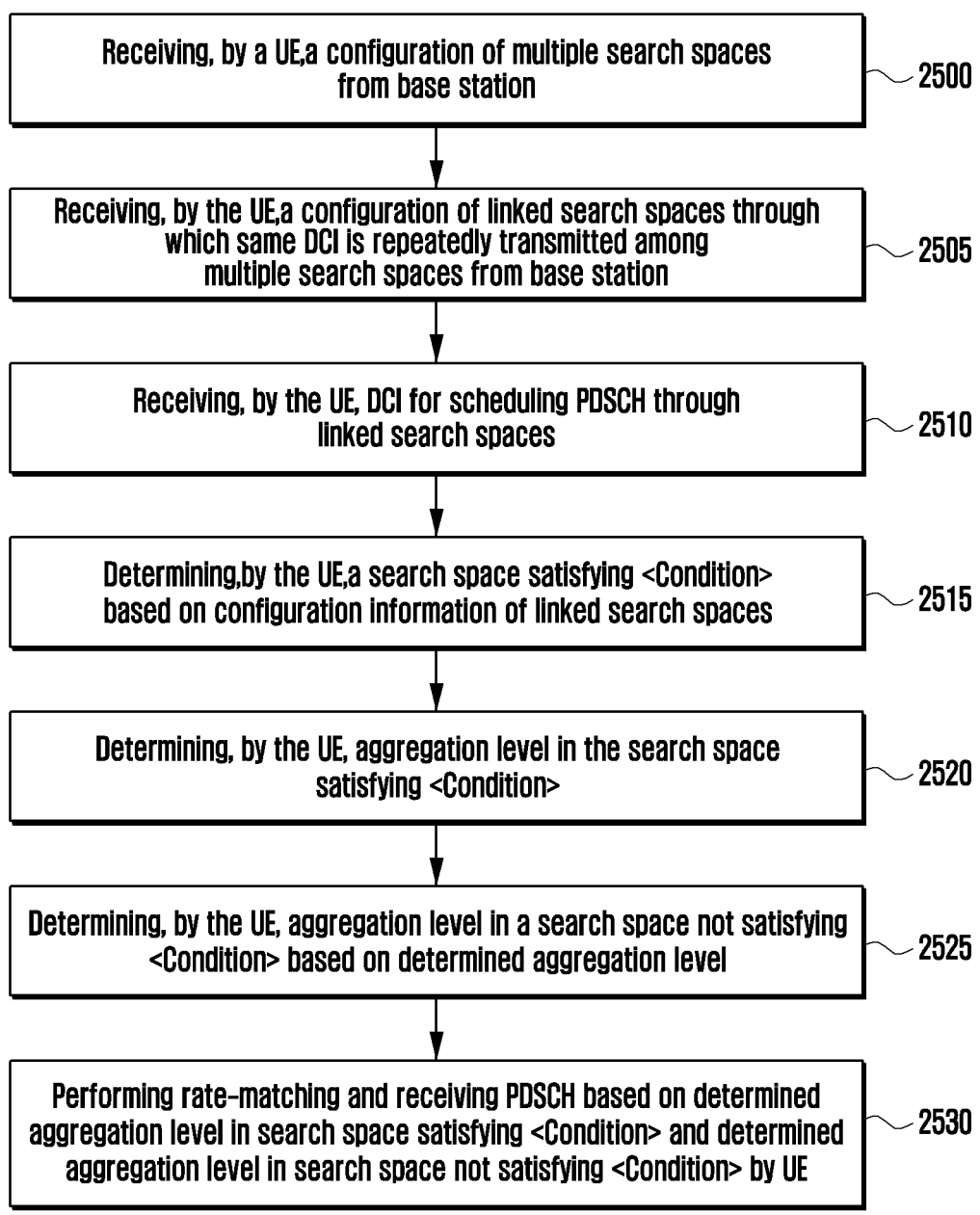
FIG. 25 is a flowchart illustrating a PDSCH rate-matching method according to an embodiment of the disclosure.
Figure 26:
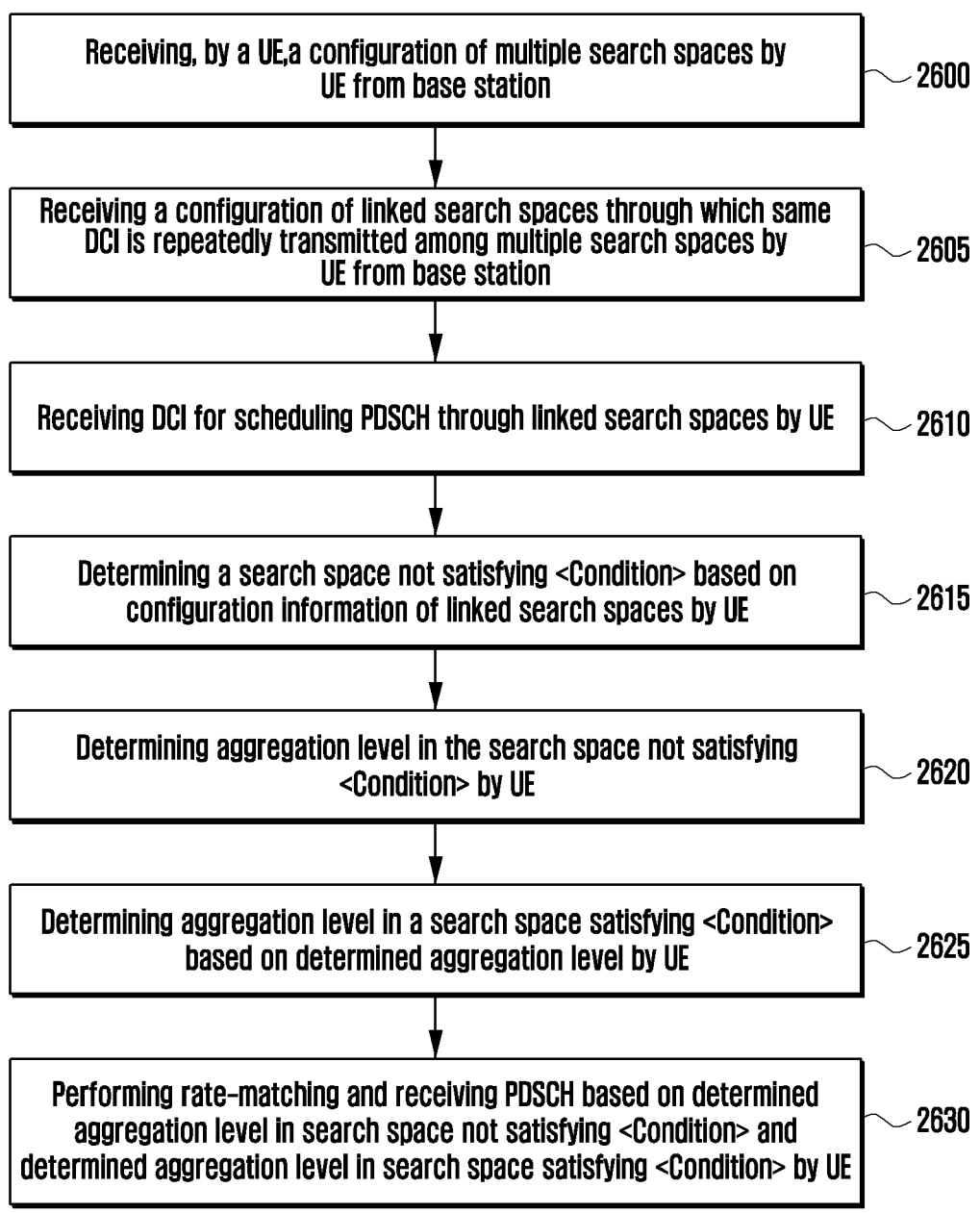
FIG. 26 is a flowchart illustrating a PDSCH rate-matching method according to an embodiment of the disclosure.

FIGS. 24 to 26 are flowcharts illustrating PDSCH rate-matching methods according to an embodiment of the disclosure. More specifically, FIGS. 24, 25, and 26 illustrate flowcharts of Method 2-1, Method 2-2, and Method 2-3, respectively.

Referring to FIG. 24, the UE may be configured with multiple search spaces from the BS in step 2400. Each search space of the multiple search spaces may include at least one PDCCH candidate of AL 8 and at least one PDCCH candidate of AL 16.

In step 2405, the UE may be configured with linked search spaces through which DCI is repeatedly transmitted (i.e., repeated PDCCH transmission) among the multiple search spaces from the BS.

In step 2410, the UE may receive DCI for scheduling a PDSCH through the linked search spaces.

In step 2415, the UE may determine (decide) an AL of a PDCCH candidate through which the DCI is transmitted, based on configuration information of each search space of the linked search spaces. When an AL is determined in each search space, if <Condition> is satisfied, an AL may be determined as AL 16, and if <Condition> is not satisfied, an AL may be determined as AL 8. Further, when an AL is determined in one search space, another linked search space may not be considered.

In step 2420, the UE may perform rate-matching to receive a PDSCH, based on the determined AL in each search space.

Referring to FIG. 25, the UE may receive a configuration of multiple search spaces from the BS in step 2500. Each search space of the multiple search space may include at least one PDCCH candidate of AL 8 and at least one PDCCH candidate of AL 16.

In step 2505, the UE may be configured with linked search spaces through which DCI is repeatedly transmitted among the multiple search spaces from the BS.

In step 2510, the UE may receive DCI for scheduling a PDSCH through the linked search spaces.

In step 2515, the UE may determine (decide) a search space satisfying <Condition>, based on configuration information of the linked search spaces.

In step 2520, the UE may determine (decide) an AL in the search space satisfying <Condition>. For example, in case that <Condition> is satisfied, the UE may determine an AL to be AL 16.

In step 2525, the UE may determine (decide) an AL in a search space not satisfying <Condition>, based on the determined AL. Since the UE determined the AL of the search space satisfying <Condition> to be 16, and the UE may determine the AL of the search space not satisfying <Condition> to be 16. When AL 16 is not a super-set of AL 8 in the search space not satisfying <Condition> (i.e., a time-frequency resource of a PDCCH of AL 16 does not completely include a time-frequency resource of a PDCCH of AL 8), the UE may determine the AL of the search space not satisfying <Condition> to be 8 and 16.

In step 2530, the UE may perform rate-matching to receive a PDSCH, based on the determined AL in the search space satisfying <Condition> and the determined AL in the search space not satisfying <Condition>. The time-frequency resource of the PDCCH candidate of AL 16 of the search space satisfying <Condition> is not used for a PDSCH and the time-frequency resources of the PDCCH candidate of AL 8 and the PDCCH candidate of AL 16 of the search space not satisfying <Condition> are not used for a PDSCH.

Referring to FIG. 26, the UE may be configured with multiple search spaces from the BS in step 2600. Each search space of the multiple search spaces may include at least one PDCCH candidate of AL 8 and at least one PDCCH candidate of AL 16.

In step 2605, the UE may be configured with linked search spaces through which DCI is repeatedly transmitted among the multiple search spaces from the BS.

In step 2610, the UE may receive DCI for scheduling a PDSCH through the linked search spaces.

In step 2615, the UE may determine (decide) a search space not satisfying <Condition>, based on configuration information of the linked search spaces.

In step 2620, the UE may determine (decide) an AL in the search space not satisfying <Condition>. In case that <Condition> is not satisfied, there is no separate AL ambiguity, and thus the UE may determine the AL which has been assumed when receiving DCI as the AL of the search space not satisfying <Condition>.

In step 2625, the UE may determine (decide) an AL in the search space satisfying <Condition>, based on the determined AL. The UE may determine the same AL as the AL of the search space not satisfying <Condition>.

In step 2630, the UE may perform rate-matching to receive a PDSCH, based on the determined AL in the search space not satisfying <Condition> and the determined AL in the search space satisfying <Condition>. By assuming the determined same AL in the search space not satisfying <Condition> and the search space satisfying <Condition>, a resource not used for a PDSCH may be determined.

Method 2-4: Include AL Indicator

A method for determining an AL by a UE has been described above through Methods 2-1, 2-2, and 2-3, and a method performed by a BS for allowing DCI to include information on an AL of a PDCCH and transmitting the DCI will be described through Method 2-4 below.

The BS may transmit DCI scheduling a PDSCH including an indicator indicating an AL of the PDCCH through which the DCI is transmitted. For example, the indicator may be configured as 1 bit, wherein the 1 bit may indicate one of AL 8 or AL 16. The UE may receive the DCI for scheduling the PDSCH, identify the received DCI through the indicator, and determine an AL using the indicator. The UE may apply the determined AL to all linked search spaces. That is, the time-frequency resource of a PDCCH candidate corresponding to the same AL indicated by the indicator in all the linked search spaces may not be used for PDSCH reception.

As another example, the indicator may be indicated by a specific combination of DCI fields including DCI, instead of by using a separate bit. For example, if a low modulation and coding scheme (MCS) value is indicated through an MCS field included in the received DCI, a channel condition may not be good and the UE may then assume AL 16. If repeated PDSCH transmission is indicated through a time-domain resource assignment (TDRA) field included in the received DCI, a channel condition may not be good and the UE may then assume AL 16.

As another example, the indicator may be indicated by borrowing some bits of existing bits of the DCI. For example, a specific 1 bit of a frequency-domain resource assignment (FDRA) included in the DCI received by the UE may be re-purposed for use as the indicator. A specific 1 bit of an MCS field included in the DCI received by the UE may also be re-purposed for the indicator. The specific 1 bit in the MCS field may be the MSB. If the MSB 1 bit of the MCS field is used, bits that may be indicated by the MCS field are 4 bits, and a maximum of 16 code points may be indicated. The maximum of 16 code points may include code points corresponding to low MCSs and code points indicating a modulation order.

As another example, the indicator may be indicated by a separate RNTI. That is, if DCI scrambled by a specific RNTI is received, an AL of the PDCCH transmitted by the DCI may be assumed to be a specific value (e.g., 8 or 16). For example, if DCI scrambled by an MCS-C-RNTI is received, the UE may assume an AL of the PDCCH transmitted by the DCI to be 16 because the MCS-C-RNTI is used for a case requiring higher reliability.

When the UE receives DCI through a PDCCH candidate of AL 1, 2, or 4, the UE may ignore the indicator. That is, the indicator may be used when the UE receives DCI through a PDCCH candidate of AL 8 or 16. Further, the indicator may be used when the linked search space satisfies <Condition> and the UE receives a PDCCH candidate of AL 8 or 16. Otherwise, the UE may ignore the indicator.

Alternatively, the UE may assume one AL without the indicator. If <Condition> is satisfied, the BS is assumed to always transmit a PDCCH at a determined AL. For example, the AL value may be assumed to be one of 8 or 16. The BS may configure one value for the UE through a higher layer. When there is a search space satisfying linked <Condition>, the UE may expect to receive only a PDCCH candidate corresponding to one AL value. For example, if the BS indicates 16 as one value to the UE, the UE may receive (monitor) a PDCCH candidate of AL 16, but not receive (monitor) a PDCCH candidate of AL 8. In view of the foregoing, there is no ambiguity with respect to an AL.

Third Embodiment: Method for Distinguishing AL 8 and AL 16 and Determining PUCCH Resource According Thereto The UE may be configured with maximum 32 PUCCH resources for a PUCCH set. DCI for scheduling a PDSCH or DCI indicating HARQ-ACK transmission (e.g., SPS PDSCH release DCI, DCI for triggering a type-3 HARQ-ACK codebook, DCI indicating Scell dormancy, etc.) should indicate one PUCCH resource among the maximum 32 PUCCH resources. However, the DCI includes a PUCCH resource indicator field of up to 3 bits. Accordingly, one PUCCH resource among the maximum 32 PUCCH resources should be indicated by using additional information other than the 3-bit PUCCH resource indicator field. To this end, in the 3GPP Rel-15, a lowest CCE index (or start CCE index/first CCE index) of a PDCCH through which DCI is transmitted may be used.

Figure 27:
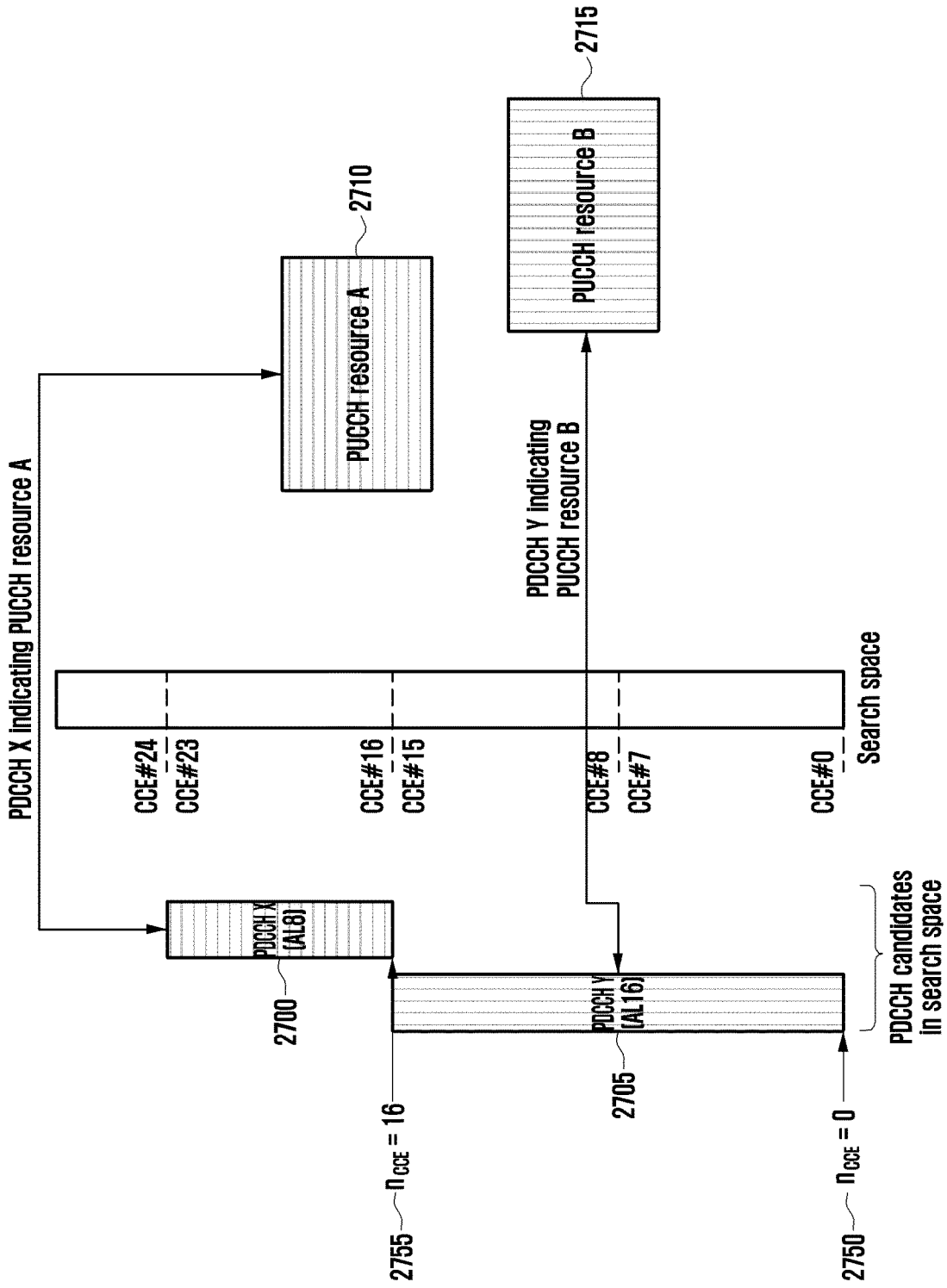
FIG. 27 illustrates a PUCCH resource determination method according to an embodiment of the disclosure.

FIG. 27 illustrates a PUCCH resource determination method according to an embodiment of the disclosure.

Referring to FIG. 27, a lowest CCE index of PDCCH X 2700 of AL 8 is $n_{CCE}=16$ (2755), and a lowest CCE index of PDCCH Y 2705 of AL 16 is $n_{CCE}=0$ (2750). If the UE receives DCI through PDCCH X of AL 8, a PUCCH resource may be determined according to the lowest CCE index of 16. In the example of FIG. 27, PUCCH resource A 2710 is indicated. When the UE receives DCI through PDCCH Y of AL 16, a PUCCH resource may be determined according to the lowest CCE index of 0. In the example of FIG. 27, PUCCH resource B 2715 is indicated. As such, the lowest CCE indexes of the PDCCHs through which the UE receives DCI are different and thus different PUCCH resources may be indicated.

More specifically, the PUCCH resource may be determined according to Equation (3).

Equation (3)

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + & \text{if } \Delta_{PRI} \geq R_{PUCCH} \bmod 8 \\ \Delta_{PRI} \cdot \left\lfloor \frac{R_{PUCCH}}{8} \right\rfloor + R_{PUCCH} \bmod 8 & \end{cases}$$

In Equation (3), $N_{CCE,p}$ is the number of CCEs included in CORESET p through which DCI is received, $n_{CCE,p}$ is the lowest CCE index (or start CCE index) of the PDCCH through which DCI is received, and $\Delta_{PRI}$ is a value of a PUCCH resource indicator field of DCI, and correspond to one of 0, 1, 2, 3, 4, 5, 6, and 7. $R_{PUCCH}$ is the number of PUCCH resources configured in a PUCCH resource set and larger than 8 or less than or equal to 32. According to Equation (3), $r_{PUCCH}$ may have one value of 0,1, . . . , and $R_{PUCCH}-1$.

In order to determine a PUCCH resource according to Equation (3), the UE should determine a lowest CCE index (or start CCE index) of a PDCCH through which DCI is received. According to FIG. 15A and FIG. 15B and the <Condition> described above, the UE receives DCI, but it may be ambiguous whether the DCI was transmitted through the PDCCH of AL 8 or the PDCCH of AL 16. However, referring to FIGS. 15A and 15B and <Condition>, the PDCCH of AL 8 and the PDCCH of AL 16 may start from the same CCE. Therefore, although there is ambiguity with respect to AL, the UE may determine the lowest CCE index (or start CCE index) without ambiguity. That is, when 1-symbol, non-interleaving mapping CORESET is configured and the UE receives (monitors) a PDCCH in a search space including AL 8 PDCCH candidates and AL 16 PDCCH candidates which are starting from the same CCE index. The UE may determine the lowest CCE index (or the starting CCE index) without ambiguity.

For a linked search space, the lowest CCE indexes (or start CCE indexes) of received PDCCHs may be different for each search space. Therefore, in this case, the lowest CCE index of a received PDCCH through one search space should be used. For example, a lowest CCE index of a PDCCH received through a search space having a lowest index among linked search spaces may be used.

Figure 28:
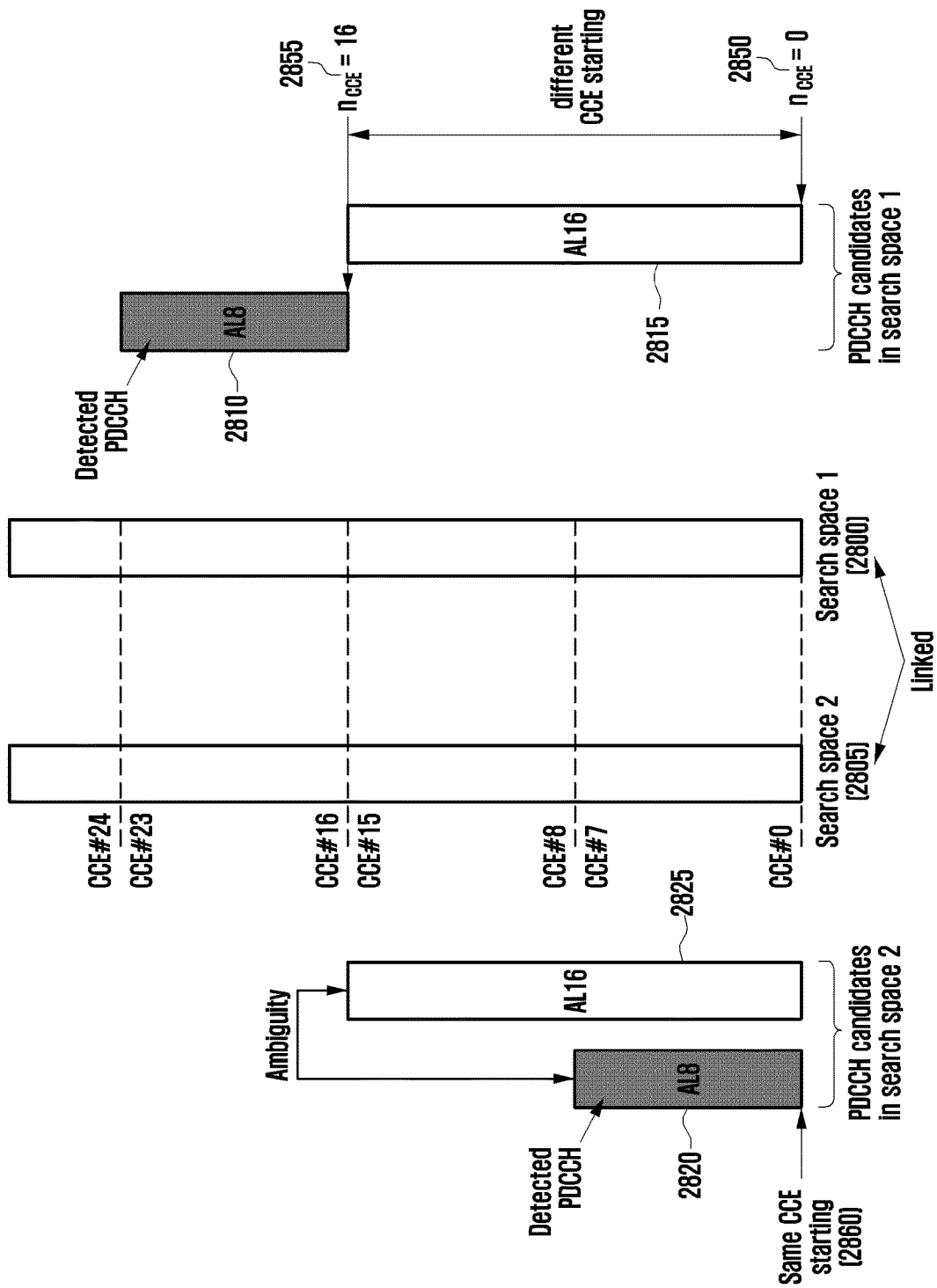
FIG. 28 illustrates a PUCCH resource determination method in case of repeated PDCCH transmission and ambiguity of AL determination according to an embodiment of the disclosure.

However, referring to FIG. 28, in case that among linked search spaces, one search space satisfies <Condition> and another search space does not satisfy <Condition>, it may be ambiguous as to which CCE index the UE should determine a PUCCH resource.

As described above, <Condition> is defined as follows.

<Condition>: A 1-symbol, non-interleaved mapping CORESET is configured and a PDCCH candidate of AL 8 and a PDCCH candidate of AL 16, which start from the same CCE index, are included.

FIG. 28 illustrates a method for determining a PUCCH resource in case of repeated PDCCH transmission and ambiguity of AL determination according to an embodiment of the disclosure.

Referring to FIG. 28, the UE may not determine whether an AL of a PDCCH through which DCI is transmitted is 8 or 16 in search space 2 2805 satisfying <Condition>. The UE may determine which PDCCH is transmitted in search space 1 2800 not satisfying <Condition>. However, as described above, the UE may perform respective PDCCH decoding by using only search space 2, but may not receive a PDCCH through search space 1 because a channel environment corresponding to search space 1 is deteriorated (e.g., high interference or blocking of a TRP through which search space 1 is transmitted). In this case, the UE may receive a PDCCH by using only a PDCCH transmitted through search space 2. Accordingly, a problem occurs in case that the UE determines a lowest CCE index (or start CCE index) of the received PDCCH in search space 1. For reference, as described above, a PUCCH resource may be determined by using a lowest CCE index (start CCE index) of the PDCCH received through a search space having a lowest index among linked search spaces, that is, search space 1.

Method 3-1 Using Lowest CCE Index (Start CCE Index) of PDCCH Received Through Search Space Satisfying <Condition>

Referring to FIG. 28, even if there is ambiguity with respect to an AL in a search space (e.g., search space 2 2805) satisfying <Condition> among linked search spaces, a lowest CCE index (start CCE index) may be determined without ambiguity. Accordingly, when the lowest CCE index (start CCE index) 2860 is used, the UE and the BS may determine a PUCCH resource. In other words, when the UE receives a PDCCH for transmitting DCI, an AL of the PDCCH is 8 2820 or 16 2824, and at least one search space among search spaces to which the PDCCH is linked satisfies <Condition>, a PUCCH resource may be determined by using a lowest CCE index (start CCE index) 2860 of the PDCCH in the search space satisfying <Condition>. In general cases other than the above-described case, a PUCCH resource may be determined by using a lowest CCE index (start CCE index) of a PDCCH received through a search space having a lowest index.

Method 3-2 Using Lowest CCE Index (Start CCE Index) of PDCCH at One AL

Referring to FIG. 28, a search space having the lowest search space index is search space 1 2800 and there may be ambiguity as to whether a PDCCH of AL 8 or a PDCCH of AL 16 is received through the search space. As a method for solving the ambiguity, it may be assumed that reception is performed at one AL. For example, it may be assumed that a PDCCH is received at the lowest AL, i.e., AL 8 2810. The UE may determine a PUCCH resource based on $n_{CCE}=16$ 2855, which is the lowest CCE index (start CCE index) of AL 8 in search space 1 having the lowest index. As another example, it may be assumed that a PDCCH is received at the highest AL, that is, AL 16 2815. The UE may determine a PUCCH resource based on $n_{CCE}=0$ 2850, which is the lowest CCE index (start CCE index) of AL 16, which is the highest AL in search space 1 having the lowest index.

Method 3-3 Using Lowest CCE Index (Start CCE Index) of Received PDCCH

The UE may use a lowest CCE index (start CCE index) of a received PDCCH. In this case, although there is potential ambiguity with respect to an AL of a PDCCH, the UE may ignore the ambiguity and assume the received PDCCH as the PDCCH transmitted by the BS in the method.

Referring to FIG. 28, assuming that the PDCCH 2810 of AL 8 is received, the UE may determine a PUCCH resource based on $n_{CCE}$=16 2855 which is the lowest CCE index (start CCE index) of the PDCCH of AL 8 in search space 1 which is a search space having the lowest index.

Since the UE ignores the ambiguity with respect to an AL of a PDCCH, the UE may transmit a PUCCH through a wrong PUCCH resource. However, at least the BS may know which PUCCH is likely to be used by the UE.

For example, referring again to FIG. 28, the UE may select one PUCCH resource from among the PUCCH resource determined based on $n_{CCE}$=16, which is the lowest CCE index (start CCE index) of the PDCCH of AL 8 in search space 1, which is a search space having the lowest index, and the PUCCH resource determined based on $n_{CCE}$=0, which is the lowest CCE index (start CCE index) of the PDCCH of AL 16. Therefore, the BS may determine through which PUCCH transmission is performed by receiving both of the PUCCH resources and decoding same.

The method for indicating an AL of a PDCCH through the DCI of above-described Method 2-4 may be applied to determining a PUCCH. The UE may receive DCI, obtain an indicator indicating an AL through the DCI, and determine an AL through the indicator. A PDCCH may be selected in the search space having the lowest index based on the AL, and therefore, a PUCCH resource may be determined according to the lowest CCE index (start CCE index) of the PDCCH.

Figure 29:
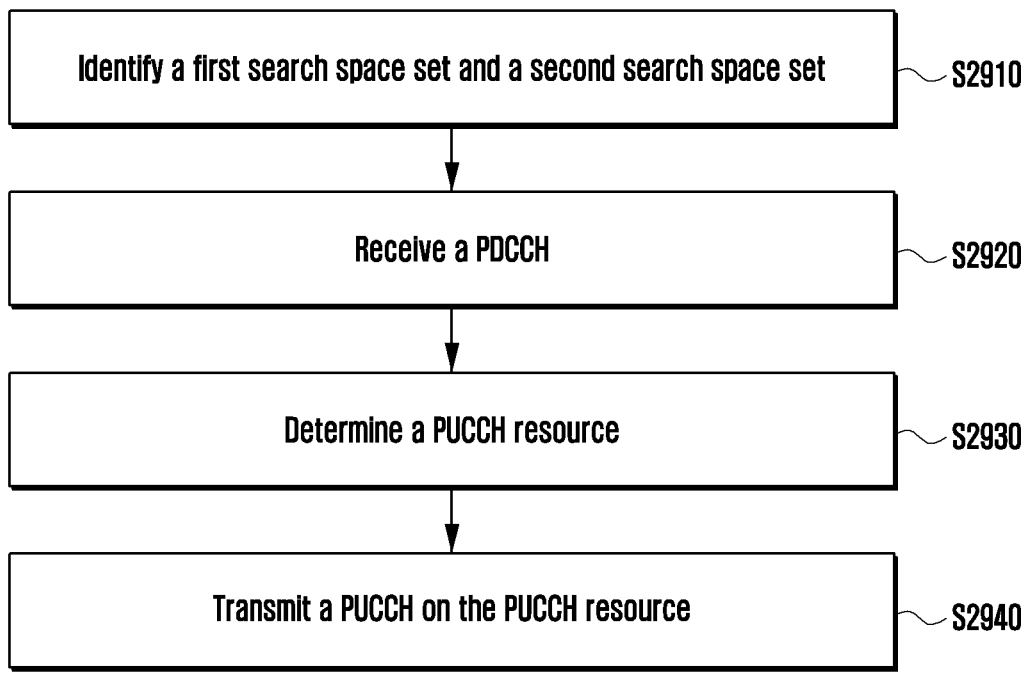
FIG. 29 illustrates a flowchart of a terminal according to an embodiment of the disclosure.

FIG. 29 is a flowchart of a terminal according to an embodiment of the disclosure. The operation order of FIG. 29 may be changed, and two or more operation steps may be combined and performed, or some steps may be omitted.

Referring to FIG. 29, a terminal may identify a first search space (SS) set and a second search space set in step S2910. A BS may identify a first search space set and a second search space set to configure to the terminal, and configure the first search space set and the second search space set to the terminal.

As described above, the search space is a set of DL control channel candidates including CCEs for which the terminal should attempt decoding at the given aggregation level (AL), and there are several ALs at which one set of CCEs is configured by 1, 2, 4, 8, and 16 CCEs, so that the terminal may have a plurality of search spaces. A search space set may be defined as a set of search spaces at all the configured ALs.

Each search space set may be associated with a CORESET. For example, the first search space set may be associated with a first CORESET and the second search space set may be associated with a second CORESET. A search space index may be configured for each search space set. The search space index is information for identifying a search space set. For example, a first index may be configured to the first search space set and a second index may be configured to the second search space set.

The first search space set and the second search space set may be linked to each other based on configuration information. A PDCCH may be repeatedly received based on the linked search space sets. For example, the configuration information may be received from the BS. The configuration information may include information (or identifier) to link the first search space set and the second search space set to each other for PDCCH repetition. For example, the configuration information may include the above-described first information and/or second information.

For example, the first search space set may include a first PDCCH candidate of a CCE AL 8 and a third PDCCH candidate of a CCE AL 16. An index of a first CCE (index of a start CCE) of the first PDCCH candidate may be the same as an index of a first CCE (index of a start CCE) of the third PDCCH candidate. The second search space set may include a second PDCCH candidate of a CCE AL 8 and a fourth PDCCH candidate of a CCE AL 16. An index of a first CCE of the second PDCCH candidate (the index of a starting CCE) may be different from an index of a first CCE of the fourth PDCCH candidate (the index of a starting CCE). For example, the terminal may identify that the CCEs-to-REGs mapping type of the first CORESET associated with the first search space set is set to non-interleaving mapping, and the time duration of the first CORESET is one symbol.

In step S2920, the terminal may receive the PDCCH. The BS may transmit the PDCCH to the terminal. DCI for scheduling PDSCH or DCI indicating HARQ-ACK transmission (e.g., SPS PDSCH release DCI, DCI triggering type-3 HARQ-ACK codebook, DCI indicating Scell dormancy, etc.) may be received through the PDCCH. For example, the PDCCH may be received based on the configuration information. For example, the PDCCH may be received based on each of the first search space set and the second search space set. For example, the PDCCH may be received based on the first PDCCH candidate and the second PDCCH candidate. Alternatively, the PDCCH may be received based on the third PDCCH candidate and the fourth PDCCH candidate.

In step S2930, the terminal may determine a PUCCH resource. The PUCCH resource may be determined based on the index of the first CCE (or start CCE) among CCEs for the PDCCH.

For example, when the first index of the first search space set is larger than the second index of the second search space set, the first CCE may be determined based on the second search space set. Specifically, the index of the first CCE (or the starting CCE) may be determined based on the CCE AL of the PDCCH candidate associated with the second search space set having a smaller index. For example, the index of the first CCE (the index of the start CCE) of the second PDCCH candidate of CCE AL 8 and the index of the first CCE (the index of the start CCE) of the fourth PDCCH candidate of the CCE AL 16 in the second search space set may be different. In this case, the index of the first CCE (or start CCE) may be determined based on the index of the first CCE (index of the start CCE) of the fourth PDCCH candidate having CCE AL 16.

The PUCCH resource may be determined by further considering a value of a PUCCH resource indicator field in the DCI transmitted through the PDCCH.

In step S2940, the terminal transmits the PUCCH based on the determined PUCCH resource. The BS may receive the PUCCH from the terminal. For example, the PUCCH may include HARQ-ACK information.

The above-described methods and/or embodiments (e.g., first embodiment, second embodiment, third embodiment, etc.) may be combined.

In addition, the above-described methods and/or embodiments (e.g., the first embodiment, the second embodiment, the third embodiment, etc.) may be performed by the terminal and/or the BS of FIGS. 30 and 31 described below.

Figure 30:
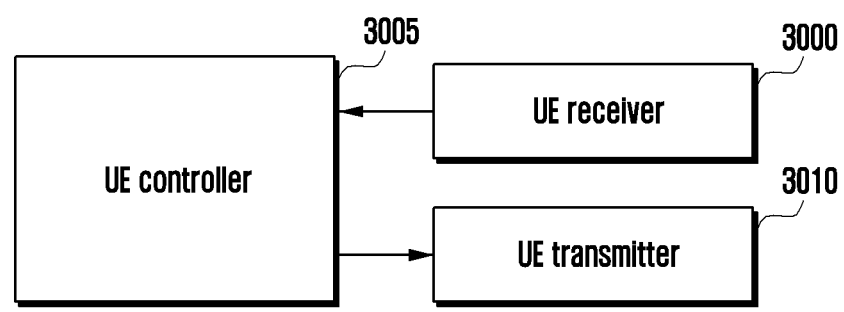
FIG. 30 illustrates a UE in a wireless communication system according to an embodiment of the disclosure.

FIG. 30 illustrates a UE in a wireless communication system, according to an embodiment of the disclosure.

Referring to FIG. 30, the UE may include a transceiver including a UE receiver 3000 and a UE transmitter 3010, a memory, and a UE controller 3005 (or a UE processor). The transceiver is made up of the receiver 3000 and the UE transmitter 3010. The memory and the UE controller 3005 may operate according to a least one of the above-described communication methods of the UE. However, the elements of the UE are not limited to the above example. For example, the UE may include more or fewer elements than the above elements. Also, the transmitter 3010, the memory, and the controller 3005 may be implemented in the form of a single chip.

The transceiver may transmit and receive a signal to and from the BS. The signal may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as a read only memory (ROM), an RA memory (RAM), a hard disc, a compact disc (CD)-ROM, a digital versatile disc (DVD), or a combination of the storage media. The number of memories may be plural.

The UE controller 3005 may control a series of processes to allow the UE to operate according to the above embodiments. For example, the UE controller 3005 may control elements of the UE to receive DCI including two layers and simultaneously receive a plurality of PDSCHs. For example, the UE controller 3005 is configured to identify a first search space set associated with a first CORESET and a second search space set associated with a second CORESET, which are linked based on configuration information, wherein the first search space set with a first index includes a first PDCCH candidate having a CCE AL 8 and a third PDCCH candidate having a CCE AL 16, and wherein the second search space set with a second index includes a second PDCCH candidate having the CCE AL 8 and a fourth PDCCH candidate having the CCE AL 16, receive, via the transceiver, a PDCCH based on the first PDCCH candidate and the second PDCCH candidate or based on the third PDCCH candidate and the fourth PDCCH candidate, determine a PUCCH resource based on an index of a first CCE for the PDCCH, wherein the index of the first CCE is determined based on a CCE AL of a PDCCH candidate associated with the second search space set with the second index, in case that the first index of the first search space set is larger than the second index of the second search space set, and transmit, via the transceiver, a PUCCH in the determined PUCCH resource. The number of UE controllers 3005 may be plural, and the UE controller 3005 may perform an operation of controlling the elements of the UE by executing the program stored in the memory.

Figure 31:
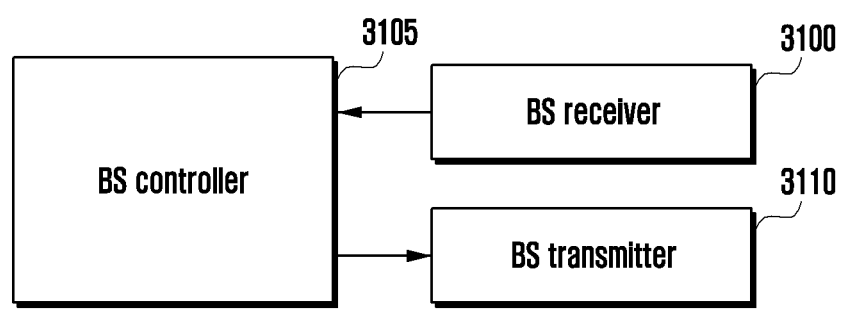
FIG. 31 illustrates a BS in a wireless communication system according to an embodiment of the disclosure.

FIG. 31 illustrates a BS in a wireless communication system, according to an embodiment of the disclosure.

Referring to FIG. 31, the BS may include a transceiver including a BS receiver 3100 and a BS transmitter 3110, a memory, and a BS controller 3105 (or a BS processor). The transceiver may include the receiver 3100 and the transmitter 3110 of the BS, the memory, and the BS controller 3105 may operate according to the communication method of the BS. However, the elements of the BS are not limited to the above example. For example, the BS may include more or fewer elements than the above-described elements. Also, the transceiver, the memory, and the BS controller 3105 may be implemented in the form of a single chip.

The transceiver may transmit and receive a signal to/from the UE. The signal may include control information and data. To this end, the transceiver may include an RF transmitter for up-converting and amplifying a frequency of the transmitted signal and an RF receiver for low-noise amplifying the received signal and down-converting the frequency. However, this is only an example of the transmitter 3110, and elements of the transceiver are not limited to the RF transmitter and the RF receiver.

The transceiver may receive a signal through a radio channel, output the signal to the BS controller 3105, and transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, DVD, or a combination of the storage media. The number of memories may be plural.

The BS controller 3105 may control a series of processes to allow the BS to operate according to the embodiments of the disclosure. For example, the BS controller 3105 may control each element of the BS to configure DCI of two layers including allocation information of a plurality of PDSCHs and transmit the DCI. For example, the BS controller 3105 is configured to identify a first search space set associated with a first CORESET and a second search space set associated with a second CORESET, which are linked based on configuration information, wherein the first search space set with a first index includes a first PDCCH candidate having a CCE AL 8 and a third PDCCH candidate having a CCE AL 16, and wherein the second search space set with a second index includes a second PDCCH candidate having the CCE AL 8 and a fourth PDCCH candidate having the CCE AL 16, transmit, to a terminal, a PDCCH based on the first PDCCH candidate and the second PDCCH candidate or based on the third PDCCH candidate and the fourth PDCCH candidate, and receive, from the terminal, a PUCCH based on a PUCCH resource, wherein the PUCCH resource is identified based on an index of a first CCE for the PDCCH, and wherein the index of the first CCE is associated with a CCE AL of a PDCCH candidate associated with the second search space set with the second index, in case that the first index of the first search space set is larger than the second index of the second search space set. The number of BS controllers 3105 may be plural, and the BS controller 3105 may perform an operation of controlling the elements of the BS by executing the program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable ROM (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. For example, a first and second embodiment of the disclosure may be combined with each other to operate a BS and a terminal. Further, although the above embodiments have been described based on an FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a wireless communication system, the method comprising:
   receiving configuration information on a first search space (SS) set and a second SS set, wherein the first SS set with a first index includes a first physical downlink control channel (PDCCH) candidate having a control channel element (CCE) aggregation level (AL) 8 and a third PDCCH candidate having a CCE AL 16, and wherein the second SS set with a second index includes a second PDCCH candidate having a CCE AL 8 and a fourth PDCCH candidate having a CCE AL 16;
   receiving a PDCCH based on the configuration information;
   determining a physical uplink control channel (PUCCH) resource based on an index of a first CCE for the PDCCH, wherein the index of the first CCE is determined based on a PDCCH candidate having a CCE AL 16 associated with the second SS set with the second index, in case that the first index of the first SS set is larger than the second index of the second SS set; and
   transmitting a PUCCH based on the determined PUCCH resource.

2. The method of claim 1,
   wherein a mapping type of CCEs to resource element groups (REGs) of a first control resource set (CORESET) associated with the first SS set is configured as a non-interleaved mapping and a time duration of the first CORESET is one symbol, and
   wherein an index of a first CCE of the first PDCCH candidate is same as an index of a first CCE of the third PDCCH candidate.

3. The method of claim 2,
   wherein in case that an index of a first CCE of the second PDCCH candidate is different than an index of a first CCE of a fourth PDCCH candidate in the second SS set, the index of the first CCE for the PDCCH is determined from the index of the first CCE of the fourth PDCCH candidate with the CCE AL 16, and
   wherein the PDCCH is received based on the first PDCCH candidate and the second PDCCH candidate or based on the third PDCCH candidate and the fourth PDCCH candidate.

4. The method of claim 1,
   wherein the second SS set is associated with a second CORESET, and
   wherein the PUCCH resource is determined further based on a value of a PUCCH resource indicator field in downlink control information (DCI) on the PDCCH.

5. The method of claim 1,
   wherein the configuration information includes information to link the first SS set and the second SS set for PDCCH repetition, and
   wherein the first SS set and the second SS set are linked based on the configuration information.

6. A method performed by a base station (BS) in a wireless communication system, the method comprising:
   transmitting, to a terminal, configuration information on a first search space (SS) set and a second SS set, wherein the first SS set with a first index includes a first physical downlink control channel (PDCCH) candidate having a control channel element (CCE) aggregation level (AL) 8 and a third PDCCH candidate having a CCE AL 16, and wherein the second SS set with a second index includes a second PDCCH candidate having a CCE AL 8 and a fourth PDCCH candidate having a CCE AL 16;
   transmitting, to the terminal, a PDCCH based on the configuration information; and receiving, from the terminal, a physical uplink control channel (PUCCH) based on a PUCCH resource,
wherein the PUCCH resource is identified based on an index of a first CCE for the PDCCH, and
wherein the index of the first CCE for the PDCCH is associated with a PDCCH candidate having a CCE AL 16 associated with the second SS set with the second index, in case that the first index of the first SS set is larger than the second index of the second SS set.

7. The method of claim 6,
wherein a mapping type of CCEs to resource element groups (REGs) of a first control resource set (CORESET) associated with the first SS set is configured as a non-interleaved mapping and a time duration of the first CORESET is one symbol,
wherein an index of a first CCE of the first PDCCH candidate is same as an index of a first CCE of the third PDCCH candidate, and
wherein in case that an index of a first CCE of the second PDCCH candidate is different than an index of a first CCE of a fourth PDCCH candidate in the second SS set, the index of the first CCE for the PDCCH is the index of the first CCE of the fourth PDCCH candidate with the CCE AL 16.

8. The method of claim 6,
wherein the PUCCH resource is identified further based on a value of a PUCCH resource indicator field in downlink control information (DCI) on the PDCCH,
wherein the second SS set is associated with a second CORESET, and
wherein the PDCCH is transmitted based on the first PDCCH candidate and the second PDCCH candidate or based on the third PDCCH candidate and the fourth PDCCH candidate.

9. The method of claim 6,
wherein the configuration information includes information to link the first SS set and the second SS set for PDCCH repetition, and
wherein the first SS set and the second SS set are linked based on the configuration information.

10. A terminal in a wireless communication system, the terminal comprising:
a transceiver; and
a processor coupled with the transceiver and configured to:
receive, via the transceiver, configuration information a first search space (SS) set and a second SS set, wherein the first SS set with a first index includes a first physical downlink control channel (PDCCH) candidate having a control channel element (CCE) aggregation level (AL) 8 and a third PDCCH candidate having a CCE AL 16, and wherein the second SS set with a second index includes a second PDCCH candidate having a CCE AL 8 and a fourth PDCCH candidate having a CCE AL 16,
receive, via the transceiver, a PDCCH based on the configuration information,
determine a physical uplink control channel (PUCCH) resource based on an index of a first CCE for the PDCCH, wherein the index of the first CCE for the PDCCH is determined based on a PDCCH candidate having a CCE AL 16 associated with the second SS set with the second index, in case that the first index of the first SS set is larger than the second index of the second SS set, and
transmit, via the transceiver, a PUCCH based on the determined PUCCH resource.

11. The terminal of claim 10,
wherein a mapping type of CCEs to resource element groups (REGs) of a first control resource set (CORESET) associated with the first SS set is configured as a non-interleaved mapping and a time duration of the first CORESET is one symbol, and
wherein an index of a first CCE of the first PDCCH candidate is same as an index of a first CCE of the third PDCCH candidate,
wherein the second SS set is associated with a second CORESET, and
wherein in case that an index of a first CCE of the second PDCCH candidate is different than an index of a first CCE of a fourth PDCCH candidate in the second SS set, the index of the first CCE for the PDCCH is determined from the index of the first CCE of the fourth PDCCH candidate with the CCE AL 16.

12. The terminal of claim 10, wherein the configuration information includes information to link the first SS set and the second SS set for PDCCH repetition,
wherein the PUCCH resource is determined further based on a value of a PUCCH resource indicator field in downlink control information (DCI) on the PDCCH, and
wherein the PDCCH is received based on the first PDCCH candidate and the second PDCCH candidate or based on the third PDCCH candidate and the fourth PDCCH candidate.

13. A base station (BS) in a wireless communication system, the BS comprising:
a transceiver; and
a processor coupled with the transceiver and configured to:
transmit, to a terminal, configuration information on a first search space (SS) set and a second SS set, wherein the first SS set with a first index includes a first physical downlink control channel (PDCCH) candidate having a control channel element (CCE) aggregation level (AL) 8 and a third PDCCH candidate having a CCE AL 16, and wherein the second SS set with a second index includes a second PDCCH candidate having a CCE AL 8 and a fourth PDCCH candidate having a CCE AL 16,
transmit, to the terminal, a PDCCH based on the configuration information, and
receive, from the terminal, a physical uplink control channel (PUCCH) based on a PUCCH resource,
wherein the PUCCH resource is identified based on an index of a first CCE for the PDCCH, and
wherein the index of the first CCE for the PDCCH is associated with a PDCCH candidate having a CCE AL 16 associated with the second SS set with the second index, in case that the first index of the first SS set is larger than the second index of the second SS set.

14. The BS of claim 13,
wherein a mapping type of CCEs to resource element groups (REGs) of a first control resource set (CORESET) associated with the first SS set is configured as a non-interleaved mapping and a time duration of the first CORESET is one symbol,
wherein an index of a first CCE of the first PDCCH candidate is same as an index of a first CCE of the third PDCCH candidate,
wherein the second SS set is associated with a second CORESET, and
wherein in case that an index of a first CCE of the second PDCCH candidate is different than an index of a first CCE of a fourth PDCCH candidate in the second SS set, the index of the first CCE for the PDCCH is the index of the first CCE of the fourth PDCCH candidate with the CCE AL 16.

15. The BS of claim 13, wherein the configuration information includes information to link the first SS set and the second SS set for PDCCH repetition, and wherein the PDCCH is transmitted based on the first PDCCH candidate and the second PDCCH candidate or based on the third PDCCH candidate and the fourth PDCCH candidate.

* * * * *